United States Patent [19]

Handley et al.

[11] Patent Number: 5,459,739

[45] Date of Patent: Oct. 17, 1995

[54] MERGING THREE OPTICAL CHARACTER RECOGNITION OUTPUTS FOR IMPROVED PRECISION USING A MINIMUM EDIT DISTANCE FUNCTION

[75] Inventors: John C. Handley, Penfield, N.Y.; Thomas B. Hickey, Columbus, Ohio

[73] Assignee: OCLC Online Computer Library Center, Incorporated, Dublin, Ohio

[21] Appl. No.: 853,550

[22] Filed: Mar. 18, 1992

[51] Int. Cl.$^6$ .............................. G06F 11/18; G06F 17/16
[52] U.S. Cl. ........................ 371/36; 371/67.1; 371/68.1; 382/310; 364/225.5; 364/237.6; 364/237.83; 364/DIG. 1
[58] Field of Search .............................. 395/600; 382/39, 382/57, 62; 371/30, 67.1, 68.1, 68.2, 68.3, 36; 364/225.5, 237.6, 237.83

[56] References Cited

U.S. PATENT DOCUMENTS

| | | | |
|---|---|---|---|
| 3,431,557 | 3/1964 | Thomas et al. | 371/68.1 |
| 3,988,715 | 10/1976 | Mullan et al. | 340/146.3 |
| 4,958,379 | 9/1990 | Yamaguchi et al. | 382/59 |
| 5,181,162 | 1/1993 | Smith et al. | 395/600 |
| 5,257,323 | 10/1993 | Melen et al. | 382/39 |
| 5,265,174 | 11/1993 | Nakatsuka | 382/38 |

OTHER PUBLICATIONS

Time Warps, String Edits, and Macromolecules: The Theory and Practice Of Sequence Comparison Kruskal & Sankoff ch. p, pp. 1–44, Addison–Wesley Publishing Co., Reading, Mass 1983.

Speeding Up Dynamic Programming Algorithms for Final Optimal Lattice Paths by J. L. Spouge, SIAM J. Appl. Math, vol. 49 pp. 1552–1566, Oct. 1989.

The String–to–String correction Problem, R. W. Wagner, N. J. Fischer, Journal of the ACM, vol. 21, Jan. 1974, pp. 168–173.

Algorithms for Approximate String Matching by E. Ukkonen, Information and Control 64, 100–118 (1985).

Minimum Detour Methods for String or Sequence Comparison by Hadlock, Florida Atlantic Univ., Boca Raton, Fla., Congressus Numerantium 61 (1988), pp. 263–274.

A Linear Space Algorithm for Computing Maximal Common Subsequences by Hirschberg, Princeton University, Communications of the ACM, Jun., 1975, vol. 18, No. 6, pp. 341–343.

Fast Optimal Alignment by Spouge, CABIOS, vol. 7, No. 1, 1991 pp. 1–7.

On Approximate String Machining by Ukkonne, Lecture Notes in Computer Science, pp. 486–495, Proceedings of the 1983 International FCT–Conference, borgholm, Sweden, Aug. 21–27, 1983.

Stroustrup, The C++ Programming Language, 1991 pp. 537–539.

*Primary Examiner*—Thomas G. Black
*Assistant Examiner*—Jack Choulks
*Attorney, Agent, or Firm*—Mueller and Smith

[57] ABSTRACT

Three OCR systems are employed for text conversion and the results generated from each of the three are merged using a edit distance algorithm to estimate a correct common text ancestor. To make the process computationally feasible for large strings such as pages of documentation with 3,000 characters, the method is executed in two stages. The first procedure is carried out with each page considered as a string of lines. Where differences exist using the edit distance between the lines on a page to find the optimal alignment of the lines. In the event that choice must be made among three non-null lines, the procedure then is invoked on the three lines, by using the edit distance between the characters on a line to find the optimal alignment. The number of computations required of the procedure is further reduced by comer-cutting that hueristically determines an upper bound on the edit distance and limits calculations to those which do not exceed the upper bound.

21 Claims, 43 Drawing Sheets

|   |   |   |   |   |   |   |   |   |   |   |
|---|---|---|---|---|---|---|---|---|---|---|
| T | h | i | s |   | s | t | r | i | n | g |
| T | h | e | λ |   | T | h | i | n | g | λ |
| λ | h | e | λ |   | s | i | n | g | s | λ |
| $e_1$ | $e_2$ | $e_3$ | $e_4$ | $e_5$ | $e_6$ | $e_7$ | $e_8$ | $e_9$ | $e_{10}$ | $e_{11}$ |

```
0  0  ∞  2 -1 -1  0  0  0  0
a  b  c  g  e  f  g  h  i  j
↓  ↓   ✕       ↓  ↓  ↓  ↓
a  b  i  e  f  g  g  h  i  j
```

```
0  0  ∞  2 -1 -1 -1  0  0  0
a  b  c  g  e  f  g  h  i  j
↓  ↓   ✕        ↓  ↓  ↓
a  b  i  e  f  g  g  h  i  j
```

```
0  0  ∞  ∞ -1 -1  0  0  0  0
a  b  c  g  e  f  g  h  i  j
↓  ↓    ╱ ╱ ╱  ↓  ↓  ↓
a  b  i  e  f  g  g  h  i  j
```

MERGING THREE OPTICAL CHARACTER RECOGNITION OUTPUTS FOR IMPROVED PRECISION USING A MINIMUM EDIT DISTANCE FUNCTION

BACKGROUND OF THE INVENTION

The technology associated with information delivery has expanded and improved in concert with that of computer systems. To fully exploit the latter systems, techniques for the practical development of databases have been required. Over the somewhat recent past, information systems have been derived providing on-line access to text materials which themselves have been generated from computer-based systems. However, to generate computer accessible databases representing earlier documents or printed works which are not, in themselves, computer generated, technology is required for carrying out a retrospective conversion of print to memory based data.

In general, optical character recognition (OCR) systems are employed for processing printed data to convert it to magnetic media based data. These devices scan a given page of print to generate an ASCII based string of data. Such printed matter or pages and their physical application to scanning devices, however, represent a classification noise environment. In this regard, a smudge may appear about the region of print; pages will be positioned in a skewed orientation with respect to the scanner; and the scanners themselves may evolve subjective fault characteristics or systematic errors. The print or type itself may evoke scanning errors. For example, kerning occurs in font structures to compress letters into adjacency. Ligatures may tend to produce scan errors. Some software-based procedures have been invoked for the purpose of correcting OCR generated inaccuracies but they too are limited in effectiveness. For example, dictionary based spelling check programs as well as grammar check programs have been utilized but all are insufficient for a variety of reasons. For example, punctuation is not addressed and the desirability of correction for a variety of different languages poses problems not readily amenable to correction.

One approach to correction of the outputs of OCR devices which may be contemplated provides for the merging of the outputs of more than one OCR machine or device. Intuitively, if different OCR systems are fairly accurate and make mistakes randomly in different places in the text being scanned, then there should be some way of combining three OCR outputs to generate a string which is more accurate than any of the three input strings. In general, the merging of two strings from two OCR devices in this way would yield a trivial result and the merging of the outputs of four or more OCR devices would be prohibitively expensive computationally. Stings-to-string correction techniques have been proposed and utilized, for example, with applications to molecular biology, computer science, and the like. See in this regard, the following publication:

"Time Warps, String Edits, and Macromolecules: The Theory and Practice of Sequence Comparison" Edited by Sankoff and Kruskal, 1983, Addison-Wesley Publishing Co., Reading, Mass.

A discourse describing the string-to-string correction problem wherein the distance between two strings as measured by the minimum cost sequence of "edit operations" or edit distance needed to change one string to the other is described in the following publication:

The String-to-String Correction Problem" by R. A. Wagner and N. J. Fischer, Journal of the ACM, vol. 21, Jan. 1974, pp 168–173.

With the string merger approach, a common ancestor of three strings would be a string that minimizes the sum of the edit operations or "distances" between the string and the other three, i.e. E is a common ancestor of the strings A, B, and C if E minimizes $D(A,E)+D(B,E)+D(C,E)$. The edit distance, D, between two strings is the minimum number of character insertions, deletions, and substitutions needed to convert one string into the other. Once the distance is found, the next task is to "back track" to calculate the actual string. The string may not be unique.

A somewhat standard algorithm to compute just the distance requires on the order of $n^3$ operations and on the order of $n^2$ bytes for storage, where n is the maximum length of the three strings. Computing an actual common ancestor using that distance requires storage on the order of $n^3$ bytes. For a typical page, n will have a value between 2,000 and 3,000 and the computational burden imposed upon any computer would involve billions of operations and gigabytes of storage, an unacceptable condition.

SUMMARY

The present invention is addressed to a method and system for determining by estimation the correct ancestor of text material which has been converted to computer-based code by an optical character recognition (OCR) system. The approach recognizes that the translation outputs of three OCR devices will be quite similar for a given page of text. Thus, it is assumed that the OCR process that garbles certain of the converted text data can be modeled as a sequence of simple editing operations with respect to each of three data strings. The best estimate of minimal edit distance or minimal number of insertions, deletions, and substitutions to find a common ancestor is a string that minimizes such edit distance. In general, the procedure is executed in two stages. First, a minimum edit distance is computed and then an actual string is computed by back-tracking through a matrix of computed edit distances. Two aspects of the instant procedure make such an approach feasible. First, a close approximation which is greater than or equal to the true minimum edit distance is computed. The computation of the approximation requires dramatically less space and fewer operations than finding a true minimum edit distance. In this regard, the key to the approximation is to consider a page as a string of lines rather than a string of letters. Because the string algorithm employed with the process works for strings from any alphabet, the "alphabet" can be lines of text. This reduces the storage and time requirements for the procedure by orders of magnitude and makes such an approach a feasible one. The second salient aspect of the invention resides in the use of an upper bound of the sum of the edit distances to further reduce the number of computations. This is a corner cutting approach extended to a three-dimensional matrix. Such bounding reduces the number of operations and makes the procedure convenient to use. For example, implementing bounding has been observed to reduce the execution time on text pages to about 30 seconds on a four MIPS computer.

Other objects of the invention will, in part, be obvious and will, in part, appear hereinafter.

The invention, accordingly, comprises the method and system possessing the construction, combination of elements, arrangement of parts and steps which are exemplified in the following detailed description.

For a fuller understanding of the nature and objects of the invention, reference should be had to the following detailed description taken in connection with the accompanying drawings.

DETAILED DESCRIPTION OF THE INVENTION

The present approach to OCR or text to data conversion device corrective techniques recognizes that where more than one OCR device is used to translate or scan a document page, there will be random error, error from registration conditions in the course of the scan, and system errors which, for example, for a given OCR device, will represent a more or less regular mis-evaluation of the given character. Generally, for the scanning of documents, two of these OCR devices will provide an accurate output most of the time while a third might have error. In effect, the instant method optimizes the strengths or accuracies of the different machines and seeks the proper ancestor or original printing represented by the document which will have been mutated in some instances in the course of the scanning process. As a straightforward approach, this technique, in general, is impractical, requiring excessive computation and storage. However, the present technique takes advantage of the similarities which normally may be present among three OCR scans of the same page and employs a string edit system. The approach lowers the number of computational operations by first treating a document page as a string of lines, as opposed to a string of symbols or characters. The number of computations further is reduced by a corner-cutting technique that hueristically determines an upper bound on the alignment or edit distance and limits calculations to those which do not exceed that upper bound.

Figure 1:
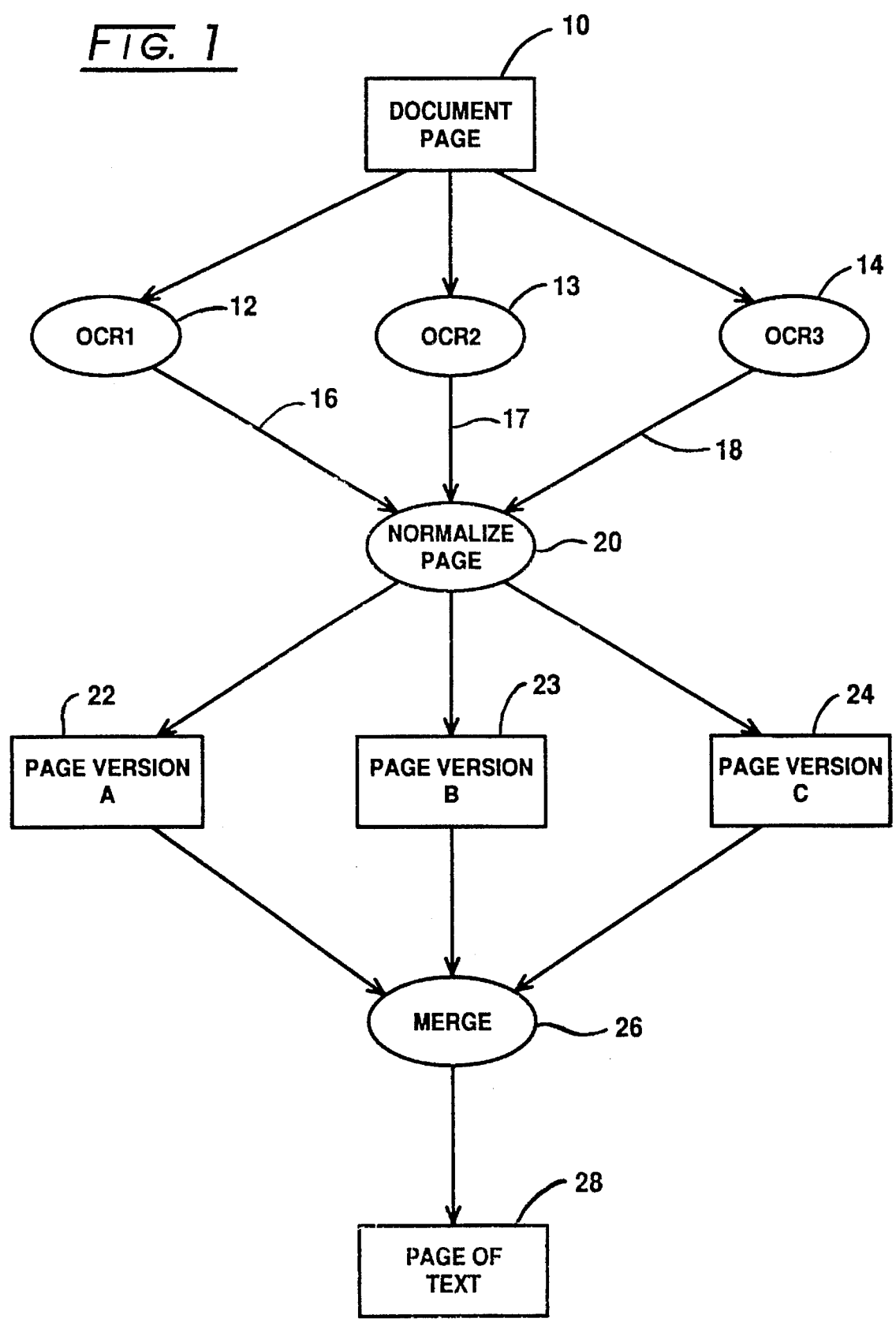
FIG. 1 is a chart presenting an overview of the method of the invention.

Looking to FIG. 1, an overview of the interaction correction is revealed. In the figure, a document page is represented at block 10 which is submitted for scanning to three OCR devices, $OCR_1$, $OCR_2$, and $OCR_3$ represented, respectively, at symbols 12–14. From these OCR stations, the scan-based outputs are then submitted, as represented at respective lines 16–18, to a normalization procedure represented at symbol 20. The normalization procedure carries out what, in effect, is a condensing function, eliminating white space and blank lines to produce the scanned equivalent of three pages which are assembled in accordance with a unified rule theme. These normalized pages are identified as page versions A, B, and C as represented at respective blocks 22–24. Page versions A, B, and C, then are directed to a merge algorithm as represented at symbol 26 which produces a corrected page of text as represented at block 28.

Figure 2:
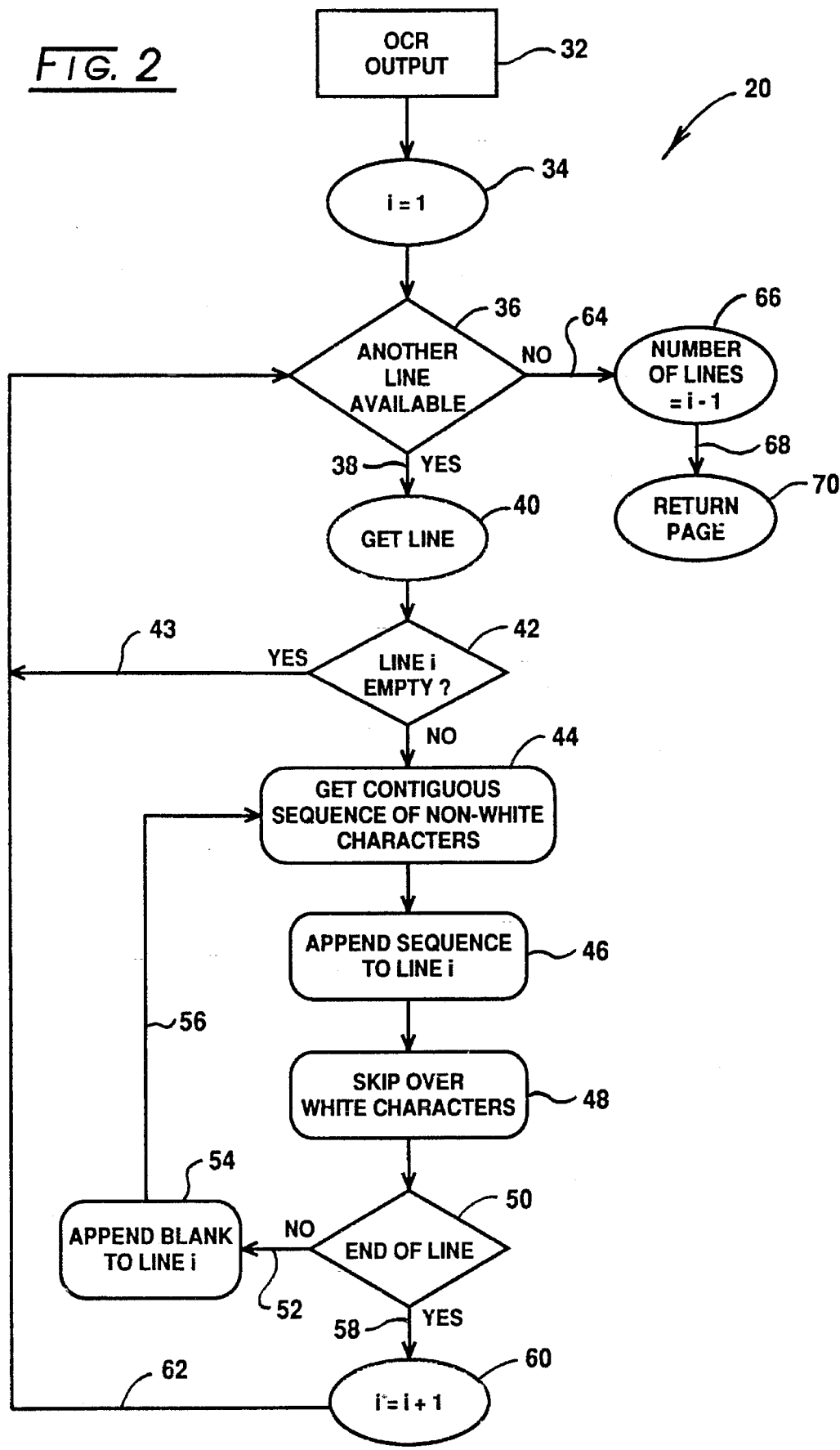
FIG. 2 is a flow chart showing a page normalization routine employed with the invention.

Referring to FIG. 2, the normalization procedure represented at symbol 20 in FIG. 1 is revealed at an enhanced level of detail. For any given normalized page, an output from an OCR device is provided as represented at block 32. For this procedure, normal print characters or symbols are designated as "non-white characters" while the term "white characters" is meant to include "blank", a "tab", a "carriage return", and a "new line". Non-empty lines are designated 'T' and, as represented at symbol 34, the first non-empty line is identified as such. This value, 'T', is incremented for each non-empty line and, with the arrangement, the total number of lines on a page, L, will have a value of one less than the total of the incremented value of i. The routine progresses to the decision represented at block 36 to determine whether another line is available. If another non-empty line is so available, then as represented at line 38 and symbol 40, that line is obtained. Also carded out by the program is the inquiry represented at block 42, wherein a determination is made as to whether the elected line at hand is initially "empty". If it is, the program proceeds as represented by lines 43 and 62. If line i is not empty, the program continues as represented at symbol 44 wherein a contiguous sequence of non-white characters, for example representing a word, are obtained. Then, as represented at symbol 46, that sequence is appended to line i. The earlier-designated white characters are skipped over as represented at symbol 48 and, as represented at block 50, line 52, and symbol 54, a blank is appended to line i. This normally will not be the end of the line, but a blank is appended to separate the acquired word from a next word in the sequence thereof on the line. As represented by line 56, the program then loops to obtain a next contiguous sequence of non-white characters or another word as represented at symbol 44. Where the determination at block 50 is that an end of a line has occurred, then as represented at line 58 and symbol 60, the value of i is incremented by 1 and, as represented by line 62 and block 36, a determination is made as to whether another line is available. Where the determination at block 36 is that no additional line is available, then as represented at line 64 and symbol 66, the number of lines is set as the then value of i less 1 and, as represented at lines 68 and symbol 70, the page at hand will have been normalized and is returned to the main program.

Figure 3:
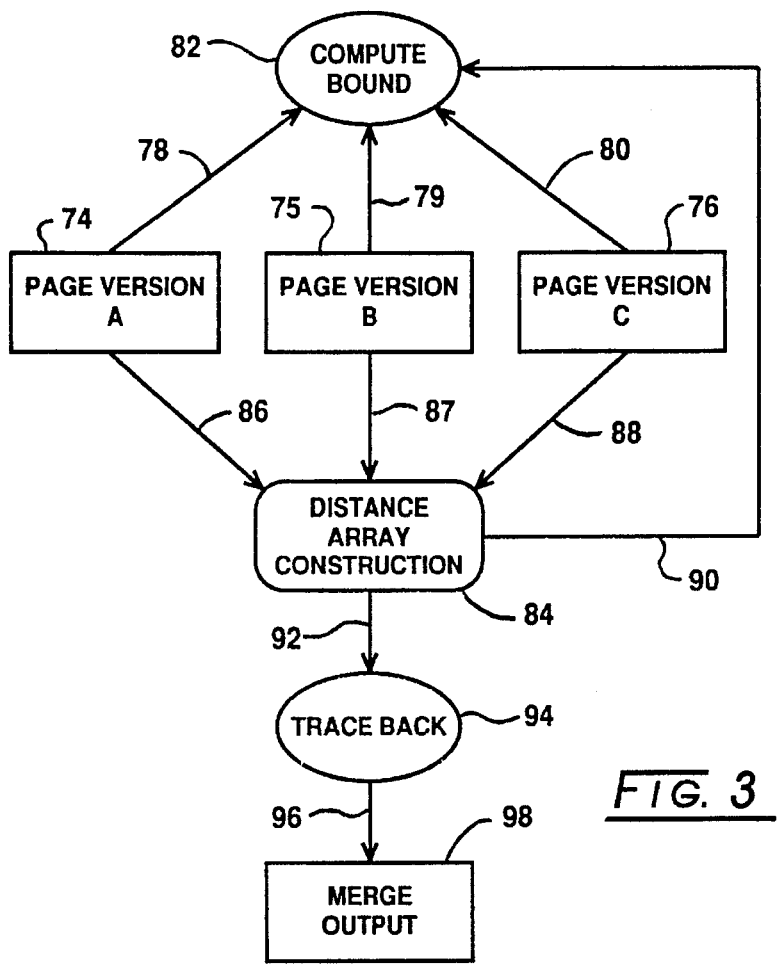
FIG. 3 is a flow chart showing a merge technique employed with the invention.

Referring to FIG. 3, the merge technique carried out is illustrated in highly generalized fashion. The normalized versions of the same page of a document are represented in the figure at blocks 74–76. These page versions are respectively designated as "A", "B", and "C". Under the approach, a bound of edit distance which is a close approximation greater than or equal to the true minimum edit distance is computed as represented by lines 78–80 extending to a "compute bound" symbol 82. The computation of this computed bound 82 requires much less memory and fewer operations than finding any true minimum. As noted above, additionally, a page is considered as a string of lines rather than a string of letters or symbols. Next, using the computed bound, a three-dimensional edit distance array is developed, the value of the bound being used to restrict the number of entries in that array. As seen in the figure, the distance array construction is represented at symbol 84, the array being generated utilizing the page versions A, B, and C as represented by respective lines 86-88 in conjunction with the bound value as represented at line 90. The number of entries within the array being restricted by the bound, as represented at line 92 and symbol 94, a trace back procedure then is invoked to develop an actual string which is computed by back-tracking through the matrix of computed edit distances. The result is a merged output as represented at line 96 and block 98.

The algorithm for finding the minimal alignment distance in the above-noted case of three strings A, B, and C may be represented as follows:

$d(0,0,0)=0;$

For $1 \leq i < m$, $1 \leq j \leq n$, and $1 \leq k \leq p$, $$d(i,j,k) = \min \begin{cases} d(i-1,j-1,k) + v(a_i,b_j,\lambda), \\ d(i-1,j,k-1) + v(a_i,\lambda,c_k), \\ d(i,j-1,k-1) + v(\lambda,b_j,c_k), \\ d(i,j,k-1) + v(\lambda,\lambda,c_k), \\ d(i,j-1,k) + v(\lambda,b_j,\lambda), \\ d(i-1,j,k) + v(a_i,\lambda,\lambda), \\ d(i-1,j-1,k-1) + v(a_i,b_j,c_k) \end{cases}$$

The above algorithm is a dynamic programming solution similar to a string edit distance computation. As noted above, however, the number of operations carried out by the approach grows as a cube of the longest string length. The number of computations is prohibitive and a backtracking through a three-dimensional matrix $d(i,j,k) \equiv D(A(i),B(j),C(k))$ to recover a string requires excessive memory. Under the present approach, to save space, a page is considered as a string of lines instead of a string of letters. By viewing the page as a string of lines, the number of "characters" is reduced from about 3,000 to about 60. A weighting function, w, is the edit distance between, for example, arbitrary lines X and Y: $w(X,Y)=D(X,Y)$. Weighting function, v, above is modified similarly. Because these algorithms are valid for any alphabet, they may be employed with respect to alphabetic lines instead of letters. During the backtracking stage to find a string that yields the minimal alignment distance, if a choice among three lines is required, then a similar alignment distance minimization and backtracking for letters is invoked.

Figures 4, 5, 7, 8, 9:
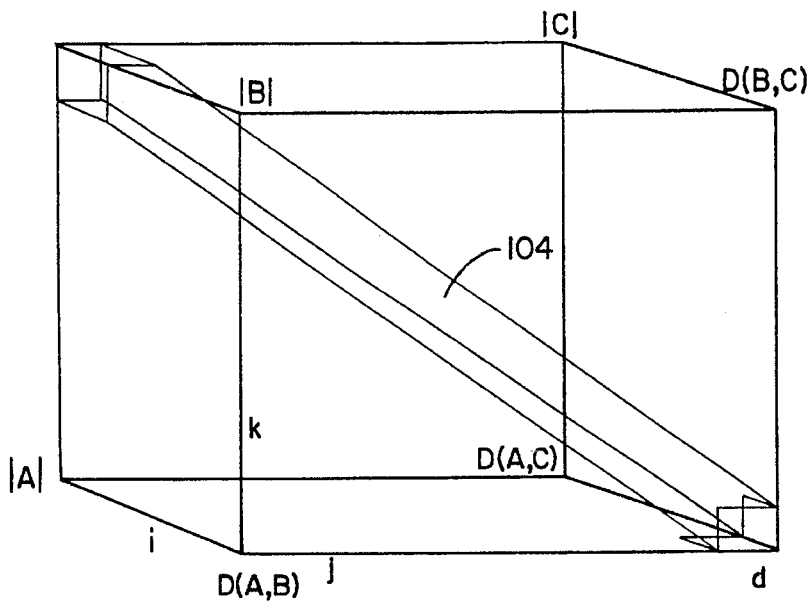
FIG. 4 is an illustration of an exemplary alignment of three strings of characters.
FIG. 5 is a pictorial representation of a matrix employed with the method of the invention.
FIG. 7 is an illustration of an initial shifts array when matching two sample strings.
FIG. 8 is an illustration of the shifts array of FIG. 4 after lengthening.
FIG. 9 is an illustration of the shifts array of FIG. 8 following an uncrossing procedure.

As noted above, the "best" estimate of the correct string of the strings A, B, C is a string E that minimizes the sum of the edit distances between the estimate and the three corrupt strings. For the purpose of determining edit distance in the present case, it is assumed that the process that garbles the strings can be modeled as a sequence of simple editing operations on each of the three strings. The simple operations are insertions, deletions, and substitutions. Additionally, for the present application, no allowances are made for transpositions of characters, which would be appropriate, for example, for correcting keyed inputs or the like. These latter transpositions seldom occur in an OCR output. In the determination of an alignment distance for three strings as now required, the string E equals "$e_1, \ldots, e_q$," which minimizes the alignment distances sought. FIG. 4 shows a three-string alignment, where $\lambda$, stands for a null character. As set forth in the above algorithm for finding the minimal alignment distance, the cost or weighting function, v, is:

$$v(x,y,z)=\min\{w(x,e)+w(y,e)+w(z,e) | e \text{ is one of } x,y,z\}.$$

Without the approach of the instant invention, to find the minimum edit distance for the three string condition of the present invention, it would be necessary to carry out computations which, in effect, represent the computation of distances for all cells within a three-dimensional lattice or matrix. Such a matrix is represented pictorially in FIG. 5. Under the present approach, however, that computational requirement is not present, as noted above, a page being considered as a string of lines and, a bounding approach being employed. For the latter purpose, a lower bound, d, is developed and, as well, a quickly computed upper bound, K. In the latter regard, it has been noted that mistakes in the output from OCR machines tend to be clustered within a few letters and certainly within a few lines. The fact that mistakes are local mistakes makes it possible to guess what edits are needed to correct the document. The upper bound approach achieves an estimate of the number of edits which would be needed. This approach lowers the number of computations required to a discrete diagonal region 104 of the lattice represented in FIG. 5. A somewhat hueristic approach is utilized in finding the upper bound value, or estimate of the number of edits needed. Under this algorithm, substrings, for example between string a and string b, are matched and an adjustment is made such that those matches do not invoke a transposition of characters. Then, substitutions are looked for and, finally, a somewhat simple calculation is carded out for the alignment distance. The alignment distance then is the tight upper bound on the minimum edit distance.

Figure 6:
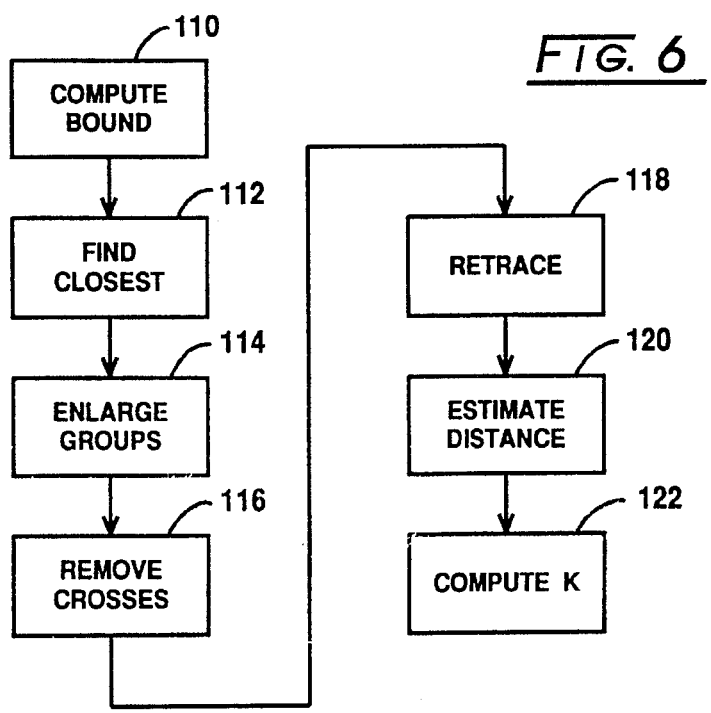
FIG. 6 is a generalized flow diagram for computing a bound value.

Referring to FIG. 6, a generalized flow diagrammatic representation of the process utilized in computing the upper bound is revealed. The procedure, as noted, may be employed with strings of lines or strings of characters. In the interest of providing more definition, it is described herein in terms of characters. The general routine is entered as represented at block 110 labeled "compute bound". From this entrance, the routine progresses to the procedure represented at block 112 labeled "Find Closest". This procedure represents the first step in estimating what the edit distance is to match groups of characters between strings. The groups initially are compared in terms of bigrams having an initial length, g. For each $a_i \ldots a_{i+g}-1$, the matching strings in $b_j+g-1$ closest to the same relative position in each string is found. If no matching string is found, g is reduced by 1 and the process is repeated until single character matching is attempted. This value (j–i) is stored in a shifts array (shifts [i]) of length m. For each $a_i$ with no corresponding match in B, shifts [i] is set to $\infty$. Referring momentarily to FIG. 7, an initial shifts array is revealed when matching two sample strings.

Returning to FIG. 6, the procedure then carries out a procedure labeled "Enlarge Groups" as represented at block 114. After the initial matching represented at block 112, a pass is made through the string to try to lengthen runs of shifts. Each shifts [i] (up to m–2) is compared with shifts [i+1], where m is the length of string A. If they are equal, but do not equal shifts [i+2], then shifts [i+2] is set equal to shifts [i] if $a_{i+2}$ equals $b_{shifts[i]+i+2}$. Looking momentarily to FIG. 8, the shifts array is revealed after lengthening the shifts. This type of extension is also done back from the point of finding two matching shifts, toward the start of the string.

Returning to FIG. 6, the procedure then carries out a sequence of steps labeled "Remove Crosses" as shown at block 116. With this procedure, the shifts array is put through an "uncrossing" routine which eliminates all overlaps, including two $a_i$'s pointing at the same $b_j$. When such a shift is found, the lengths of the runs of equal shifts are measured and resolved in favor of the one with the longest run, or when the runs are of equal length, the smallest shift. Resolution is obtained by setting the offending shift to $\infty$. Referring momentarily to FIG. 8, the lengthened shifts array is shown following an uncrossing procedure. Because there are now no transpositions, the arrows correspond to traces.

Returning to FIG. 6, the program then carries out a "Retrace" function as represented at block 118. The uncrossing routine leaves the shifts array in less than an optimal state, since no attempt to rematch the uncrossed elements has been made. To remedy this, another pass is made through the strings looking for substitutions. For each umatched character $a_i$, an exact match in B is sought which does not cross a current match. If no exact match is made, an optional partial matching is done. For this application, partial matches include common OCR errors, such as confusing the characters 1, 1, and !. If no match is found, a connection between dissimilar characters is made. Once the retrace function is carried out, then as represented at block 120, an edit distance is computed. This distance is calculated by making a single pass through the shifts array. Because of the way the shifts array is constructed, if i is the index of the source string A, then i+shifts [i] is the index of its mate in the target string B. These correspond to substitutions in the alignment. The characters to be deleted in the source string have corresponding shifts entries than the $\infty$ since they were not matched. The only thing left is to account for the characters inserted. Stretches of inserted characters are indicated by decreasing shifts entries: if shifts [i]<shifts [i+1] then characters $b_{i+shifts[i]} \ldots b_{i+1+shifts\ [i+1]}$ are inserted. Where the procedure is involved with a strings-of-lines situation, upper bounds are found on each pair of pages and combined to find a bound on the total alignment distance. Namely, bounds $K_{AB}$, $K_{BC}$, and $K_{AC}$:

$D(A,B) \leq K_{AB}$ $D(B,C) \leq K_{BC}$ $D(A,C) \leq K_{AC}$ yield $D(A,B,C) \leq \min (K_{AB}+K_{BC}, K_{AC}+K_{BC}, K_{AB}+K_{AC})$, so an upper bound is $$K = \min (K_{AB}+K_{BC}, K_{AC}+K_{BC}, K_{AB}+K_{AC}).$$

Returning to FIG. 6, the last procedure as noted above is the computation of the value, K as represented at block 122.

Figure 10A:
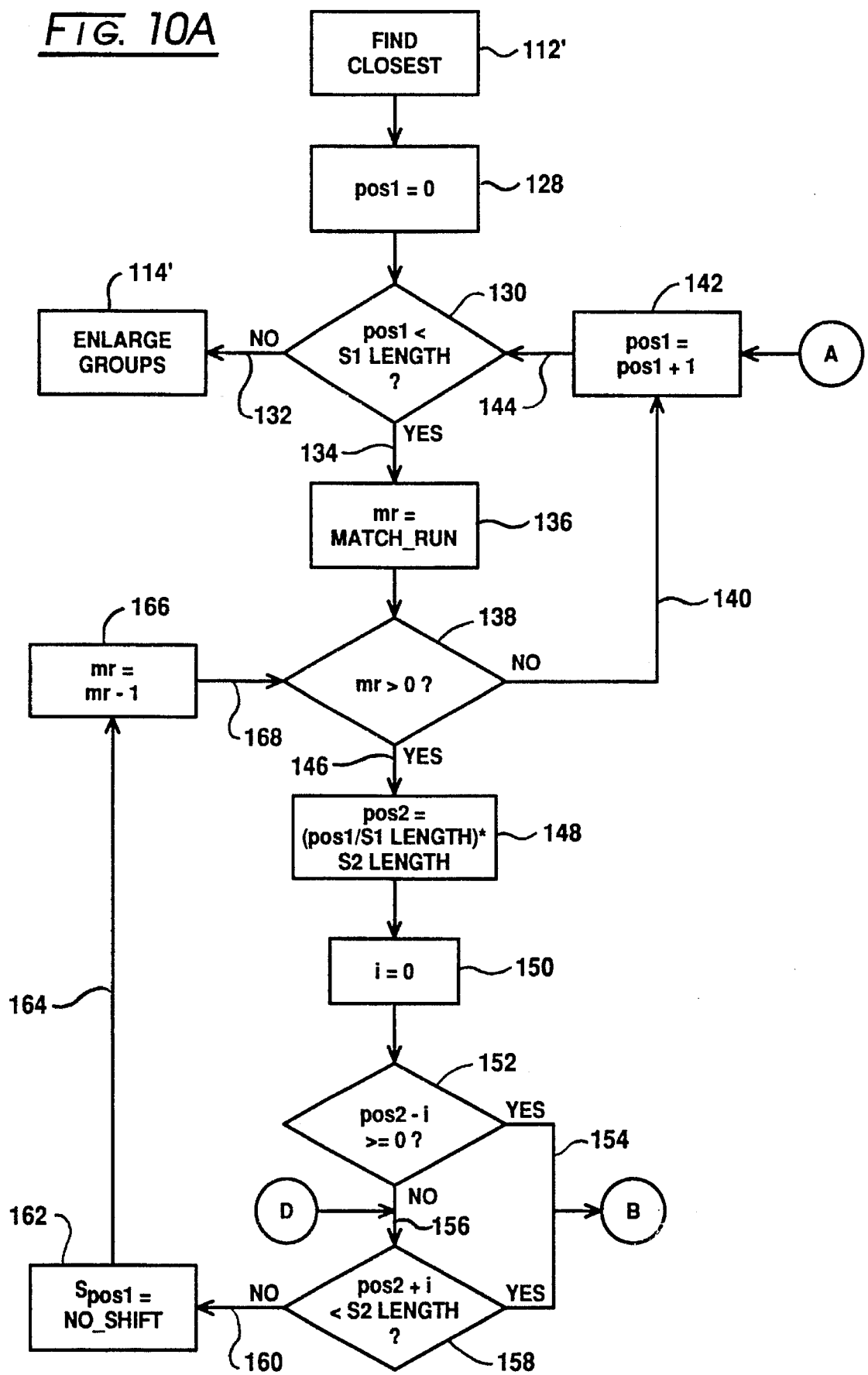
FIGS. 10A and 10B combine to provide a flow diagram of the routine identified as "Find Closest" described in FIG. 6.

Referring to FIG. 10A, an expansion of the "Find Closest" routine is revealed. This routine enters again with a primed representation of block 112 labeled "Find Closest" and proceeds as represented at block 128 to set the position, for example of a group of characters or diagram in a first string to an initial or zero value. This first string will be compared with a second one and the comparison procedure moves from left to right. Thus, for each position in the first string, an attempt is made to find a match in the second string. The routine then continues as represented at block 130 to ascertain whether it has reached the end of the first string. In this regard, determination is made as to whether the position in string 1 is less than the string 1 length. If it is not, then as represented at line 132 and block 114, where the end of the string is at hand, then the routine progresses to the "Enlarge Groups" procedure earlier described at block 114 and represented by the same primed numeration in the instant figure. Where the end of the string 1 has not been reached, then as represented by line 134 and block 136, a match run is made wherein the procedure looks for a match of a group of the first string to a group of characters of the second string. That group, as noted earlier, may be a two letter pair. The procedure then continues to the instruction represented at block 138. A determination is made as to whether a bigram match was made. In the event that it was, then as represented by line 140 and block 142, the next position in the first string is immediately gone to and the program continues as represented by line 144 leading to the inquiry at block 130. The match run in the commencement of this procedure will initially be of value 2 where bigrams are involved. Thus, for the first experience of this routine, the response to the inquiry at block 138 will be in the affirmative and the procedure will continue as represented at line 146 and block 148. Since it is appropriate to pick the most promising location in the second string, a position 2 for that string is elected as represented at block 148. In this regard, the position in the second string of length, S2, is elected in correspondence with the position elected in the first string. Accordingly, a ratio is developed of the location in the first string with respect to the length of the first string which is multiplied by the length of the second string. It may be noted that, a presumption is not made that the first string is of the same length as the second string.

The program then continues as represented at block 150 where the value, i, is set to zero. That term represents the "difference" from the initial position in the second string where the match inquiry commenced. The program then continues as represented by block 152 where a check is made to see whether the value i has gotten so large as to be at the end of the second string. Where the position 2 less the value i is greater than zero, then as represented by line 154 and node B, the run or procedure continues with respect to the second string. In the event that the determination at block 152 is in the negative, then as represented at line 156 and block 158, a determination is made as to whether the current position on the second string is still less than the second string length. If it is, then as represented at line 154, the procedure may continue. However, in the event of a negative determination, then as represented at line 160 and block 162, a determination is made that no matching or comparison was successful and the length of the runs will be reduced. In the latter regard, as represented at line 164, block 166, and line 168, the match run value is reduced by 1. For a bigram application wherein the match run initial value will have been 2, that value is reduced to 1 and a matching sequence then continues.

Referring to FIG. 10B, node B again reappears in conjunction with line 170 leading to the inquiry at block 172. The latter inquiry is the same as represented at block 152 in FIG. 10A, repeating a test that the program remains on the first string. In the event that it is not, then as represented at line 174 and node D, the program returns to the corresponding response at line 156. In the event of an affirmative determination, then as represented at line 176 and block 178, for the first iteration of the program, the value of "run" is set at zero. For a bigram form of match run determination, this value must reach a value of 2 to achieve a match situation. The program then continues to the inquiry at block 180 where a determination is made as to whether the value of run is less than the match run value, mr. This provides an indication that the system is still looking for a match, the value run being less than the match run value which initially is 2. In the event of an affirmative determination at block 180, then as represented at line 182 and block 184, a determination is made as to whether the system is still working within the boundaries of the second string. In this regard, as the value of run goes up, the comparison procedure moves to the right end of the second string. Where the inquiry at block 80 is in the affirmative, then as represented at block 182, a determination is made as to where the next character which a comparison in string 2 is located. If that character is on the position 1 string, then as represented at line 186 and block 188, an actual comparison of two characters is made. Where a comparison or a match is present, then as represented at line 190, block 192, and line 194, the run value is incremented by 1 and the routine loops to block 180. Where a negative determination is made with respect to block 188 that no match is made, then as represented at line 194 and block 196, a determination is made as to whether the value of run is equal to the match run value which was initially set to 2. In the same light, negative determinations at blocks 180 and 182 also will be directed to the inquiry at block 196 as represented at line 198.

In the event of an affirmative determination at block 196, then as represented at line 200 and block. 202, response is made to the finding of a match and a trace is set which is an array S having an integer value corresponding to each one of the positions in string 1. The value is set essentially to what offset is needed to match with the second string. The program then continues as represented at node A leading to block 42 in FIG. 10A. In effect, the routine, extending from block 172 to block 196 is looking for a match wherein the location index, i, is of a negative value and, in effect, a match position looking to the left of a given position is being carded out. The program then in very similar fashion, looks to possible match positions in the second string which are to the right of the location under consideration in the first string. It is desired that a match be located in the closest proximity between the two strings. Thus, the value run commences at a zero level.

Where the inquiry at block 196 is in the negative, then as represented at line 204 and block 206, a determination is made as to whether the position in string 2 looking to the fight is less than the length of the string S2. Where that is the case, then as represented at line 208 and block 210, the value of run is set to zero and as represented at block 212, a determination is .made as to whether the value of run is less than that of match run. In the event that it is, then as represented at line 214 and 216, a determination is made as to whether the position in string 2 under evaluation is still within string S2 and in the event that it is, then as represented at line 218 and block 220, an evaluation as to whether a match with the position of string S1 is present. In the event that it is, then as represented at line 222, block 224, and line 226, the value of run is incremented by 1. Where no match is found, then as represented at line 228 and block 230, a determination is made as to whether the value of run is equal to the match run value in similar fashion as the inquiry at block 196. In the event that it is, then as represented at line 232 and block 234, with the match, then the value is set in the S array to the offset and the program continues as represented at node A and block 142 in FIG. 10A wherein the position in string 1 is incremented by 1. Note that the test of block 230 also is carded out in the event of a negative response to the inquiry at block 206 as represented by line 236 and in the event of a negative response to the inquiry represented at blocks 212 and 216 as represented at line 220. Where a determination that the value of run is not equal to the match run value, as represented at line 240 and node C, the program returns to the corresponding node C in FIG. 10A resulting ultimately in a return to block 138 with a match run value diminished by 1.

Figure 10B:
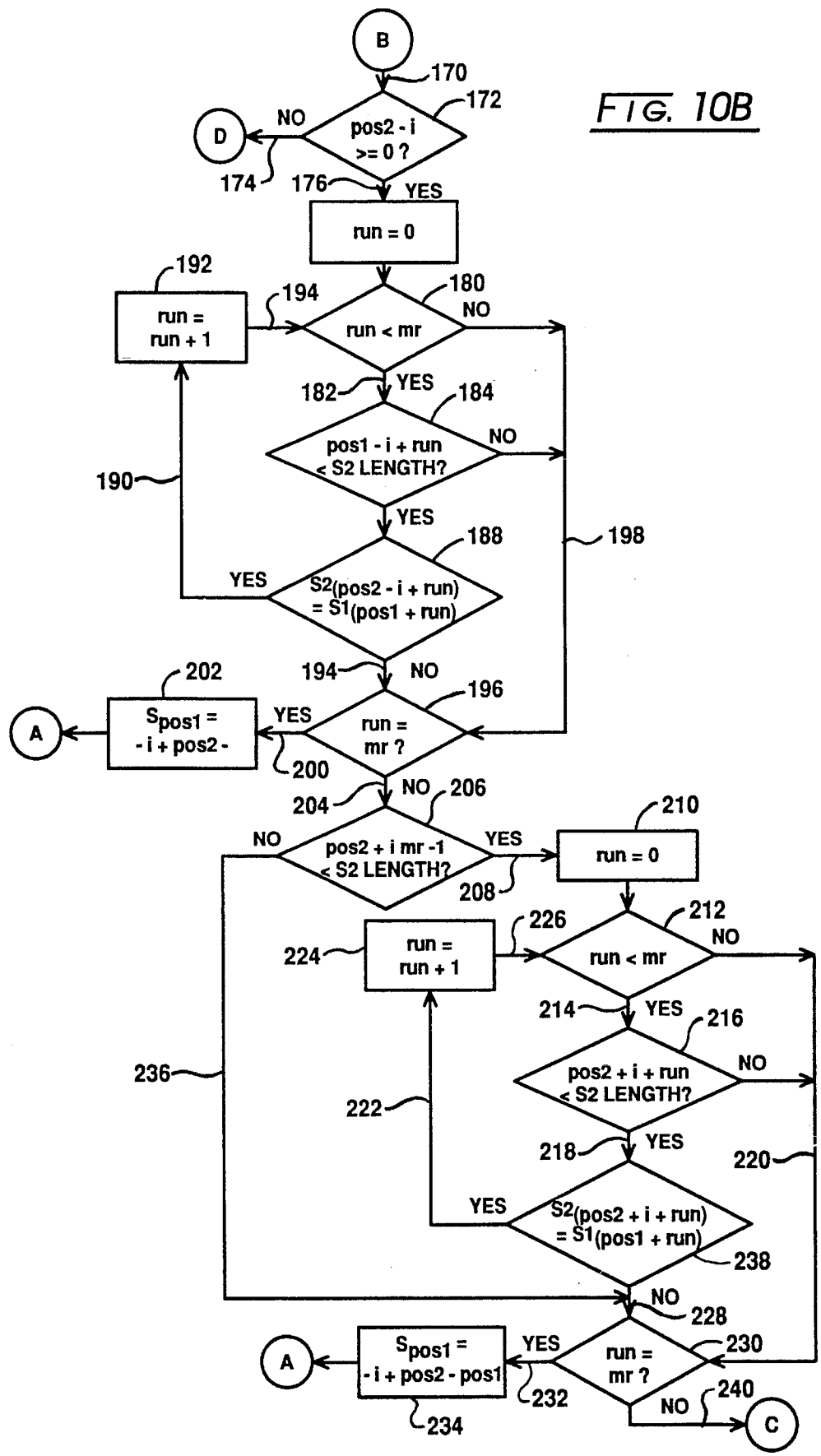
Figure 11A:
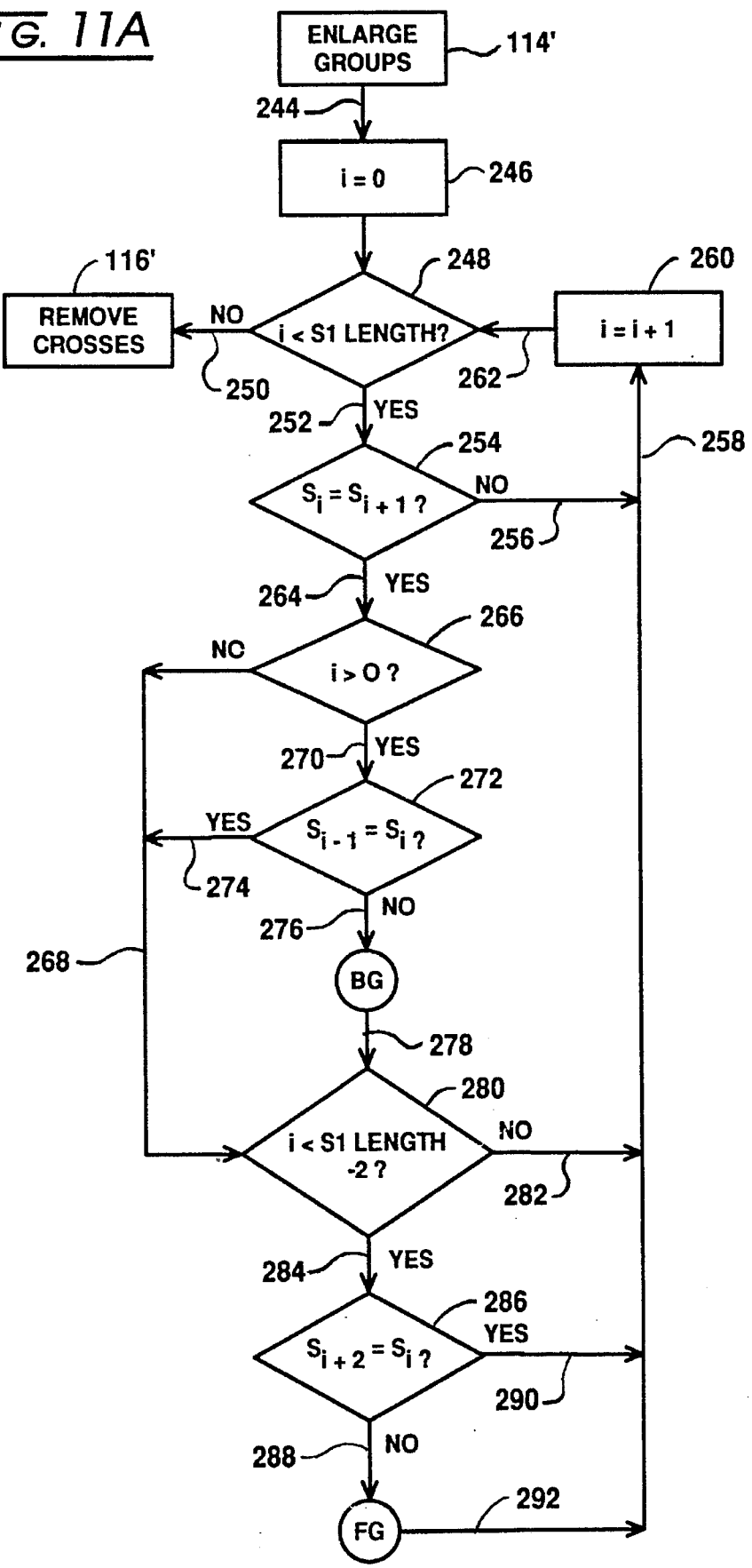
FIGS. 11A–11C combine to provide a flow diagram of a routine described in conjunction with FIG. 6 as "Enlarge Groups"
Figure 11B:
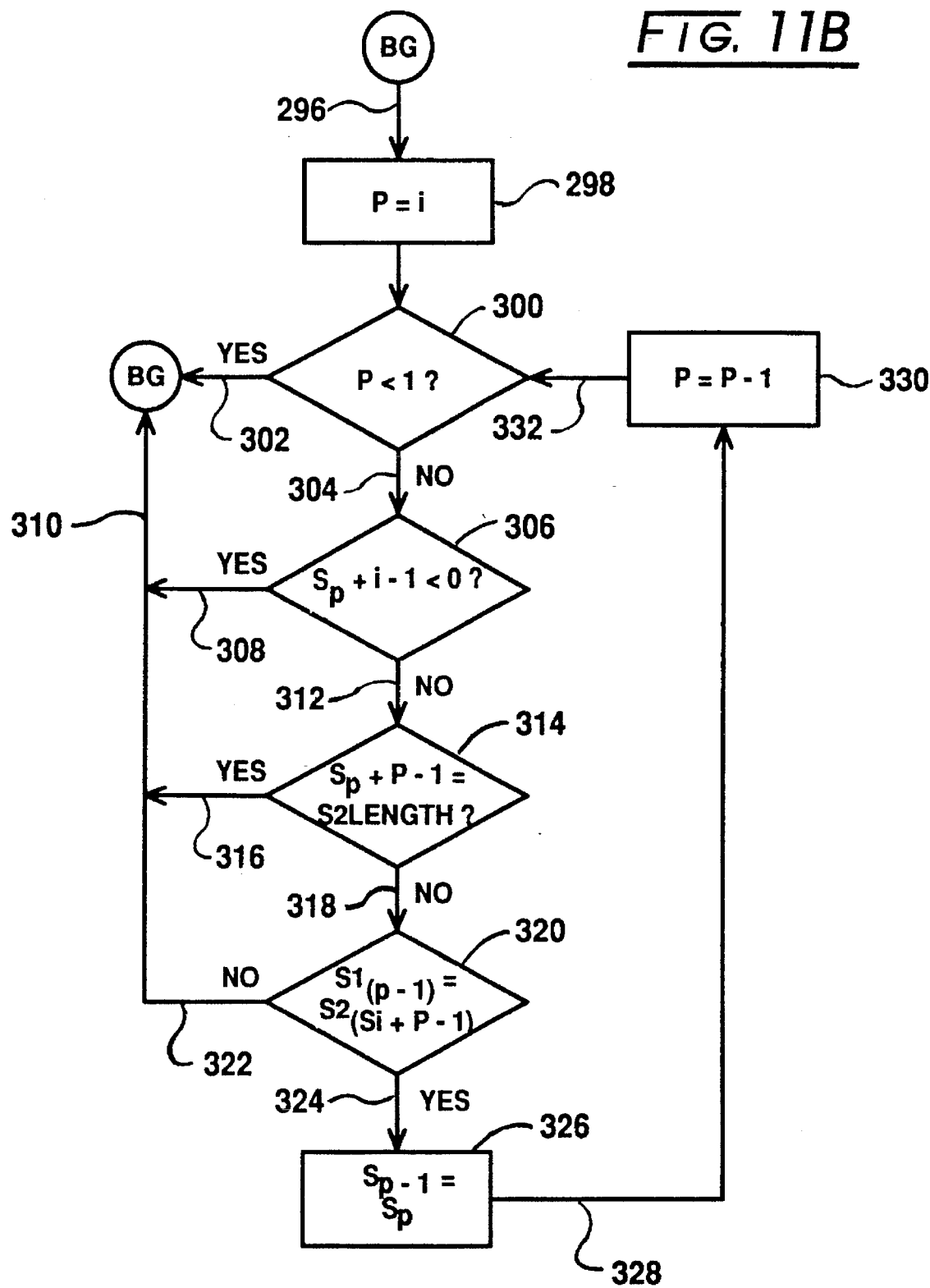
Figure 11C:
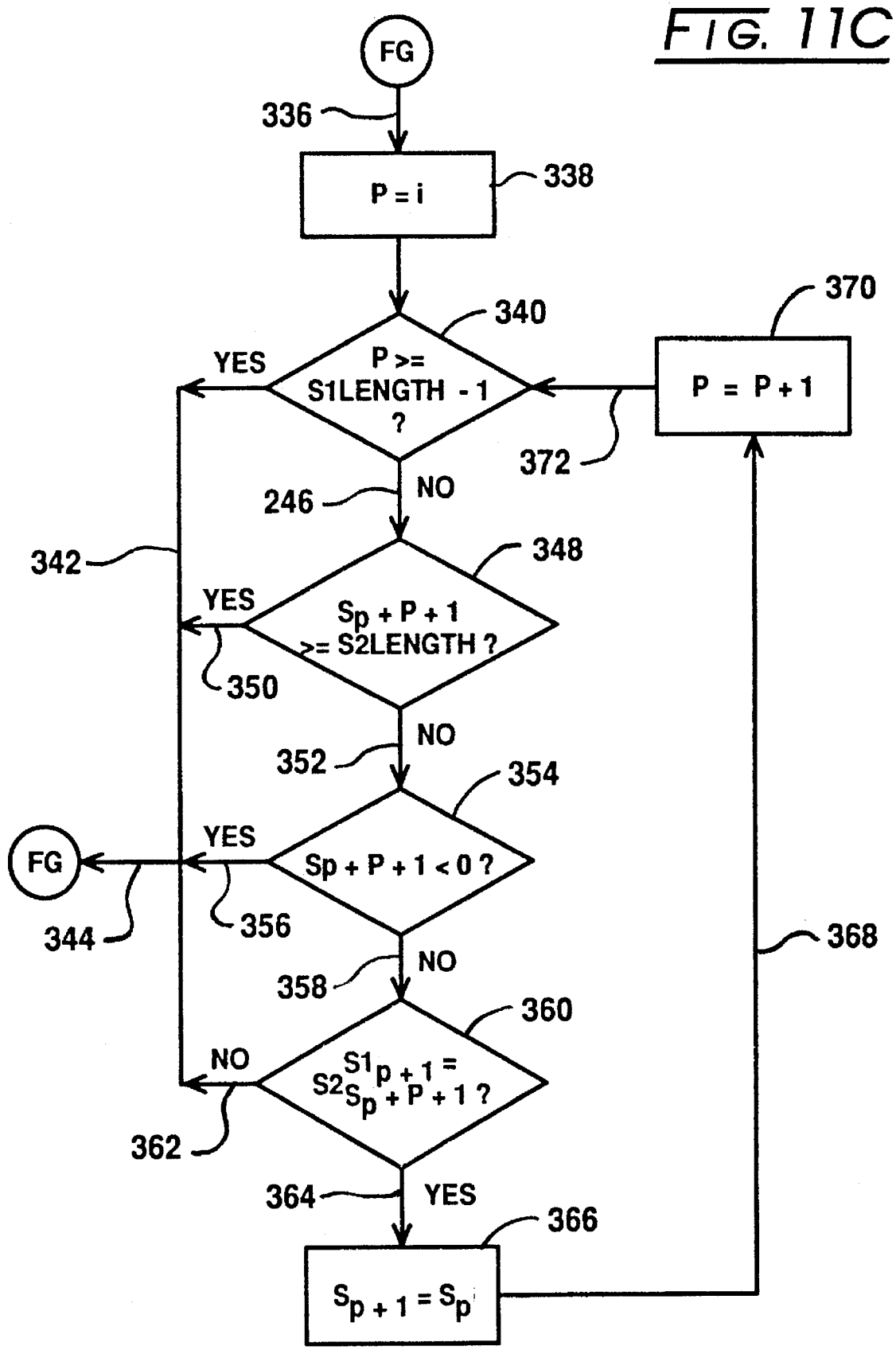

Looking to FIGS. 11A–11C, an expansion of the "Enlarge Groups" as discussed earlier in connection with block 114 in FIG. 6 is revealed. In FIG. 11A, block 114 is reproduced with primed numeration and the routine is seen to commence at line 244 and block 246 wherein the positional index, i, is set to zero. Following the setting-up of the S array as represented in FIGS. 10A and 10B wherein traces from string 1 to string 2 are evolved, then, under the present routine, an identification of as many parallel traces as possible is developed, as described in connection with FIG. 8. Some crosses may be generated in the course of the routine. Following the initialization represented at block 246, the program continues as represented at block 248 to determine whether the value i is less than the string 1 length. In this regard, the character positions themselves are extending from zero to i−1. In the event that the position is beyond the S1 string length, then as represented at line 250, the program continues to the next routine as earlier labeled "Remove Crosses", again represented by block 116 but in primed fashion. With an affirmative determination at block 248, then as represented at line 252 and block 254, a determination is made as to whether $S_i$ is equal to $S_{i+1}$. In the event of an equality, then the traces are parallel. Accordingly, with a negative determination, then as represented at lines 256, 258, block 260, and line 262, the value of i is incremented by 1 and the program loops to block 248.

Where a parallel trace determination is made in conjunction with an affirmative determination at block 254, then as represented at line 264 and block 266 a determination is made as to whether i is greater than 0. In the first pass through the program, a negative determination will be made and the routine drops to a lower instruction as represented by line 268. On the other hand, with an affirmative response, then as represented at line 270 and block 272, a determination is made as to whether the value in S at the position before the one currently being looked at equals the position the routine is now looking at, i.e. is $S_{i-1}$ equal to $S_i$. With an affirmative determination, then as represented at line 274, the program continues to a lower position as represented at line 268. However, in the event of a negative determination, there is a possibility for carrying out a correction. In effect, the routine finds a place where two parallel traces in a row have been located or are the same, but the position ahead of that is not the same. Where that is the case, then the routine jumps to a "back grow" routine as represented at line 276 and a node labeled "BG" described later herein in conjunction with FIG. 11B. Upon returning from the back grow routine, then as represented at line 278 and block 280, a determination is made as to whether i<S1 length−2. This determines whether the routine is completed or whether there remains room to the right of the current position for carrying out a "forward grow" routine as discussed in connection with FIG. 11C. Two positions are required for such a routine to become effective. Accordingly, in the event of a negative determination, then as represented at lines 282, 258, block 260 and line 262, the value of i is incremented by 1 and the routine is repeated. Note additionally, that line 268 is seen directed to the inquiry at block 280. With an affirmative determination at block 280, then as represented at line 284 and block 286, a check is made as to whether the values in the S array are equal. If they are not, then as represented at line 288, the routine progresses to a "forward grow" routine as represented by the node labeled "FG". With an affirmative response, then as represented at lines 290, 258, block 260, and line 262, the routine increments the value of i by 1 and continues. This same activity ensues following the return from the forward grow routine as represented at line 292.

Referring to FIG. 11B, the back grow routine is seen commencing with node, BG, and line 296. Under this routine, the program attempts to make a series of traces ahead of the group just found which are parallel with such group. Thus, the routine increments through a position now designated, p. As represented at block 298, that position is set equal to i which is the same i which the program is moving through the S array. As represented at block 300, where the value of p is less than 1, the routine, in effect, gives up and returns to node BG in FIG. 11A as represented by line 302. Where the position value, p, is not less than 1, then room is present ahead of that position and as represented at line 304 and block 306, a determination is made as to whether the S array actually has something within it at that point. Thus, if the value in the S array at that position $S_p+i-1<0$, no bigrams or single character matches will have been found and the routine returns as represented by lines 308 and 310 to the node position BG earlier represented in FIG. 11A. With a negative result at block 306, then as represented at line 312 and block 314, a determination is made as to whether there is room in string 2 to carry out a match. This is provided by evaluating the expression $S_p+p-1=S2$ length. Where no more room exists, then as represented at lines 316 and 310, the routine returns to the node BG in FIG. 11A. In effect, the determination at block 306 is one to evaluate whether the position is off the beginning of the string, while the determination of block 314 is to evaluate whether the position being evaluated is off the right side of the string. In the event of a negative determination at block 314, then as represented at line 318 and block 320, a determination is made as to whether the character at string 1 at that position is equal to the character at string 2. This is evaluated by the expression $S1(p-1)=S2_{(Si+p-1)}$. In the event of a negative determination at block 320, then as represented at lines 322 and 310, the routine returns to node BG in FIG. 11A. However, with the presence of a match, then as represented at line 324 and block 326, the value of Sp−1 is set to the value of Sp and the routine has successfully looked rearwardly or backwards and located a match.

As represented by line 328, block 330, and line 332, the routine then decrements the value of p by a value of 1 and carries out the same evaluation procedure.

Referring to FIG. 11 C, the forward grow routine is diagrammatically illustrated. The forward grow test is similar to the rearward grow test except in the present instance, the routine looks forwardly from a position or to the right to see whether matches are present. The routine is seen entered at node FG and line 336 leading to block 338. At this position, as before, a position, p, is set equal to i and the routine progresses to the inquiry at block 340. This inquiry determines whether or not the position is off the right hand of string 1 by looking to the expression p>=S1 length−1. In the event that is the case, then as represented at lines 342 and 344, the routine returns to node FG at FIG. 11A. With a negative determination at block 340, then as represented at line 346 and block 348, a determination is made as to whether the position is off the fight hand side of the second string. This is carried out with the expression $S_p+p+1>=S2$ length. In the event of an affirmative determination, then as represented at lines 350, 342, and 344, the routine returns to node FG in FIG. 11A. Where a negative determination is provided at block 348, then as represented at line 352 and block 354, a determination is made as to whether the position is off of the left hand side of the string under evaluation. This is carded out by evaluating the expression $S_p+p+1<0$. In the event of an affirmative determination, then as represented at lines 356, 342, and 344, the routine returns to node FB in FIG. 11A. With a negative determination at block 354, then as represented at line 358 and block 360, a comparison of the character in string 1 with the character in string 2 is made. This is carried out under the expression $S1_{p+1}=S2_{Sp+p+1}$. In the event of a negative determination, then as represented at lines 362, 342, and 344, the routine returns to node FG as represented at FIG. 11A. With an affirmative determination at block 360, a match is evolved and, as represented at line 364 and block 366, the trace is set in array S as represented by the expression $S_{p+1}=S_p$. The routine then goes forward to the next character as represented by line 368, block 370, and line 372.

The routine then progresses to carry out the same test of the string pair.

Figure 12A:
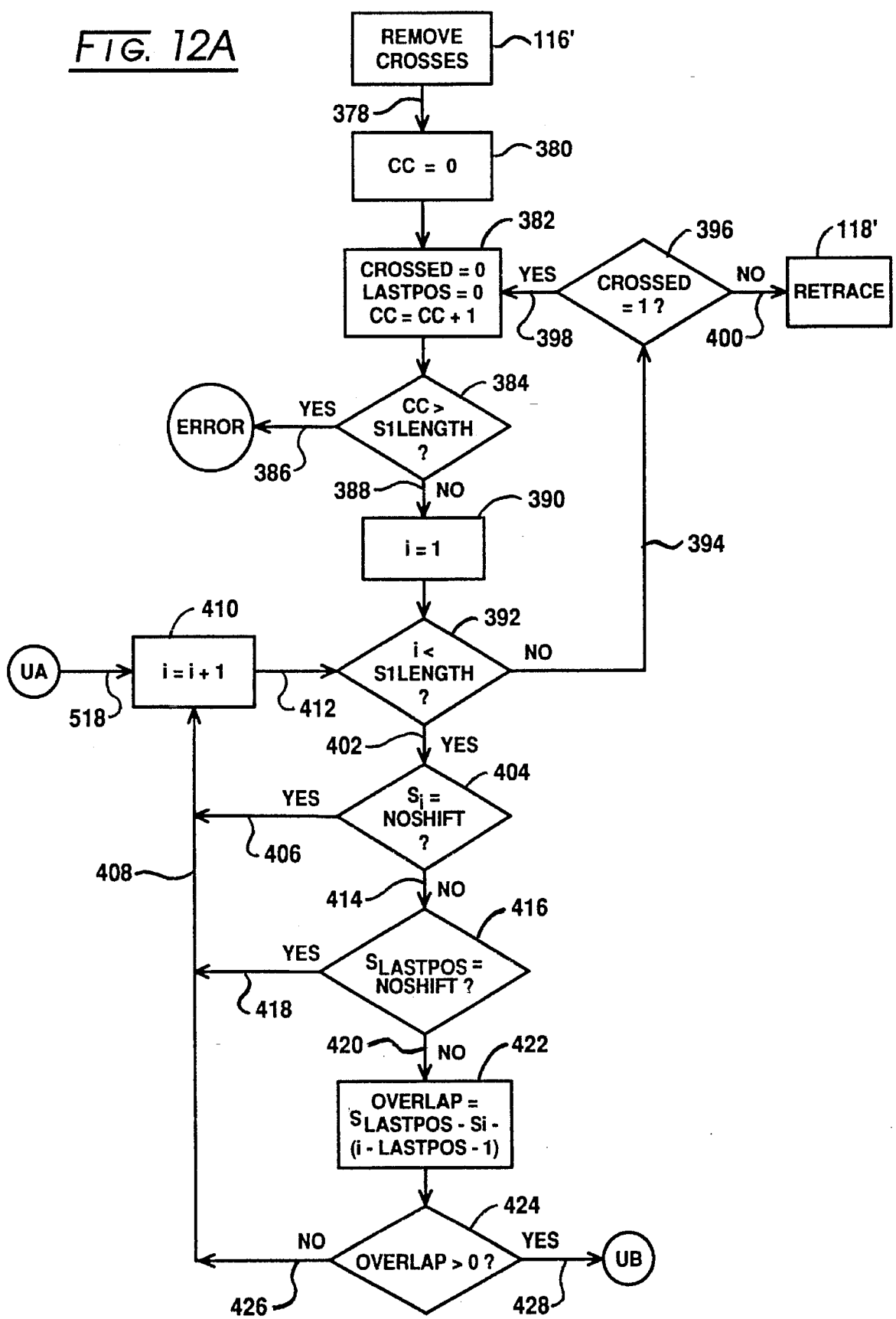
FIGS. 12A–12C combine to provide a flow diagram of a routine referred to in FIG. 6 as "Remove Crosses"
Figure 12B:
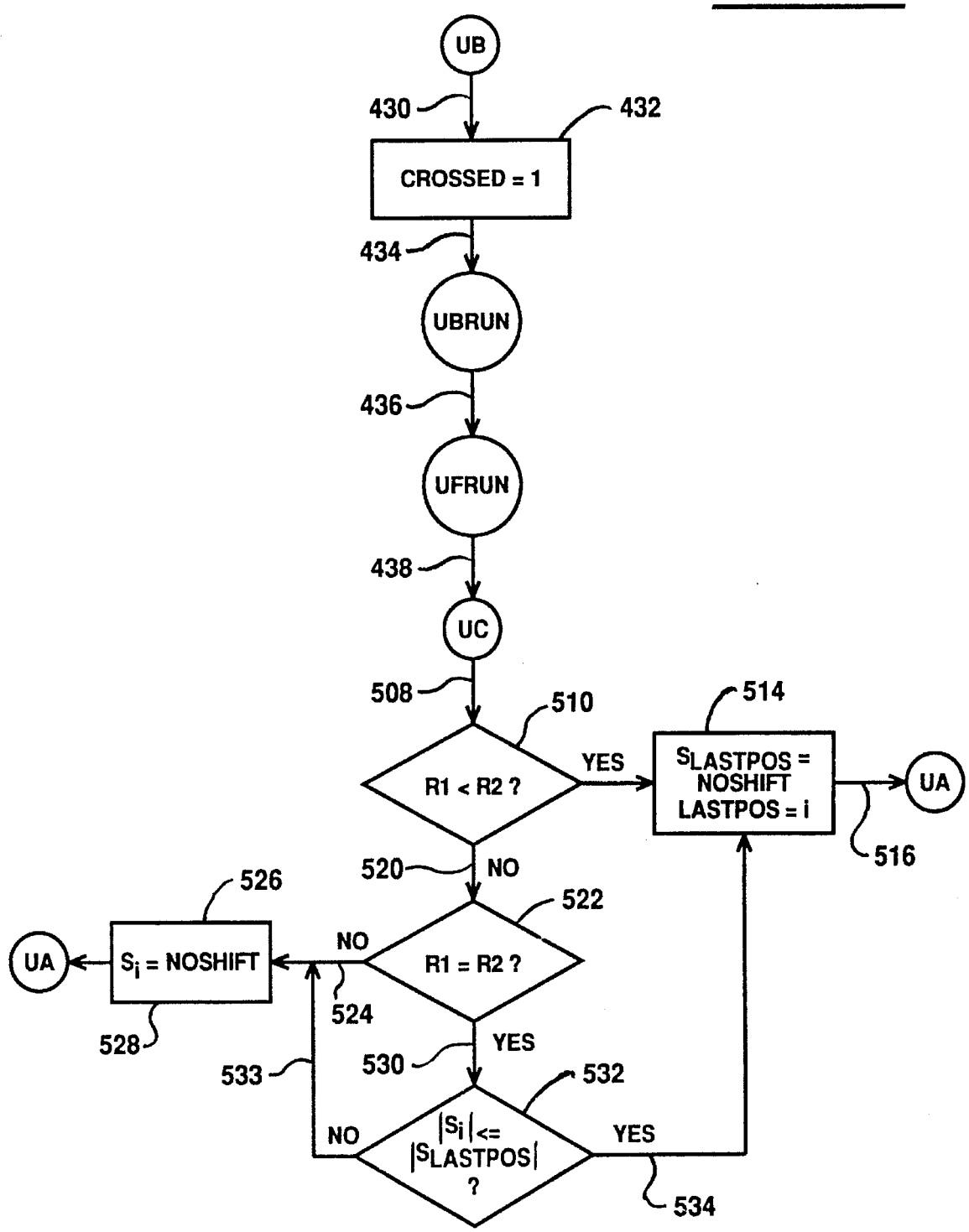
Figure 12C:
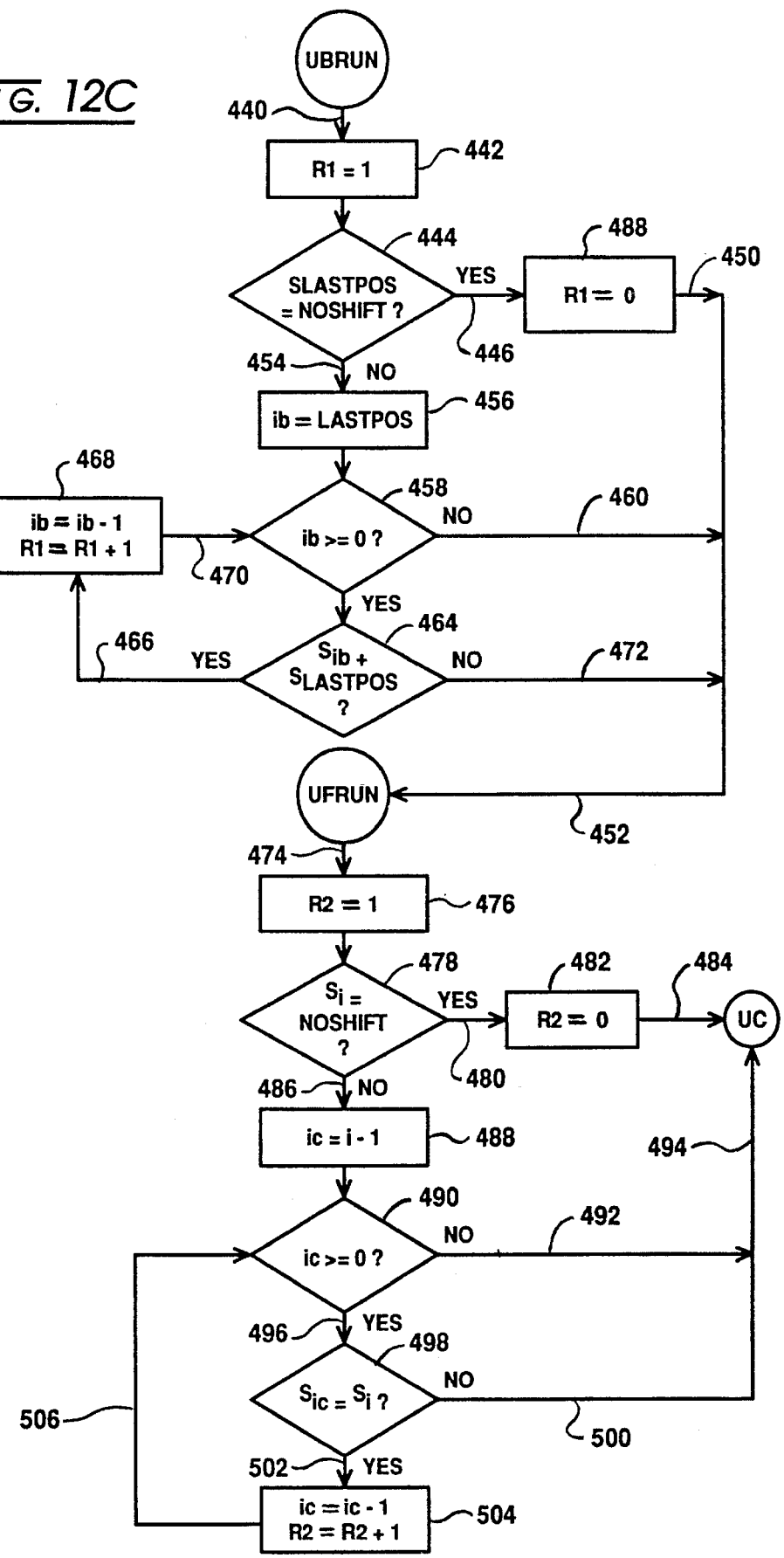

Referring to FIGS. 12A–12C, the "Remove Crosses" routine described in connection with FIG. 6 is represented in expanded form. The routine is entered as represented by the same but primed numeration represented in FIG. 6 as at 116' and line 378. Line 378 is directed to block 380 where a variable cc is set to 0. This variable will increment through all positions in the first string much in the manner of the positional index i above. Next, as represented at block 382, variables are set, for example the variable "crossed" is set to zero; the variable "last pos" is set to zero, and the variable "cc" is set to cc+1. Then, as represented at block 384, a determination is made as to whether cc is greater than the string 1 length. In the event that it is, then an error is indicated as represented at line 386 and the node labeled "error". This indicates that essentially no uncrossed procedure could be carried out and the routine is exited. With the presence of a negative determination at block 384, then as represented at line 388 and block 390, the position index i is set equal to 1 and, essentially immediately, a test is carded out as represented at block 392 to determine whether the value of i is less than the string S1 length. In the event of a negative determination, then as represented at line 394 and block 396, a determination is made as to whether a crossed condition was found. In the event that it was, then as represented at line 398, the routine continues as represented at block 382. On the other hand, a negative determination at block 396 calls for a progression to the next or retrace routine of FIG. 6 earlier shown at 118 and shown in the instant drawing at block 118'.

Returning to block 392, in the event of an affirmative indication, then as represented at line 402 and block 404, a determination is made as to whether the position in string 1 has not been linked up with a position in string 2. If that is the case, then as represented at lines 406, 408, block 410, and line 412, the value i is incremented by 1 and the routine continues from block 392. In the event of a negative determination at block 404, then as represented at line 414 and block 416, a determination is made as to whether the S array last position is a no shift. If that is true, then as represented at lines 418 and 408, the value i is incremented as represented at block 410 and the routine cycles as represented at line 412 and block 392. In the event of a negative determination at block 416, then as represented at line 420 and block 422, there is a value in the S array which can be utilized and thus a value "overlap" is set at the extent of crossing involved. The value is shown as $S_i-(i-last\ pos-1)$. Then, as represented at block 424, a determination is made as to whether overlap is greater than zero. If it is not, then there is no overlap and the routine progresses as represented at lines 426, 408, and block 410 to increment the value i. Where that overlap is greater than zero, then as represented at line 428, the routine progresses as represented by node UB.

Referring to FIG. 12B, the node UB reappears in conjunction with line 430 leading to block 432. The latter block 432 indicates that a cross condition is present by being set to 1 and the program then seeks to determine the number of parallel traces found before. If a given sequence of such parallel traces is longer than another, then the program will prefer the longer. From block 432 as represented at line 434, the routine reverts to a node labeled UBRUN and then as represented at line 436, it reverts to a node labeled UFRUN. From the node UFRUN, a line 438 is seen to be directed to a node labeled UC which represents a return to the instant flow diagram. These nodes look for runs or numbers of parallel traces first to the left and then to the right of a position within the S array. Turning momentarily to FIG. 12C, the node UBRUN again is reproduced in conjunction with line 440 leading to block 442 where an indexing variable or position variable are set to 1. Then, as represented at block 444, a determination is made as to whether the array last position ($S_{last\ pos}$) of the array is a no shift condition as earlier described, indicating that no group was found. If the determination of block 444 is in the affirmative, then as represented at line 446 and block 448, the value of R1 is set to zero and as represented at lines 450 aand 452, node UFRUN is accessed in an endeavor to search for a parallel run to the right of the instant location.

Where the inquiry at block 444 is in the negative, then as represented at line 454 and block 456, the value ib is set to the last position within the array and, as represented at block 458, a test is made to determine whether the value ib is greater than zero. Where that is the case, the position at hand is within the string. Accordingly, with a negative determination, as represented at lines 460 and 452, the routine reverts to node UFRUN. However, with an affirmative determination at block 458, as represented at line 462 and block 464, a check is made to see whether the values in the two S arrays match up. If they do, as represented at line 466 and block 468, then the value ib is decremented by 1 and the value R1 (Run left) is incremented by 1. This indicates that another parallel condition has been found and, as represented at line 470 leading to block 458, that procedure continues until no more parallel conditions are found, whereupon the routine progresses to the node UFRUN as represented by lines 2 and 452.

As indicated earlier, the routine following the node labeled UFRUN computes a value R2 (Run fight) representing how many of the values in the S array are parallel to the position under investigation. Essentially, the test is the same as that carded out in conjunction with the node labeled UBRUN except the program looks to the fight in the strings under investigation. Extending from the node labeled UFRUN is line 474 extending to block 476 wherein the value R2 or run fight is set to 1. The program then looks to the inquiry at block 478 determining whether the array position $S_i$ is a no shift. No shift in this case means that at this point in the string there is no connection to anywhere in a string S2, i.e. there is no crossing. Accordingly, with an affirmative response, as represented at line 480 and block 482, the value R2 is set to zero and as represented at line 484 the program or routine reverts to the node labeled UC. In the event of an affirmative response to the inquiry at block 478, then as represented by line 486, and block 488, indexing value ic is set equal to i−1 or the last position. Then, as represented at block 490, a test is made to assure that the value of ic represents a position within the string. If it does not, then as represented at lines 492 and 494, the routine reverts to node UC and FIG. 12B. In the event of an affirmative response to the inquiry at block 490, then as represented at line 496 and block 498, a test is made as to whether the values of the two S arrays match up utilizing the expression $S_{ic}=S_i$. In the event they do not, then as represented at lines 500 and 494, the routine reverts to node UC at FIG. 12A. In the event the inquiry at block 498 is in the affirmative, then as represented at line 502 and block 504, the value of ic is decremented by 1 and the value of run fight or R2 is incremented by 1. Then, as represented by line 506, the routine continues the procedures at blocks 490, 496, and 504.

Returning to FIG. 12B, line 438, as indicated above, leads to the node labeled UC. At this juncture, the longest run is the value which will be employed, i.e. either R1 or R2. Accordingly, a line 508 is seen directed from the node labeled UC which is directed to block 510. At this position, a determination is made as to whether the value R1 is less than the value of R2. In the event of an affirmative determination, then as represented at line 512 and block 5 14, the value in the array of the last position is set to a no shift or zero value. The program then reverts as represented at line 516 to node UA which appears in FIG. 12A in conjunction with line 518 leading to block 410.

Returning to FIG. 12B, in the event of a negative determination to the inquiry at block 510, then as represented at line 520 and block 522, a determination is made as to whether the run left value, R1, is equal to the run fight value, R2. In the event that it is not, then as represented at line 524 and block 526, the value $S_i$ is set to a no shift or zero value and, as represented at line 528, the routine reverts to node UA seen in FIG. 12A in conjunction with line 518. On the other hand, with an affirmative response to the inquiry at block 522, then the value of R2 is less than R1 so, as represented at line 530 and block 532, the absolute value of $S_i$ is tested with respect to the absolute value of the last position within the array. In the event of a less than or equal condition, then as represented at line 534 and block 514, the S last position is set to a no shift and the last position is set as i. For a negative determination at block 532, the program is directed to line 524 as represented at line 533. The routine then reverts, as represented at line 516 and the node labeled UA to the corresponding node in FIG. 12A. Returning to FIG. 12A, once the remove crosses routine has reiterated to a point where the value "CROSSED" is zero, the program reverts to the retrace routine as represented in the figure at block 118'. It may be observed that the Remove Crosses routine does not actually link characters up between string 1 and string 2. By contrast, the routine eliminates links between these strings where there is a crossing, thus there will be gaps in the traces between the strings.

Figure 13A:
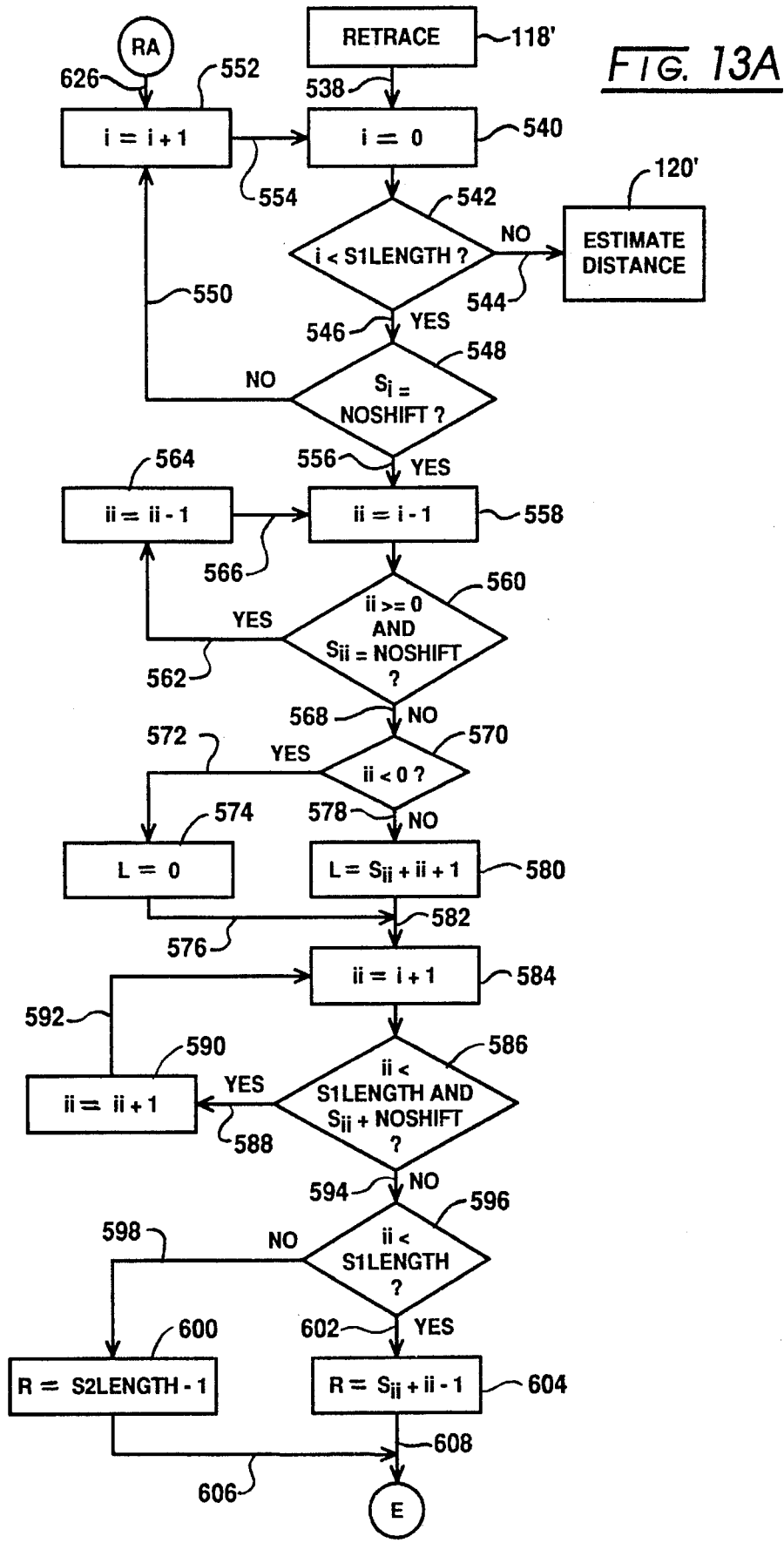
FIGS. 13A and 13B combine to provide a flow diagram described in conjunction with FIG. 6 as a "Retrace"
Figure 13B:
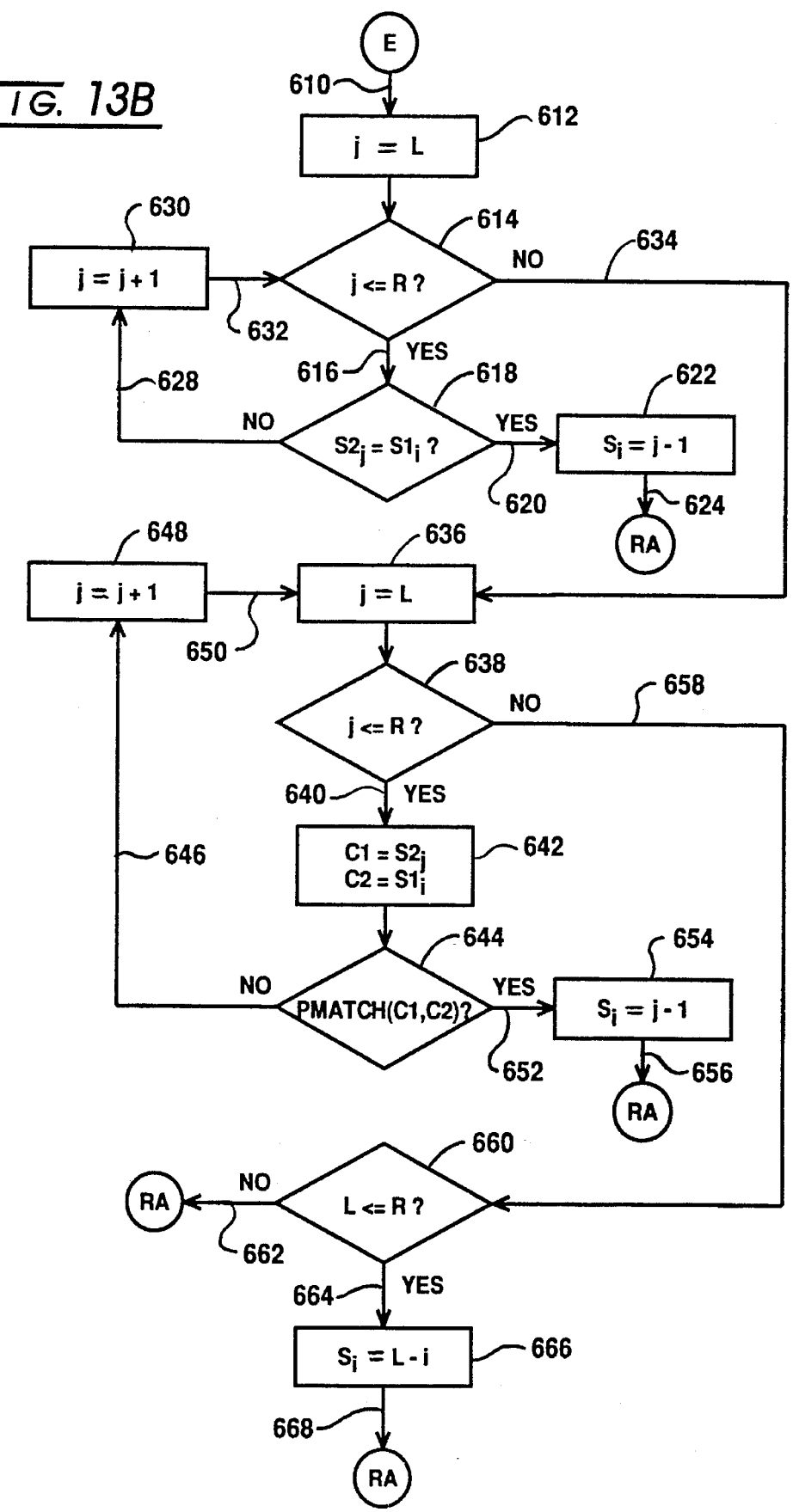

Referring to FIGS. 13A and 13B, the main routine for carrying out the retrace function represented at block 118 in FIG. 6 is revealed. The retrace block again is represented in FIG. 13A with the same numeration in primed fashion and is seen to direct entry into the routine via line 538 which leads to block 540. In effect, the routine looks to the left and to the right of a given character position for connections. At block 540, the positional index i is set to zero as the preliminary activity in carrying a looping activity through string 1. Following the setting of index, i to 0, as represented at block 542, a test is made as to whether the index value i is less than the length of string S1. If it is not, then as represented at line 544, the routine progresses to the next main routine identified as "Estimate Distance" and represented by the same numeration in this figure as in FIG. 6 but in primed fashion at 120'. Where the value i is within the S1 string length distance, then as represented at line 546 and block 548, a determination is made as to whether the value of $S_i$ is not connected. In the event of a negative determination then the value is connected and, as represented at line 550 and block 552, the value of i is incremented by 1 and a next position is looked for as represented by the continuing line 554.

Where the inquiry at block 548 shows that there is no connection, then as represented by line 556 and block 558 the positional index ii is set to a value of i−1 in preparation for seeking a connection with that position which is toward the left of the string. The routine then progresses to the inquiry at block 560 wherein a determination is made as to whether the positional index ii is equal to or greater than zero and whether the array position $S_{ii}$ is a no shift. In the event that test is true, then as represented at line 562 and block 564, the value for ii is decremented and the routine continues as represented at line 566 which, in turn, is directed to block 558.

Where a negative determination is made in connection with the test at block 560, then as represented at line 568 and block 570, a test is made as to whether the position index ii is less than zero. In the event that it is, then as represented at line 572 and block 564, the left index, L, is set to zero and the routine continues as represented at line 576. Where a negative determination is made with respect to the test at block 570, then as represented by line 578 and block 580, the value of L is set to $S_{ii}+ii+1$ which provides a position in the second string which is furthestmost to the left. The routine then continues as represented at lines 582 and 576 to block 584 where the positional indexing value ii is set to i+1 which represents an instruction of opposite directional correspondence, for example with block 558. The routine then continues to the test at block 586 which may be seen to be similar to the test at block 570 but again differing in a directional sense. At block 586, a determination is made as to whether the value ii is less than the string S1 length and whether the array position Sii is a no shift or no connection position. In the event the test is true, then as represented by line 588 and block 590, the positional index ii is incremented by 1 and as represented by line 592 the program loops to block 584. In the event of a negative determination of the test at block 586, then as represented by line 594 and block 596, a test is made to determine whether the value ii is less than the string S1 length. In the event of a negative determination, then as represented at line 598 and block 600, the value of R is set to the string S2 length less 1. Similarly, in the event of an affirmative determination at block 596, as represented at line 602 and block 604, the value of R is set to $S_{ii}+ii-1$. At this juncture in the program, a determination is made as to how far to the left and how far to the fight an examination into string 2 can be made to seek comparisons. The routine then continues as represented at lines 606 and 608 which are seen directed to node E.

Looking to FIG. 13B, node E reappears in conjunction with lead in line 610 which is directed to block 612 providing for the setting of positional index j to a value L. From block 612, the routine progresses to the inquiry at block 614 wherein a determination is made as to whether the index j is less than or equal to the value of R, the approach not permitting looking past the value of R and it will be seen that the value of j will be incremented until a match is found or no further positions are available for comparison. Thus, with an affirmative response to the test posed at block 614, then as represented at line 616 and block 618, a determination is made as to whether a string match is present. In the event that test is true, then as represented by line 620 and block 622, the value is set in $S_i$ and, as represented by line 624 and a node labeled RA, the routine continues to progress through the string, the corresponding node labeled RA being present in FIG. 13A in conjunction with line 626. If no match is found in conjunction with the test at block 618, then as represented at line 628 and block 630, the index j is incremented by 1 and as represented as line 632, the routine returns to the test at block 614. Where the test at the latter block results in a negative or false determination, then the jth character position of string S2 will not have been equal to the ith character position of string S1. The routine then progresses as represented by line 34 and block 636 where the positional index j is set equal to L. While the routine will move from L to R once more, in the present sequence of events, the program looks for a partial match which is described in detail in conjunction with FIG. 14. In this regard, the program or routine will have looked from L to R for an exact match such that a trace can be drawn between string 1 and string 2. Failing that, the routine looks from L to R for a partial match, a designed bias in the routine looking for some form of connection. Following the instructions at block 636, the routine progresses to a test at block 638 determining whether the positional index j is less than or equal to R. In the event that the test is true, then as represented at line 640 and block 642, characters are extracted from the S1 and S2 strings as represented by the designators C1 and C2. The routine continues then to determine whether a partial match is present between C1 and C2. In the event that no such partial match is present, then as represented at line 646 and block 648, the index j is incremented by 1 and as represented by line 650, the routine returns to block 636.

Where a partial match has been found in conjunction with the test represented at block 644, then as represented by line 652 and block 654, the trace in $S_i$ is set to j−1 and, as represented at line 656 and a node labeled RA, the routine returns to the correspondingly labeled node in FIG. 13A and proceeds as represented by line 626. As may be noted, exact matches are provided a first priority in the analysis and if they cannot be found, then the first partial match found is taken.

Returning to block 638 and FIG. 13B, where the value of J is not less than or equal to R, then as represented at line 658 and block 660, a determination is made as to whether L is greater or less than the value of R. If it is not, then as represented at line 662, the routine returns to the node labeled RA as represented in FIG. 13 re-entering the routine at line 626. Where the test posed at block 660 is in the affirmative or true, then as represented by line 664, the trace in $S_i$ is set to L−i and as represented at line 668, the routine returns, as before, to the node labeled RA appearing in FIG. 13 in conjunction with line 626.

Figure 14:
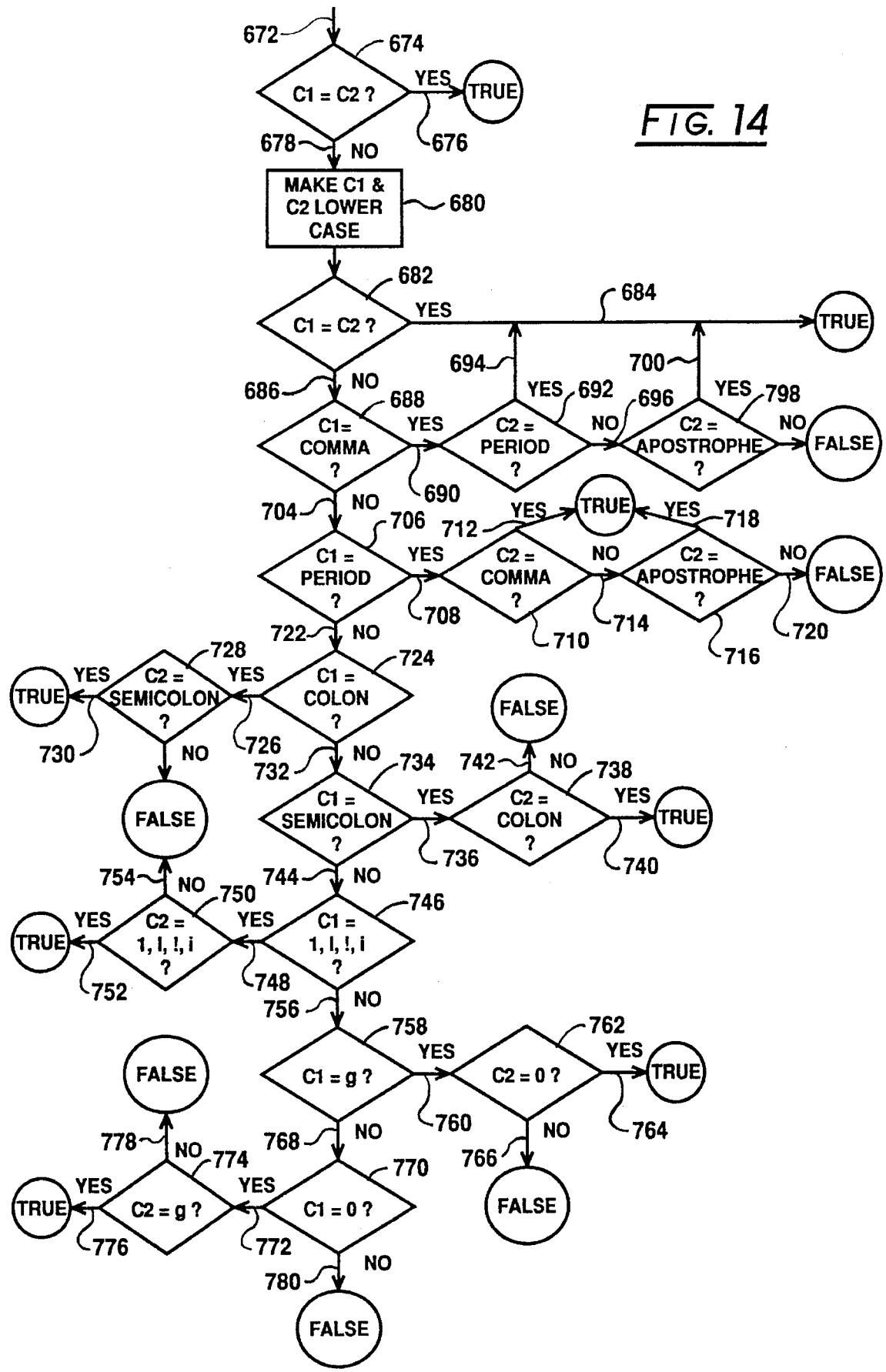
FIG. 14 is a flow diagram of a partial match routine employed with the retrace routine of FIGS. 13A and 13B.

Referring to FIG. 14, the partial match routine discussed in connection with block 644 in FIG. 13B is expanded. This routine is seen entered at line 672 which is directed, in turn, to the inquiry at block 674 determining whether the character designator c1 is equal to that at c2. Thus, a check is made to determine if those two characters are exactly the same. If they are, then as represented at line 676, a true indication of a full match is provided to the routine. Where the test posed at block 674 is false, then as represented at line 678 and block 680, both of the characters represented by designators c1 and c2 are made lower case. This facilitates or makes easier the comparison to follow. For example, a "I" and a lower case "i" when compared would constitute a partial match. These are common errors made by OCR devices. Similar considerations can be made with commas, periods, and apostrophes. In effect, the routine attempts to treat commas, periods, and apostrophes as the same character. Any combination of those is resolved with the procedure as a true partial match. Other common mistakes will be seen to be treated similarly.

Following the making of c1 and c2, then as represented at block 682, a determination again is made as to whether c1 is equal to c2. If a true condition results, then as represented at line 684 and the true node, a partial match is considered to exist. Where the test at block 682 is in the negative, then as represented at line 686 and block 688, a determination is made as to whether c1 is a comma. If that test is true, then as represented by line 690 and block 692, a determination is made as to whether c2 is a period. In the event the test is true, then as represented at lines 694 and 684, a true addition for partial matching is provided as represented by the node associated with the latter line. Where the test at block 692 is false, then as represented at line 696 and block 698, a determination is made as to whether c2 is an apostrophe. If that test is true, then as represented by lines 700 and 684, a partial match is considered to exist. Correspondingly, as represented by line 702 and the node labeled "false", where c2 is not an apostrophe, then no partial match is considered to exist.

Returning to block 688, a test then is made as to whether the character designated as c1 is a period. In the event that the test is true, then as represented at line 708 and block 710, a determination is made as to whether the character c2 is a comma. In the event that it is, then as represented by line 712 and the node labeled "true", a true condition for partial match is published. Where the test at block 710 is false, then as represented at line 714 and block 716, a determination is made as to whether the character represented at c2 is an apostrophe. In the event of a true condition for the test, then as represented at line 718 an d the node associated therewith labeled "true", a partial match is considered to exist. Correspondingly, as represented at line 720 where the test at block 716 is false, then no partial match is considered to be present as represented by the node labeled "false".

Returning to block 706, where the test posed thereat is in the negative, then as represented at line 722 and block 724, a determination is made as to whether the c1 character is a colon. In the event that it is, then as represented at line 726 and block 28, a determination is made as to whether the character represented by c2 is a semicolon. Where that test is true, then as represented at line 730 extending to a node labeled "true", a partial match is considered to exist. Returning to block 724, where the test posed thereat provides a false response, then as represented at line 732 and block 734, a question is posed as to whether the character represented by c1 is a semicolon. In the event that it is, then as represented by line 736 and block 738, the query is posed as to whether the character represented by c2 is a colon. In the event that it is, then as represented at line 740 and the node labeled "true" a partial match is considered to exist. Correspondingly, where the test posed at block 738 results in a false determination, then as represented at line 742 and the node labeled "false" a partial match is not considered to exist. Returning to block 734, where the character represented by c1 is not a semicolon, then as represented at line 744 and block 746, a determination is made as to whether c1 represents any of the characters 1, 1, ! , or i. In the event of an affirmative response, then as represented at line 748 and block 750, a determination is made as to whether the character represented by c2 is a 1, an l, an ! or an i. In the event that it is one of those listed, then as represented by line 752 and the node labeled "true", a partial match is considered to exist. Where the determination made at block 750 is in the negative, then as represented at line 754 and the node labeled "false", a partial match is not considered to exist.

Returning to block 746, where the result of the test made therein is in the negative, then as represented at line 756 and block 758, a determination is made as to whether the character designated at c1 is a lower case g. In the event that it is, then as represented at line 760 and block 762, a test is made as to whether the character represented at c2 is a small o. With an affirmative determination, as represented at line 764 and the node labeled "true", a partial match is considered to exist. Correspondingly, with a negative determination in conjunction with the query at block 762, as represented at line 766 and the node labeled "false", no partial match is considered to exist.

Returning to block 758, where the determination made therein is in the negative, then as represented at line 768 and block 770, a determination as made as to whether the character represented at c1 is an o. In the event that it is, then as represented at line 772 and block 774, a determination is made as to whether the character represented at c2 is a g. In the case it is, then as represented at line 776 and the node labeled "true", a partial match is considered to exist. Conversely, with a negative determination at block 774, as represented at line 778 and the node labeled "false" a partial match is not considered to be present. Similarly, where the determination at block 770 is in the negative, then as represented at line 780 and the node labeled "false", a partial match is not considered to be present.

Figure 15:
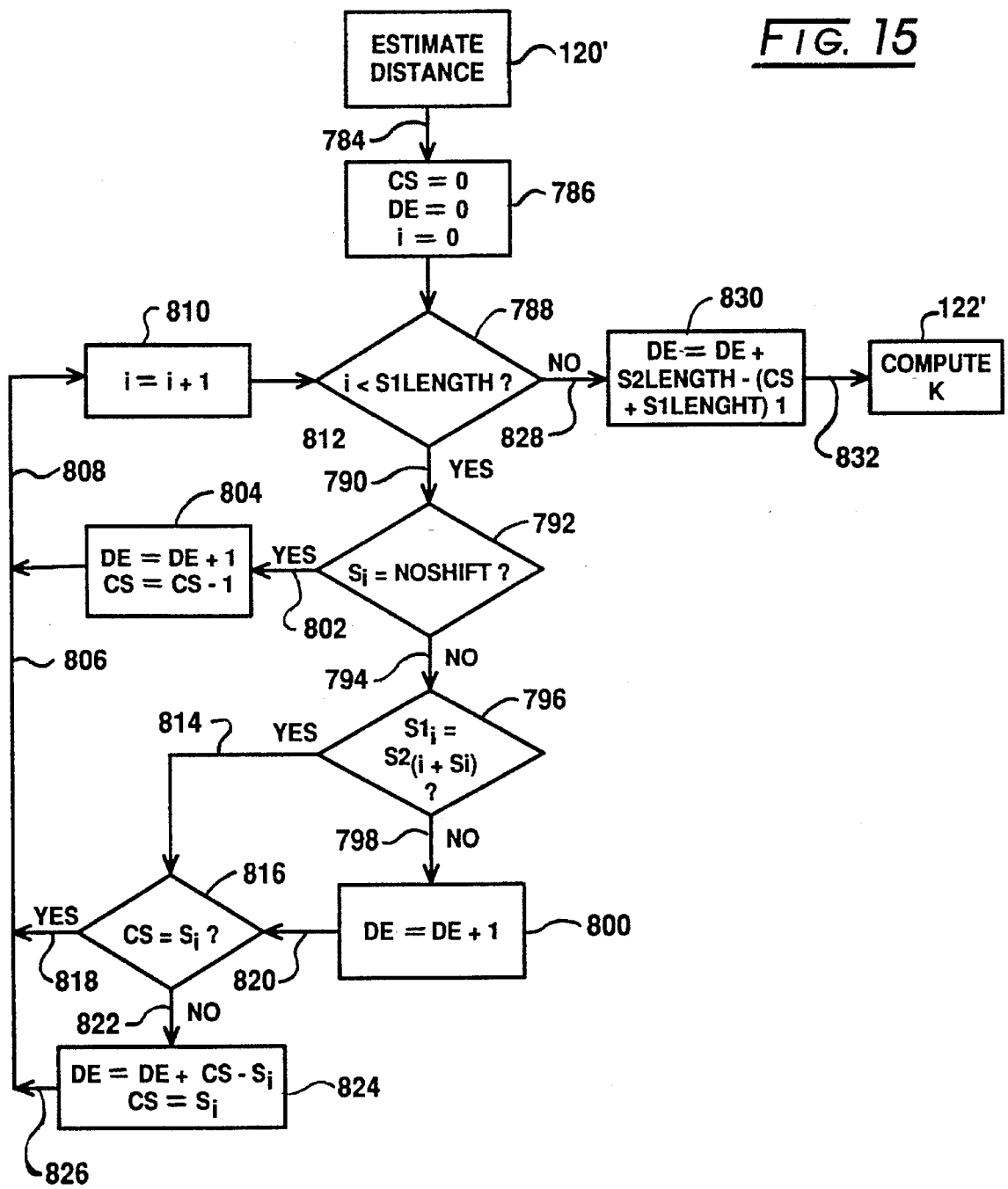
FIG. 15 is a flow diagram describing a routine disclosed in FIG. 6 as "Estimate Distance"

Referring to FIG. 15, the Estimate Distance routine described in conjunction with block 120 in FIG. 6 is presented in expanded fashion. The routine is introduced by a block 120' labeled "Estimate Distance" corresponding to earlier noted block 120 and is shown leading to the routine via line 784 extending to block 786. The routine progresses through the shifts or S array carrying numerical data as to substitutions, deletions, and insertions. Block 786 provides for setting three variables to zero, i being the position index, DE being a cumulative edit distance representing the final upper bound following the completion of the instant routine, and CS representing the current shift as the routine progresses through the array. For example, an increase in the value for CS will be occasion of increasing a distance value. Following the activities represented at block 786, then, as represented at block 788, a determination is made as to whether the positional index i is less than string 1 length S1. In the event that it is, a condition always present in the first pass, then as represented at line 790 and block 792, a determination is made as to whether a shift is found. In the presence of a negative result, then as represented at line 794 and block 796, a determination is made as to whether the character positions are the same. In effect, a determination is made as to whether the character in string 1 is equal to the character in string 2, taking account of the shift. Where the determination there is in the negative, then as represented at line 798 and block 800, there is no correspondence and the value of edit distance incremented by 1 is set as the edit distance.

Returning to block 792, in the event that a no shift designation is found, then as represented at line 802 and block 804, the edit distance is incremented by 1 and the current shift is decremented by 1. That procedure corresponds to a dropping of a character from string 1. Then, as represented at lines 806, 808, and block 810, the value i is incremented by 1 and as represented at line 812, the routine continues from block 788.

Returning to blocks 796 and 800, in the event of an affirmative response to the comparison made in conjunction with block 796, as represented at line 814 and 816, the value CS is set equal to the array $S_i$ and as represented at lines 818,808, and block 810, the routine progresses to the next position. As represented by line 820 extending from block 800, the same procedure is carded out following the incrementation of distance DE. On the other hand, if the evaluation made in conjunction with block 816 finds an inequality or is in the negative, then as represented at line 822 and block 824, the determination is made that the characters did not match and the traces are not parallel at this point. An amount is added with respect to edit distance equal to the change found. Where the traces have shifted then the edit distance count increases in value. Accordingly, the edit distance DE is set as existing DE plus the absolute value of $CS-S_i$ and the value CS is set equal to $S_i$. The routine then continues as represented at line 826.

Returning to block 788, where the positional index i is not less than the string 1 length, then as represented at line 828 and block 830, the distance or edit distance estimation is then set as DE plus the absolute value of the string S2 length minus the value of CS plus the S1 length and, as represented at line 832, the routine then provides an estimated bound on the edit distance as described in conjunction with block 122 in FIG. 6 and represented in the instant drawing in primed fashion with the same numeration. Bound K is a bound on the actual edit distance with the routine, it is known that when an exact minimum edit distance is found, the value thereof will not be any larger than that estimate. With the system, it is known that the bound value will not be exceeded and geometrically, a substantial reduction in matrix searching space is achievable.

Returning momentarily to FIG. 3, the distance array construction procedure has been discussed in general in conjunction with block 84. Having now discussed the hueristic approach to developing a value, K, for an upper bound, as generally described in conjunction with symbol 82 of the figure, the array construction now can be carded out. The entire procedure represents a corner cutting technique making the volume of computation and memory requirement practical. Recall that pages are considered as strings of lines. This technique now is combined with the utilization of an upper bound of a three-dimensional matrix. A formula is developed for the value of a cell within the matrix and if the value of that cell is greater than the upper bound, it is known that that value will not be useful in evolving a minimum edit distance and so it is discarded and that portion of the matrix is not constructed. As part of the distance array construction represented at symbol 84, a determination is made as to whether a proposed cell loading is within the diagonal 104 as described in connection with FIG. 5. That condition is determined by developing values for a cumulative A length, a cumulative B length, and a cumulative C length. For each line from pages A, B, and C, one can thus achieve a function that will provide a lower bound and a determination can be made as to whether that is less than the noted upper bound. Where the value is less than the upper bound, then an entry is filled within the three-dimensional matrix. If the lower bound does not meet that criterion then cell loading simply is ignored. Thus, the cumulative A length, cumulative B length, and cumulative C length will be seen to be used within a lower bound function.

Figure 16:
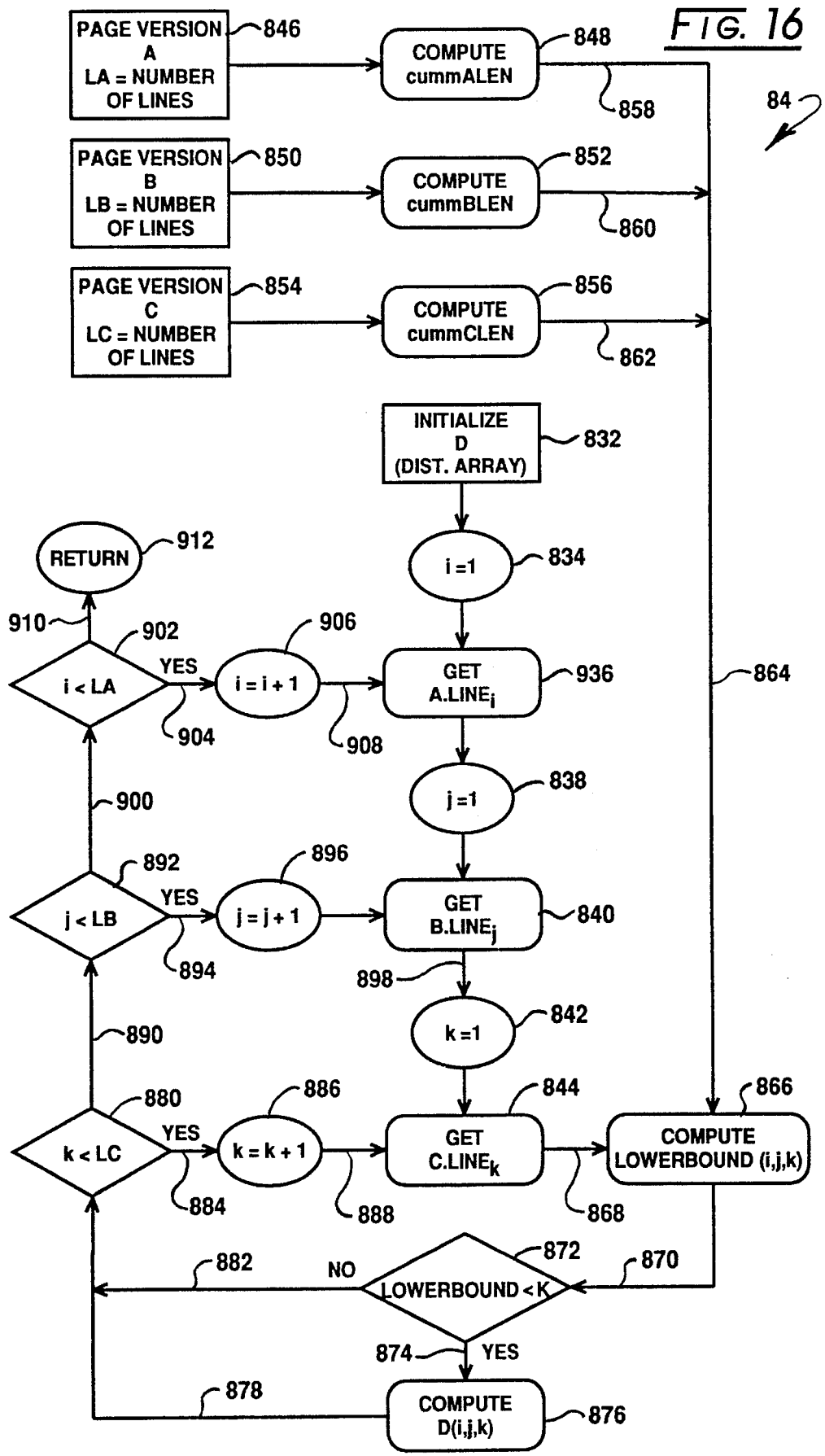
FIG. 16 is a general flow chart describing the construction of an edit distance array.

Referring to FIG. 16, the distance array construction component of FIG. 3 is represented in expanded form. As an initial procedure, as represented at block 832, the distance array, herein designated as "D" is initialized. Following this, a series of looping activities are carded out for collecting lines from pages A, B, and C. Initially, however, as represented at symbol 834, the index i, which is the ith line of page A is set to the value 1. Then, as represented at block 836, a line i is gotten from page A. Then, as represented at symbol 838, the value j is set to 1. j is the jth line of page B. The routine then progresses as represented at block 840 to obtain a line from page B which is the jth line. Then, as represented at symbol 842, the index value k is set to 1. k is the kth line of page C. Then, as represented at block 844, a line is gotten from page C which is the kth line.

The three lines thus obtained, are then utilized in conjunction with values identified as cumulative A length (cumm ALEN), cumulative B length (cumm BLEN), and cumulative C length (cumm CLEN) to compute a lower bound. Thus, as represented at blocks 846 and 848, page version A having a number of lines designated as "LA" is employed to generate the value cumm ALEN. Similarly, page version B as represented at block 850 wherein the number of lines in that page is designated "LB", is used to compute a cumm BLEN value as represented at block 852. Finally, page version C having a number of lines designated "LC" as represented at block 854 is employed to compute the value cumm CLEN as represented at block 856. Then as represented by respective lines 858, 860, and 862 extending from blocks 848, 852, and 856, and coupling line 864, a lower bound function is computed as represented at block 866 in conjunction with the acquired lines as discussed in connection with blocks 836, 840, and 844, and represented at line 868. Then, as represented at line 870 and block 872, a determination is made as to whether the computed lower bound is less than the upper bound, K. If it is less than the upper bound, then it is known that its value lies on the earlier-described diagonal 104 of the three-dimensional matrix and that entry for the matrix then is computed. This latter computation is represented by line 874 and 876. The routine then progresses as represented by line 878 to block 880. Similarly, where the lower bound is not less than the upper bound under the test at block 872, the same process path is accessed as represented by line 882 extending to line 880.

At block 880, a determination is made as to whether the value of k is less than the number of lines, LC, on page C. If that is the case, then as represented by line 884 and symbol 886, the value k is incremented by 1 and as represented at line 888, the newly valued kth line of page C is acquired as represented at block 844.

The program additionally proceeds as represented at line 890 to the inquiry at block 892 wherein a determination is made as to whether the value j is less than the number of lines of page B. If that is true, then as represented at line 894 and symbol 896, the value of j is incremented by 1 and as represented at line 898, corresponding line j is acquired as represented at block 840. The program then continues as represented at line 900 to the inquiry at block 902 where it is determined whether the value of i is less than the number of lines, LA, for page version A. In the event of an affirmative determination, then as represented at line 904 and symbol 906, the value of i is incremented by 1 and as represented at line 908 and block 836, the next line is obtained from page version A. This looping procedure acquiring all of the lines from pages A, B, and C continues in conjunction with the corresponding computation of lower bound as represented at block 866 and comparison with upper bound K until all lines within the three pages are evaluated. Following this looping procedure, as represented at line 910 and node 912, the routine returns to carry out the next general function as described, for example, at symbol 94 in FIG. 3.

Figure 17A:
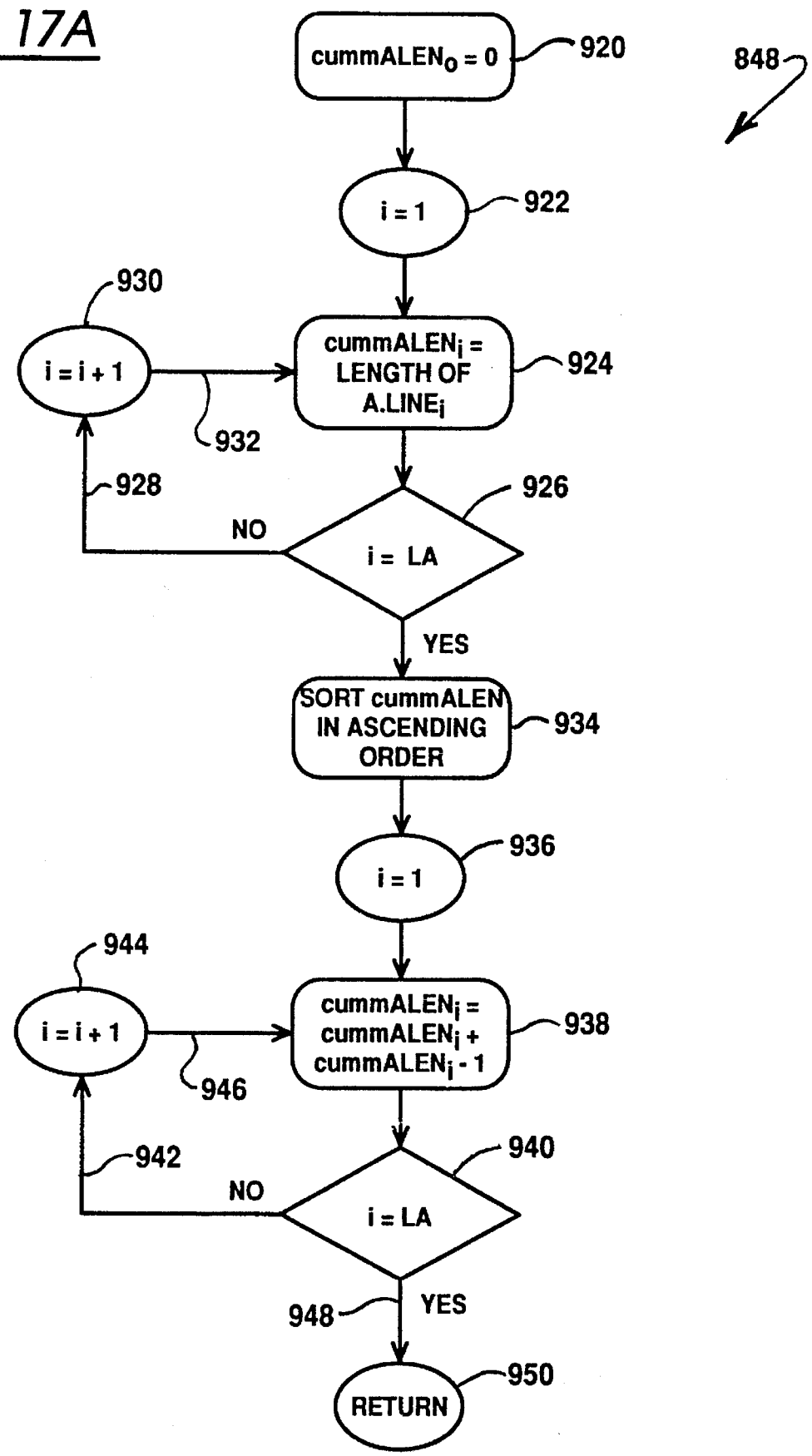
FIGS. 17A–17C are flow charts each respectively describing the computation of a cumulative A page length, a cumulative B page length, and a cumulative C page length.
Figure 17B:
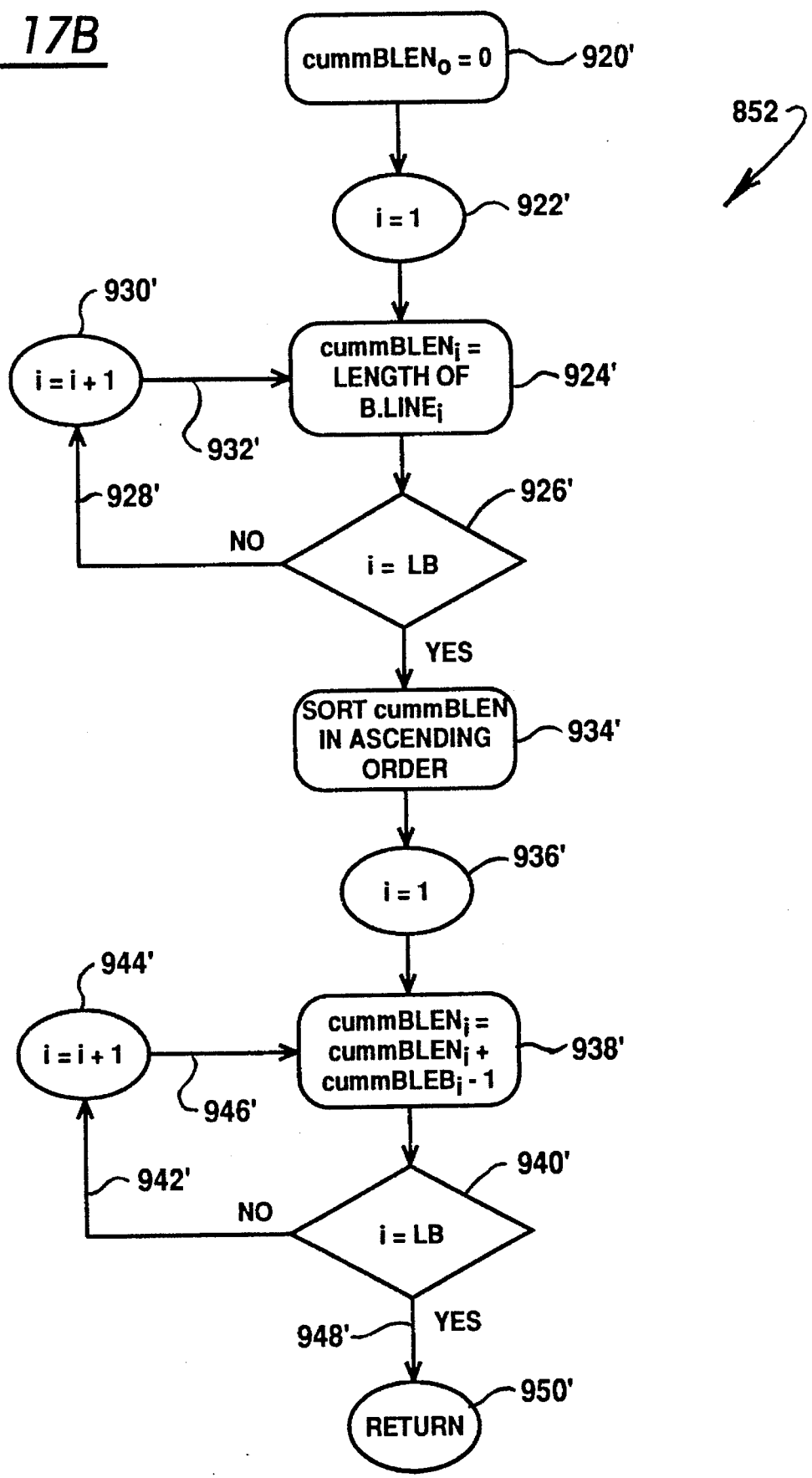
Figure 17C:
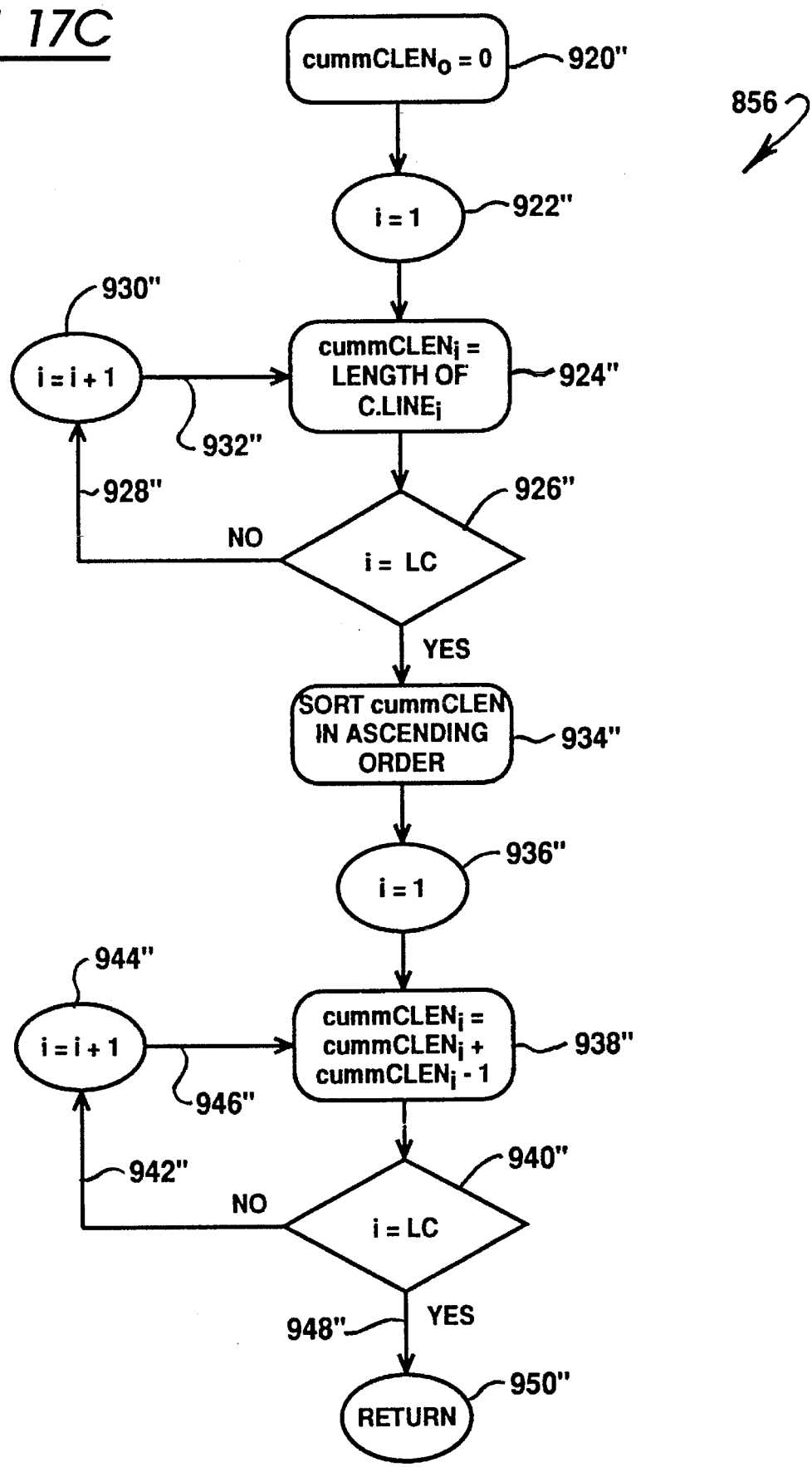

Referring to FIGS. 17A–17C, the corresponding procedures for respectively computing cumm ALEN, cumm BLEN, and cumm CLEN are portrayed. Inasmuch as the same procedures are carried out, for example in parallel fashion, for each of the pages A, B, and C, this routine is described in conjunction with FIG. 17A, and the same numeration is utilized in conjunction with FIGS. 17B and 17C, however, with a respective prime and double prime notation. Accordingly, the description for these three FIGS. 17A, 17B, and 17C is limited to a description of FIG. 17A which is concerned with page A. Note that FIG. 17A corresponds with block 48 of FIG. 16, while FIG. 17B corresponds with block 852 of that figure and FIG. 17C corresponds with block 856 of that figure. For clarity, those figures also carry that same general numeric designation. Looking to FIG. 17A, at this juncture in the program, page A has been acquired which is a sequence of lines. As represented at block 920, a cumulative A length for a 0th line is set at zero. Then as represented at symbol 922, an index designated i is set at 1. As represented at block 924, the cumulative length for page A line i is set equal to the length of a line i. As represented at block 926, a determination is made as to whether the value is equal to the number of lines, LA, for page A. If it is not, then as represented at line 928 and symbol 930, the value of i is incremented by 1 and as represented at line 932, the resultant loop continues with the assignment of the cumulative A length to the length of page A line i.

The routine then proceeds to carry out the function represented at block 934 where cumm ALEN is sorted in ascending order such that the smallest value is first and the largest is last. Then, the index value i is again set to 1 as represented at symbol 936 and, as represented at block 938 which is a loop based activity, the value cumm $ALEN_i$ is set equal to the values for cumm $ALEN_i$+cumm $ALEN_{i-1}$. Then, as represented at block 940, a determination is made as to whether the value of the index i is equal to the number of lines, LA, for page A. In the event that it is not, then as represented at line 942 and symbol 944, the value of i is incremented by 1, and as represented at line 946, the program loops to the function at block 938. Following the completion of page A, then as represented at line 948 and node 950, the routine returns.

Figure 18:
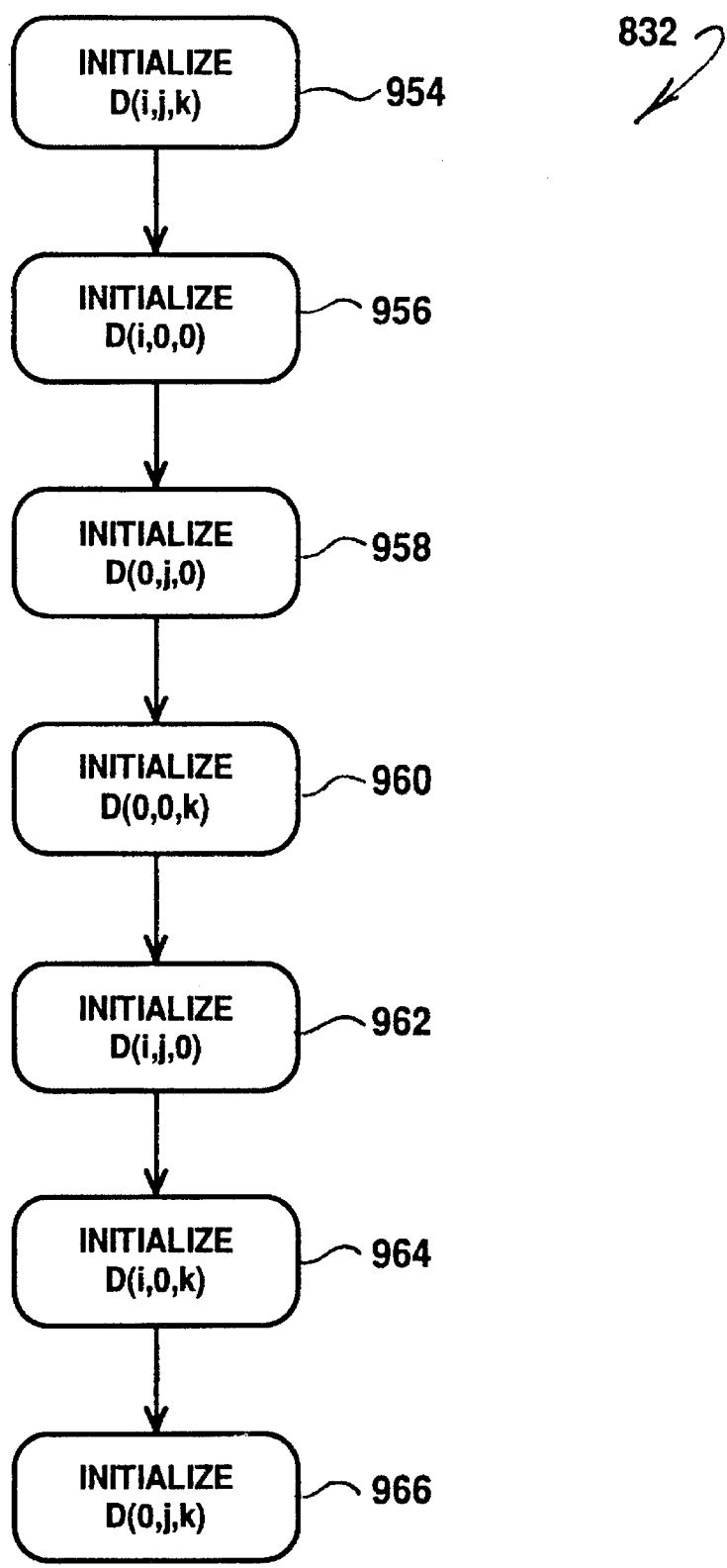
FIG. 18 is a flow diagram describing the procedure of FIG. 16 identified as "Initialize D"

Referring to FIG. 18, the initialization procedure earlier described in conjunction with block 832 of FIG. 16 is described in generalized fashion. That general numeration reappears in the figure. The initialization procedure involves the insertion of a large number, for example ∞, at each cell location within the three-dimensional matrix, D. This assures that if some spurious distance value were to be called for by the program, it would be rejected as being greater than the upper bound, K. In the initialization procedure, the earlier-discussed convention assigning line indexing or numbering as i for page A, as j for page B, and as k for page C is utilized. Returning momentarily to FIG. 5, for the matrix, these line position symbols are seen labeled at one edge of the illustrated matrix. In general, the initialization procedure will first initialize the entire matrix, then the edges and then the faces of the matrix. In FIG. 18, the initialization of the entire matrix is represented at block 954. The entire matrix, D(i, j, k) is initialized with a large number, for example ∞. Then, as represented at block 956, the "I" edge is initialized as represented at D(i,0,0). At block 958, the "j" edge is initialized as represented at D(0,j,0). In similar fashion, the "k" edge is initialized as represented at block 960 as depicted at D(0,0,k).

The faces of the matrix then are initialized. In this regard, at block 962, the "i,j" face is initialized; as represented at block 964, the "i,k" is initialized; and as represented at block 966, the "j,k" face is initialized.

Figure 19:
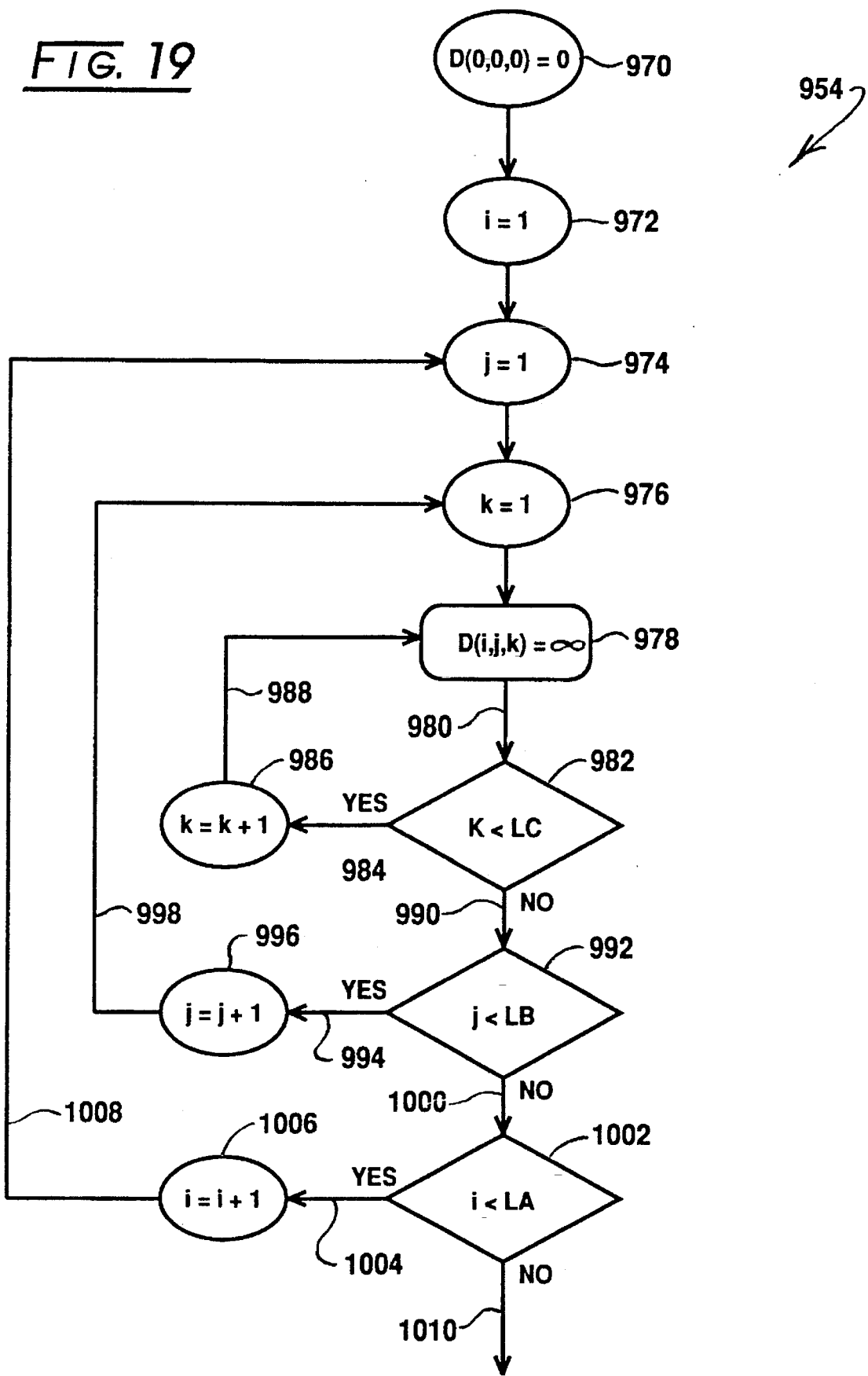
FIG. 19 is a flow chart describing a routine identified as "Initialize D(i,j,k)" shown as a block in FIG. 18.

Turning to FIG. 19, the routine for initializing the entire matrix as described in conjunction with block 954 in FIG. 18 is revealed in expanded detail. In this regard, the numeration 954 reappears in FIG. 19 as a general designation. The routine commences with an initial setting of the matrix corner, D(0,0,0) to zero value. Then as represented at respective symbols 972, 974, and 976, the i increment, j, increment, and k increment are each set to 1. The routine then proceeds to block 978 where the array cell designations for each combination as represented at D(i,j,k) are set equal to infinity. This is carried out in a sequential basis, line 980 being seen to extend to block 982 wherein the value k is tested with respect to it being less than the page C line count, LC. Where that test is true, then as represented at line 984, symbol 986, and line 988, the value for k is incremented by 1 and the routine loops to line 978. Correspondingly, with the test at block 982 being false, then as represented at line 990 and block 992, a determination is made as to whether the value for j is less than the line count for page B, LB. In the event that it is, then a looping ensues as represented by line 994, symbol 996, and line 998. In this regard, the value of j is incremented by 1 and the routine loops to symbol 976. Similarly, with a false result at the test posed at block 992, then as represented at line 1000 and block 1002, a determination is made as to whether the value of i is less than the line count for page A, LA. With an affirmative response to the test, then as represented by line 1004, symbol 1006, and line 1008, the value of is incremented by 1 and the routine loops to block 974. This component of the initialization routine then continues as represented at line 1010 to the edge initialization procedure represented in FIG. 18 at block 956.

Figure 20:
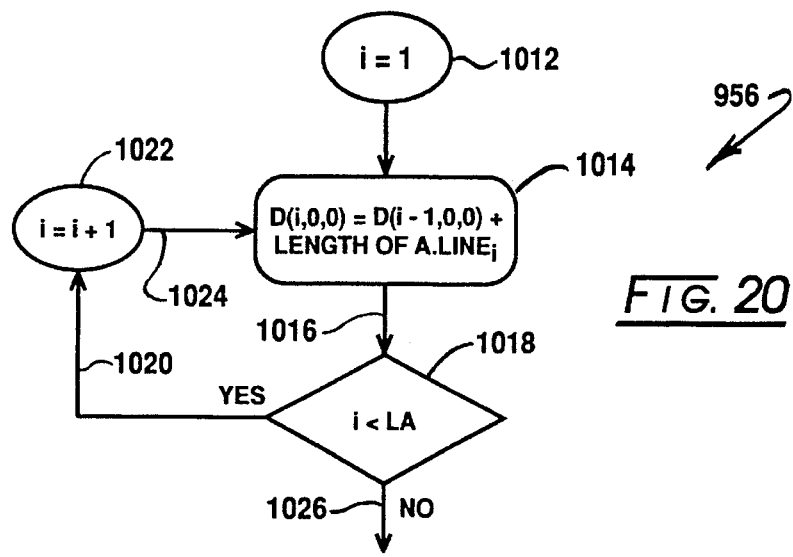
FIG. 20 is a flow diagram describing a block in FIG. 18 identified as "Initialize D(i,0,0)"

Referring to FIG. 20, the routine for carrying out the initialization of the 'T' edge of the matrix as represented in connection with block 956 of FIG. 19 as "D(i,0,0) is revealed. The same general numerical designation, 956, is employed in FIG. 20. This routine commences as represented at symbol 1014 with the setting of the value of i to 1. The routine basically builds up a cumulative length on that i edge. The first entry as represented at block 114 is the length of the first line of page A for that value of i being equal to 1. The routine loops then as represented at line 116 and block 1018 where a determination is made as to whether the value for i is less than the number of lines in page A, LA. With an affirmative determination at block 1018, then as represented at line 1020, symbol 1022 and line 1024, the value of i is incremented by 1 and the routine loops to block 1014. The second entry then will be the length of the sum of the first and second lines. Correspondingly, the second entry evolved is the length of the sum of the first and second lines. This carries on throughout the number of lines of page A. Following the receipt of a negative response to the test at block 1018, the routine progresses as represented at line 1026 to initialize the j edge of the matrix.

Figure 21:
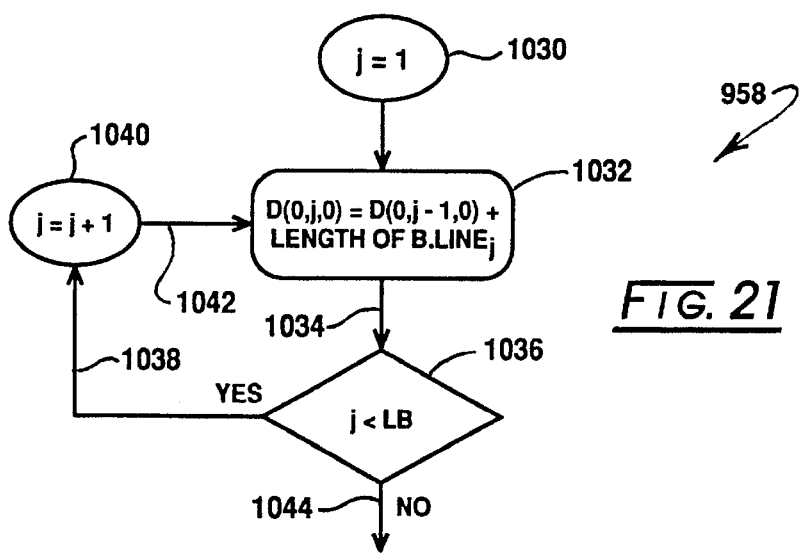
FIG. 21 is a flow chart describing a block within FIG. 18 identified as "Initialize D(0,j,0)"

Referring to FIG. 21, the initialization of the j edge of the matrix is revealed in conjunction with the general numeration 958 corresponding with block 958 in FIG. 18. The procedure carried out in conjunction with the initialization to the j edge of the matrix is substantially identical to that described in conjunction with FIG. 20. In this regard, note that as represented at symbol 1030, the value j is set equal to 1 and, as represented at block 1032, for each ascending incremental value of j, a cumulative length is built, the first entry being the length of the first line of page B. As before, the second entry will become the length of the sum of the first and second lines and so forth. Accordingly, the routine progresses or loops as represented by line 1034 and block 1036 wherein a determination is made as to whether the value of j is less than the number of lines in page B, LB. In the event it is less, then as represented at line 1038 and block 1040, the value of j is incremented by 1 and the loop is completed as represented by line 1042. At the completion of this initialization, the routine progresses to the next component of initialization as represented at line 1044 and described in connection with FIG. 18 at block 960.

Figure 22:
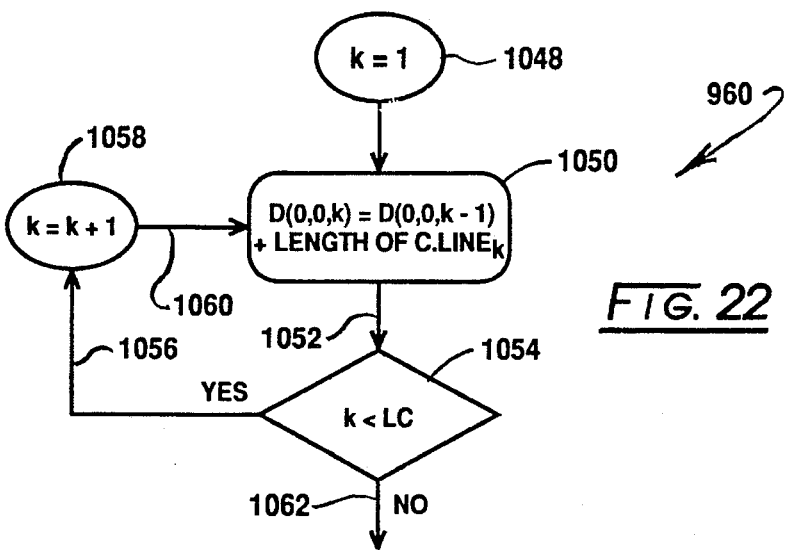
FIG. 22 is a flow diagram describing a block within FIG. 18 identified as "Initialize D(0,0,k)"

Referring to FIG. 22, the expansion of the routine represented by block 960 is represented in conjunction with a general designation of that same numeration. As before, this routine represents a procedure which is the same as described in conjunction with FIGS. 20 and 21. In this regard, it may be observed that at a symbol 1048 the value of k is made equal to 1 and, as represented at block 1050, the first entry evolved by the routine will be the length of the first line of page C and the second entry will be the sum of the first and second line lengths. The loop characteristic of the routine then ensues as represented by line 1052 and block 1054. At block 1054, the value of k is monitored and a determination is made as to whether it is less than the number of lines of page C, LC. In the event of an affirmative determination, then as represented by line 1056 and symbol 1058, the value of k is incremented by 1 and the loop is completed as represented by line 1060 extending to block 1050. The routine is concluded with a negative determination to the inquiry at block 1054 as represented at line 1062.

Figure 23:
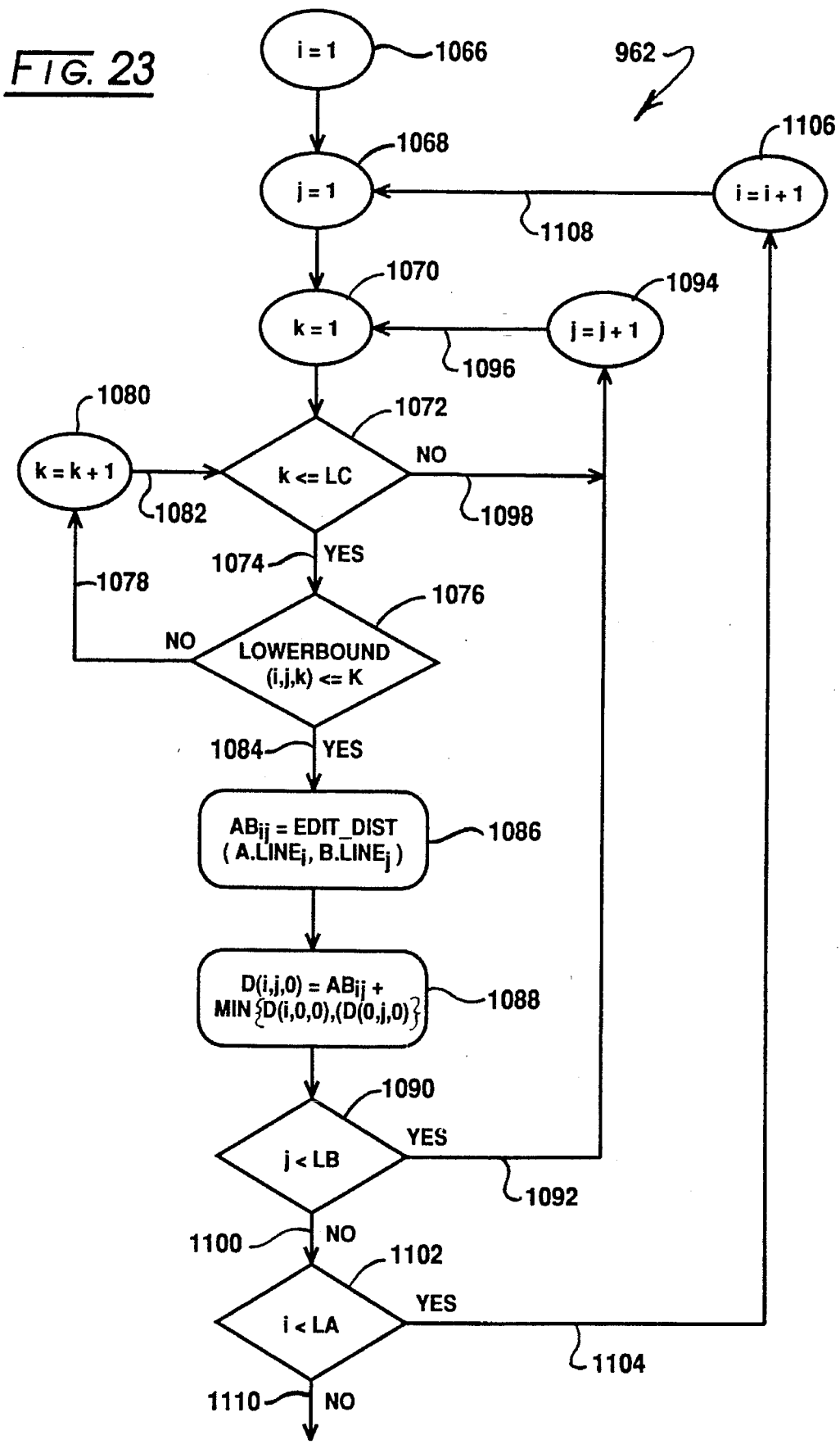
FIG. 23 is a flow chart describing a block within FIG. 18 identified as "Initialize D(i,j,0)"

Referring to FIG. 23, the initialization of the face i,j of the D matrix is represented as an expansion of earlier-described block 962 of FIG. 18. Accordingly, that numeration reappears in the figure in generalized form. The routine seeks to loop through all of the indexes on the i,j face of the matrix. Inasmuch as it is not necessary to initialize the entire i,j face, an upper and lower bound is provided in conjunction with the initialization. In effect, the routine loops through i and j entries at the face which satisfies the requirements of an inner loop within the program.

Looking to the figure, as represented at symbol 1066, the value i is set equal to 1; the value j is set equal to 1 as represented at symbol 1068; and the value k is set equal to 1 as represented at symbol 1070. Following the establishment of those initial levels, then as represented at block 1072, a determination is made as to whether the value k is less than or equal to the number of lines of page C, LC. If that is the case, then as represented at line 1074 and block 1076, a determination is made as to whether the lower bound as described in conjunction with FIG. 16 at block 866 is less than the upper bound, K. Block 1076 is part of an inner loop which includes line 1078, symbol 1080, and line 1082. Thus, where the lower bound is not less than the upper bound, then as represented at symbol 1080, the value of k is incremented by 1 and the routine loops to block 1072 as represented at line 1082. No computation takes place during that form of looping. However, where the lower bound is less than or equal to the upper bound under the test at block 1076, then as represented at line 1084 and block 1086, a computation is carded out. Initially, a first computation represented as $AB_{ij}$ is developed for storage particular to pages A and B. This is the edit distance of the ith line of A and the jth line of B. Then, as represented at block 1088, the routine calculates the sum of the earlier computed $AB_{ij}$ value plus the minimum of the ith entry on the edge i and the jth entry on the j edge of the matrix. The rationale for that essentially falls out in the mathematics involved. Following the computation at block 1088, as represented at block 1090 where the value of j is less than the number of lines of page B, LB, then as represented at line 1092, symbol 1094, and line 1096, the value of j is incremented by 1 and the routine loops to symbol 1070. In similar fashion, where the inquiry at block 1072 is in the negative representing that the value k is less than the number of lines in page C, LC, then as represented at lines 1098 and 1092, the value of j is incremented and the routine returns via line 1096 to node 1070.

Where the determination at block 1090 is in the negative, then as represented at line 1100 and block 1102, a similar determination is made as to whether the value of i is less than the number of lines in page A, LA. Where that determination is in the affirmative, then as represented at line 1104, symbol 1106, and line 1108, the routine increments the value of i by 1 and loops to symbol 1068. Correspondingly, a negative determination at block 1102 leads to line 1110 and the routine progresses to a corresponding initialization for the i,k face of the matrix described in conjunction with block 964 of FIG. 18 and represented in expanded form at FIG. 24.

Figure 24:
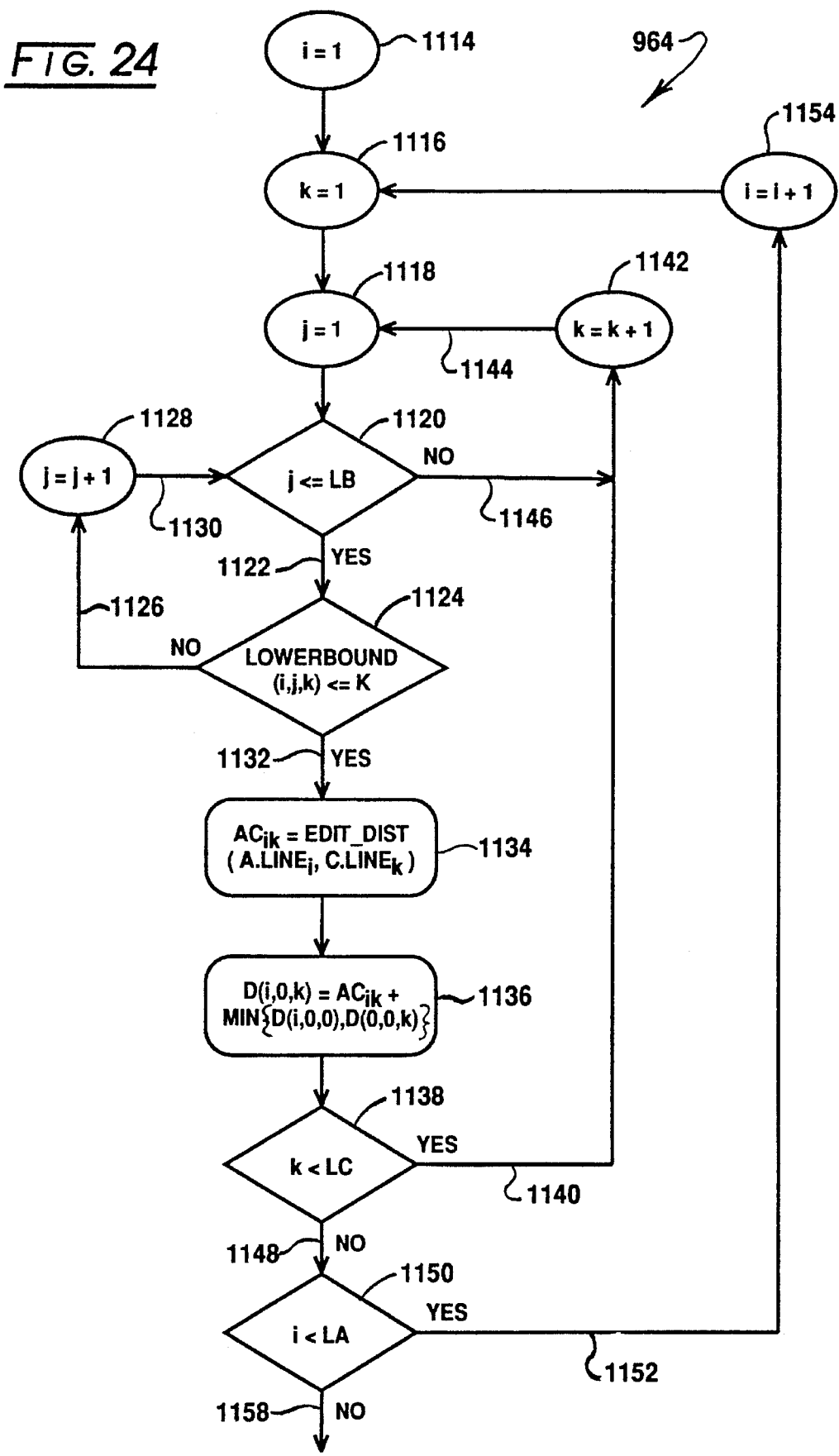
FIG. 24 is a flow diagram describing a block within FIG. 18 identified as "Initialize D(i,0,k)"

Looking to FIG. 24, identifying numeral 964 again is reproduced generally referring to this routine for carrying out the initialization of the i,k face of the matrix. As in the case of FIG. 23, initially, the values for i, k, and j are set to 1 as respectively represented at symbols 1114, 1116, and 1118. Then, as represented at block 1120, a determination is made as to whether the value, j, is less than or equal to the number of lines in page B, LB. Where that is the case, then as represented at line 1122 and block 1124, a determination is made as to whether the lower bound is less than the upper bound constant. Where that is not the case, then a looping ensues involving line 1126, symbol 1128, and line 1130 wherein the value of j is incremented by 1 and the routine returns to block 1120. Where the lower bound is not less than the upper bound, then as before and as represented at line 1132 and block 1134, a value $AC_{ik}$ is computed which is a number representing the ith line of page A and the jth line of page B. Then, as represented at block 1136, the latter value $AC_{ik}$ is added with the minimum of the ith entry on edge i and the kth entry on the k edge. The routine then continues as represented at block 1138 to determine whether the value k is less than the number of lines on page C, LC. In the event that it is, then the routine loops as represented by lines 1140, symbol 1142, and 1144, the value of k being incremented by 1. Similarly, with a negative response to the inquiry represented by block 1120, then as represented by lines 1146, 1140, symbol 1142, and line 1144, k also is incremented by 1 and the program returns to symbol 1118.

Returning to block 1138, in the event of a negative result, then as represented by line 1148 and block 1150, a determination is made as to whether the value of i is less than the number of lines in page A, LA. In the event that it is, then as represented by line 1152, symbol 1154, and line 1156, the routine increments the value of i by 1 and loops to symbol 1116. In the event of a negative response to the inquiry represented at block 1150, then as represented at line 1158, the routine progresses to the next stage represented at block 966 in FIG. 18.

Figure 25:
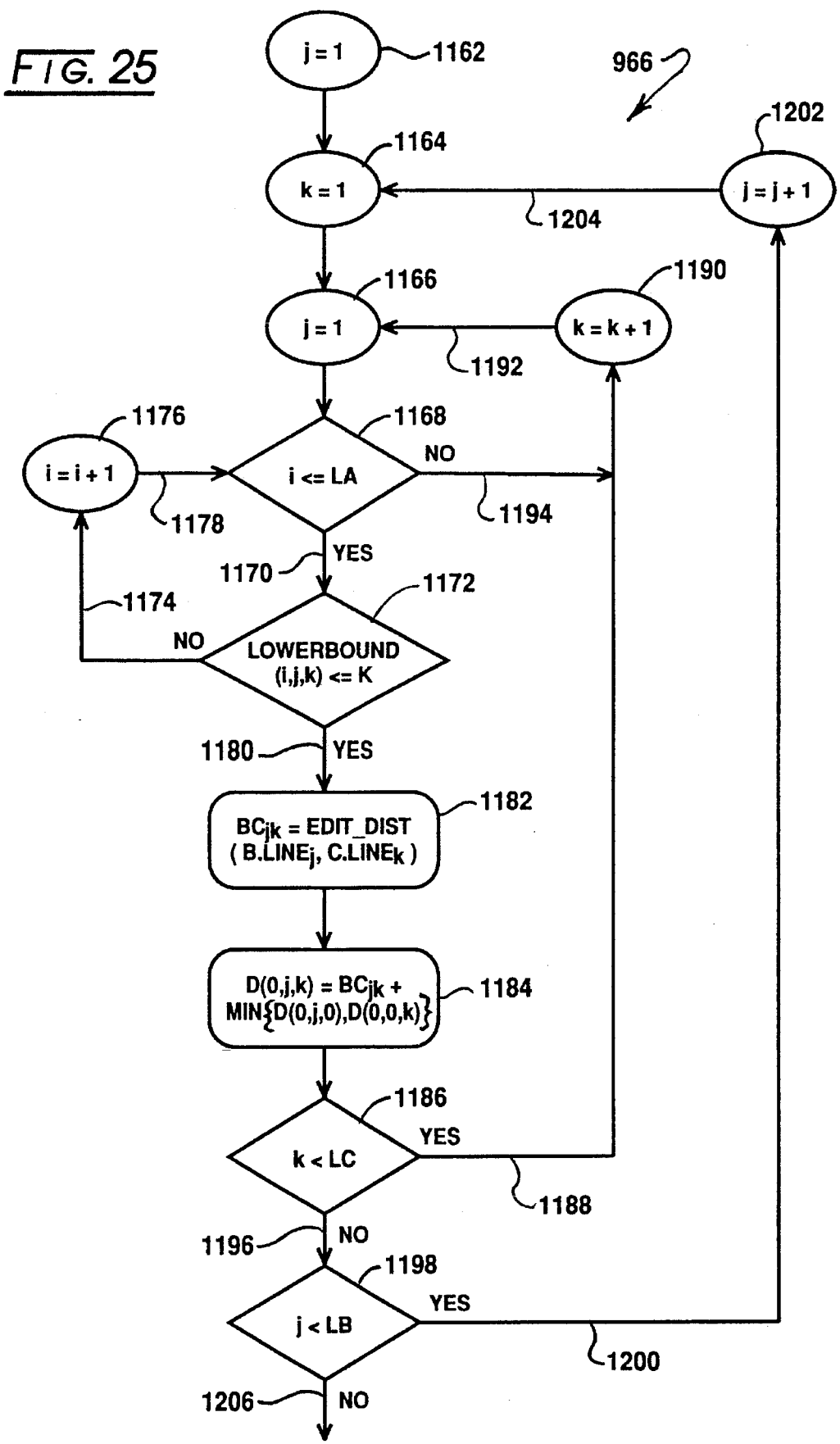
FIG. 25 is a flow chart describing a block within FIG. 18 identified as "Initialize D(0,j,k)"

Referring to FIG. 25, the routine represented by the latter block 966 is represented in expanded form along with that numeral as representing a general designation. Similar to the routines represented in FIGS. 23 and 24, the routine 966 commences at symbols 1162, 1164 and 1166 with the assignment of the value 1 to respective position indexes j, k, and i. The program then proceeds to the inquiry at block 1168 wherein a determination is made as to whether the value i is less than or equal to the number of lines in page A, LA. Where it is, then as represented at line 170 and block 172, a determination is made as to whether the lower bound is less than or equal to the upper bound. In the event that it is not, then as represented by line 1174, symbol 1176, and line 1178, the routine increments the value of i by 1 and loops to block 1168. For such condition, as before, no computations are carried out. However, where the test evoked at block 1172 results in an affirmative response, then as represented at line 1180 and block 1182, a value $BC_{jk}$ is computed which is a number representing the edit distance of the jth line of page B and the kth line of page C. The program then turns to the computation at block 1184 wherein the latter value $BC_{jk}$ is summed with the minimum of the jth entry on the edge j and the kth entry on the edge k. Following this computation, the routine continues to the inquiry at block 1186 wherein a determination is made as to whether the value k is less than the number of lines of page C, LC. In the event that an affirmative determination is made, then as represented at line 1188, symbol 1190, and line 1192, the value of k is incremented by 1 and the routine loops to symbol 1166. Similarly, as represented at line 1194, where the determination at block 1168 is in the negative, then routine loops to line 1188, symbol 1190, and 1192 to symbol 1166.

Where the test at block 1186 is in the negative, then as represented at line 1196 and block 1198, a determination is made as to whether the value of j is less than the number of lines of page B, LB. Where the determination is in the affirmative, then as represented at line 1200, symbol 1202 and line 1204, the value for j is incremented by 1 and the routine loops to symbol 1164. A negative response to the inquiry at block 1198 provides for the continuation of the program as represented at line 1206.

Figure 26:
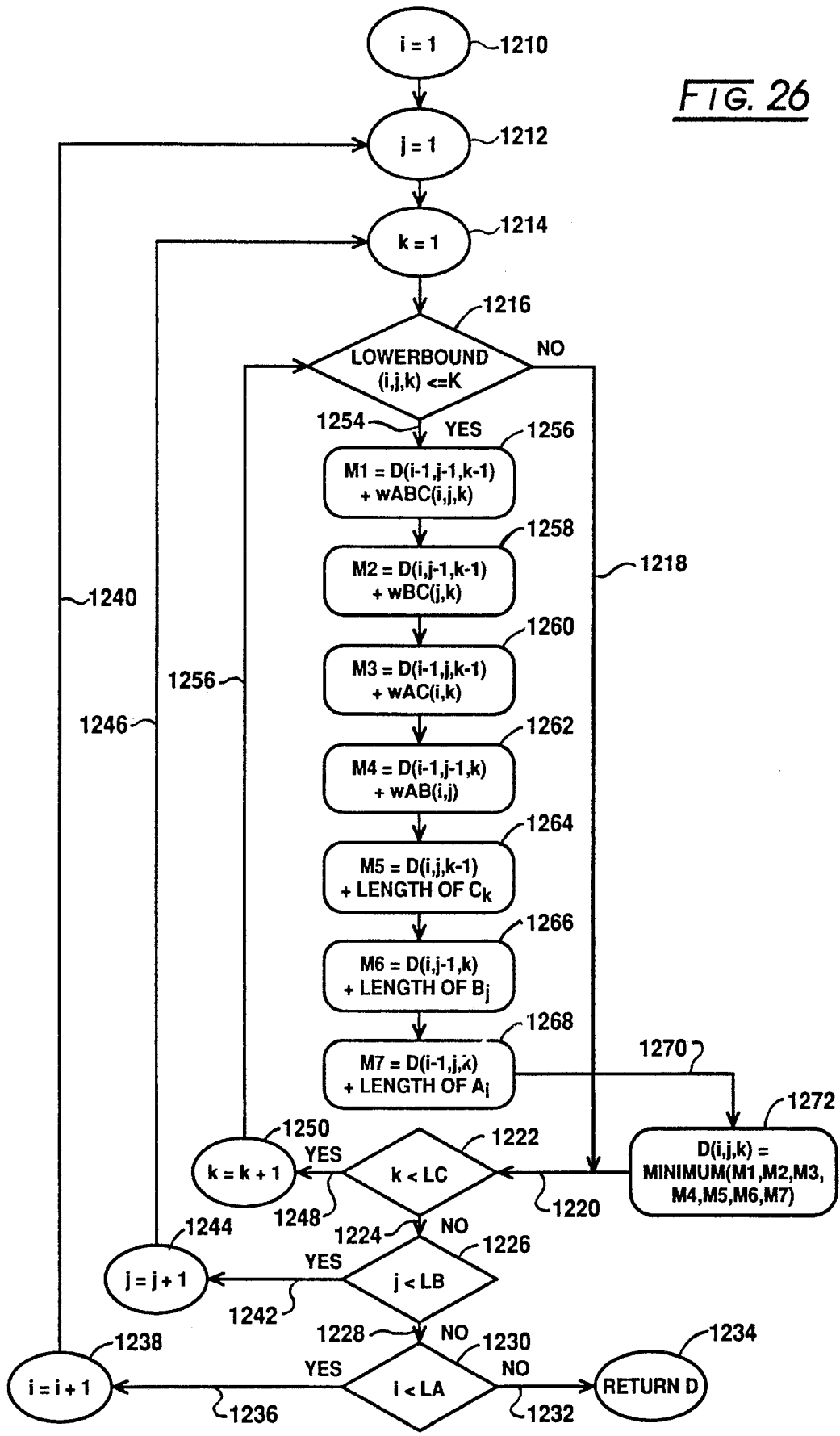
FIG. 26 is a flow diagram describing a block within FIG. 16 identified as "Compute D(i,j,k)"

Referring to FIG. 26, the routine for computing the values for the three dimensional matrix is illustrated. However, as noted earlier in conjunction with FIG. 5, the computational approach is one which fills values only along a diagonal 104 of the matrix. Looking to the figure, the positional indexes i, j and k are initially set equal to 1 as represented by respective symbols 1210, 1212, and 1214. Then, as represented at block 1216, a determination is made, for the positional index values, i, j, k, as to whether the lower bound is less than the upper bound, K. If that test is in the negative or false, then, as represented at lines 1218 and 1220, the routine immediately drops down to the test at block 1222 to determine whether the value of k is at the last line of page C, having a number of lines, LC. If that is not the case, then as represented by line 1224 and block 1226, a determination is made as to whether the value of j is less than the number of lines in page B, LB. If that test results in a negative result, then as represented at line 1228 and block 1230, a determination is made as to whether the value i is less than the number of lines of page A, LA. In the event of a negative determination, then as represented at line 1232 and symbol 1234, the routine returns. On the other hand, affirmative determinations at blocks 1222, 1226, and 1230 will result in an incrementing of the positional indexes. In this regard, with an affirmative determination of the test posed at block 1230, then as represented by line 1236, symbol 1238, and line 1240 extending to symbol 1212, the value of i is incremented by 1 and the routine loops. In similar fashion, with an affirmative determination with respect to the test posed at block 1226, as represented at line 1242, symbol 1244, and line 1246, the value of j is incremented by 1 and the routine loops to symbol 1214. Correspondingly, where the inquiry posed at block 1222 results in a positive determination, then as represented at line 1248, symbol 1250, and line 1252, the value of k is incremented by 1 and the routine returns to the test at block 1216.

Thus, the routine restricts computations to the noted diagonal 104 shown in FIG. 5. Looking again to the test at block 1216, where an affirmative determination is made and the position within the diagonal is at hand, then the routine will compute seven entries identified as m1–m7. Accordingly, with an affirmative determination to the test posed at block 1216, then as represented at line 1254 and block 1256, the value m1 is computed as the previous entry plus a computed value, wABC. That value is computed as follows:

$$wABC(i,j,k) = minimum \{AB_{ij} + BC_{jk}, AB_{ij} + A_{ik}, BC_{jk} + A_{ik}\}$$

Next, as represented at block 1258, the value m2 is computed as a previous entry plus the computed value, wBC(j,k). That value is computed as follows:

$$wBC(j,k) = minimum \{Length\ of\ B_j + Length\ of\ C_k, Length\ of\ B_j + BC_{jk}, Length\ of\ C_k + BC_{jk}\}$$

Next, as shown at block 1260, the value m3 is computed as a previous entry plus the value wAC(i,k). This latter value is computed as follows:

$$wAC(i,k) = minimum \{Length\ of\ A_i + Length\ C_k, Length\ of\ A_i + AC_{ik}, Length\ of\ C_k + AC_{ik}\}$$

Next, as represented at block 1262, the value m4 is computed as a previous entry plus the computed value wAB(i,j). This latter value is computed as follows:

$$wAB(i,j) = minimum \{Length\ of\ A_i + Length\ B_j, Length\ A_i + A_{ij}, Length\ B_j + AB_{ij}\}$$

It may be noted that the values above computed are utilizing values which have earlier been computed, for example in the initialization procedures represented in conjunction with FIGS. 18–25.

As shown at block 1264, next a value m5 is computed as the previous entry plus the length of the kth line of page $C_k$. This procedure is followed by the computation of value m6 as represented at block 1266 where the previous entry is summed with the length of the jth line of page B, $B_j$. Finally, as represented at block 1268, the value m7 is computed as the previous entry plus the length of the ith line of page A, $A_i$. With the computation of all those values, then as represented at line 1270 and block 1272, the entry elected, d(i,j,k) is the minimum of the values m1–m7.

Figure 27:
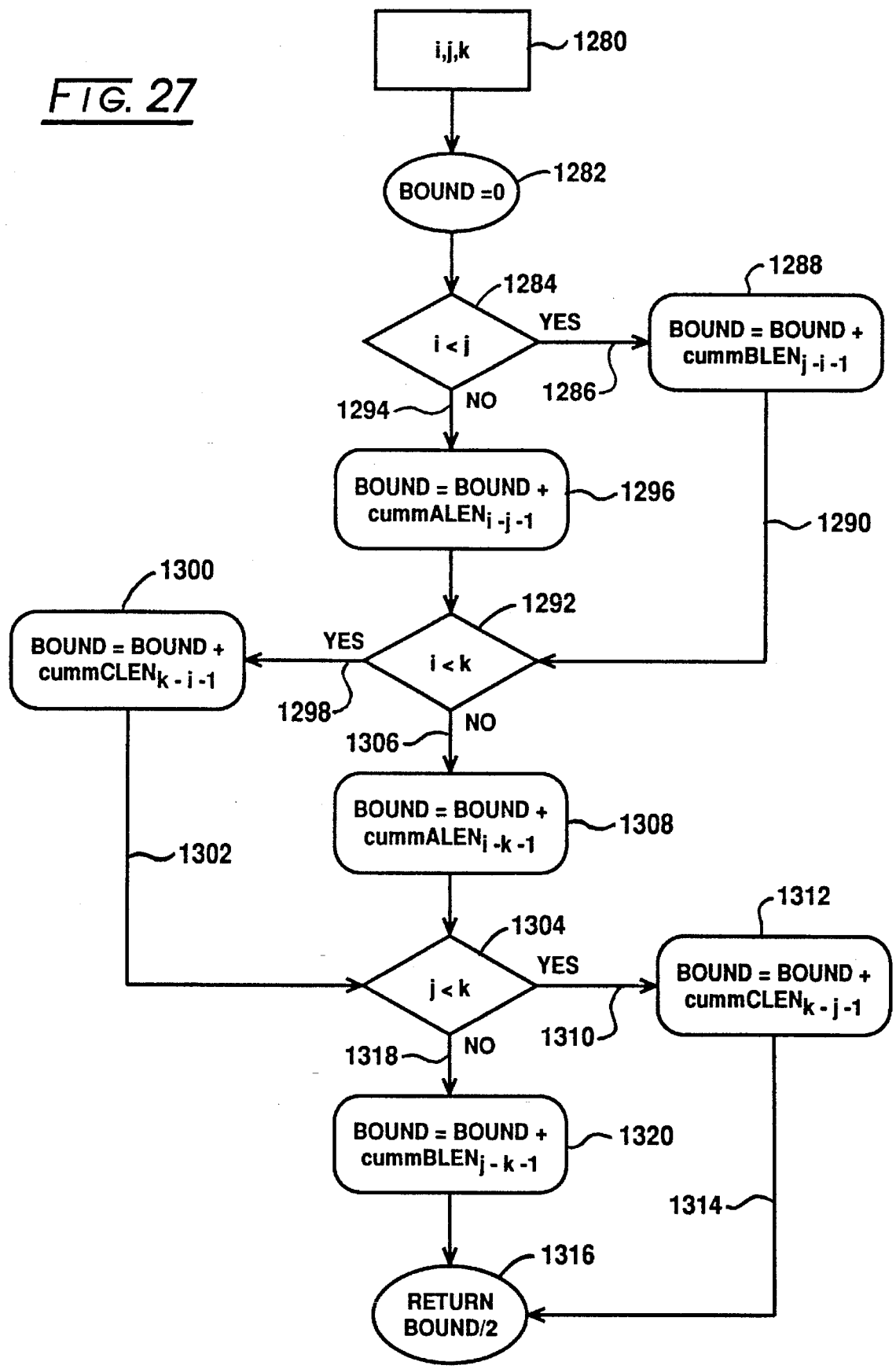
FIG. 27 is a flow diagram describing a block within FIG. 16 identified as "Compute lower bound (i,j,k)"

Referring to FIG. 27, the technique for computing the lower bound at the ith line from A, the jth line from B, and the kth line from C is illustrated. The routine is entered as represented at block 1280 and initially, as shown at symbol 1282, the bound is set at zero. Then, as represented at block 1284, a determination is made as to whether the value of i is less than the value of j. In the event of an affirmative determination, then as represented at line 1286 and block 1288, the bound is set as the previous bound plus earlier computed cumm $BLEN_{j-i-1}$. The routine then continues as represented at line 1290 to the inquiry at block 1292. Returning to block 1284, where the value of i is not less than j, then as represented at line 1294 and block 1296, the bound is established as the previous bound plus cumm $ALEN_{i-j-1}$. The routine then continues to the inquiry at block 1292 wherein a determination is made as to whether i is less than k. In the event of an affirmative determination, then as represented at line 1298 and block 300, the bound is computed as the previous bound plus cumm CLEN at k–i–1. The routine then continues as represented by line 1302 to the inquiry at block 1304.

Where the inquiry represented at block 1292 results in a negative determination, then as represented at line 1306 and block 1308, the bound is established as the previous bound summed with cumm ALEN at i–k–1. The routine then continues to the inquiry at block 1304 wherein a determination is made as to whether the value of j is less than that of k. In the event of an affirmative determination, then as represented at line 1310 and block 1312, the bound is set as the previous bound plus cumm CLEN at k–j–1. The routine then continues as represented at line 1314 and symbol 1316 to return a bound value divided by 2.

Where the determination at block 1304 is in the negative, then as represented at line 1318 and block 1320, the bound is set as the previous bound plus cumm BLEN at j–k–1. The routine then continues to symbol 1316 for returning the bound divided by 2.

Figure 28:
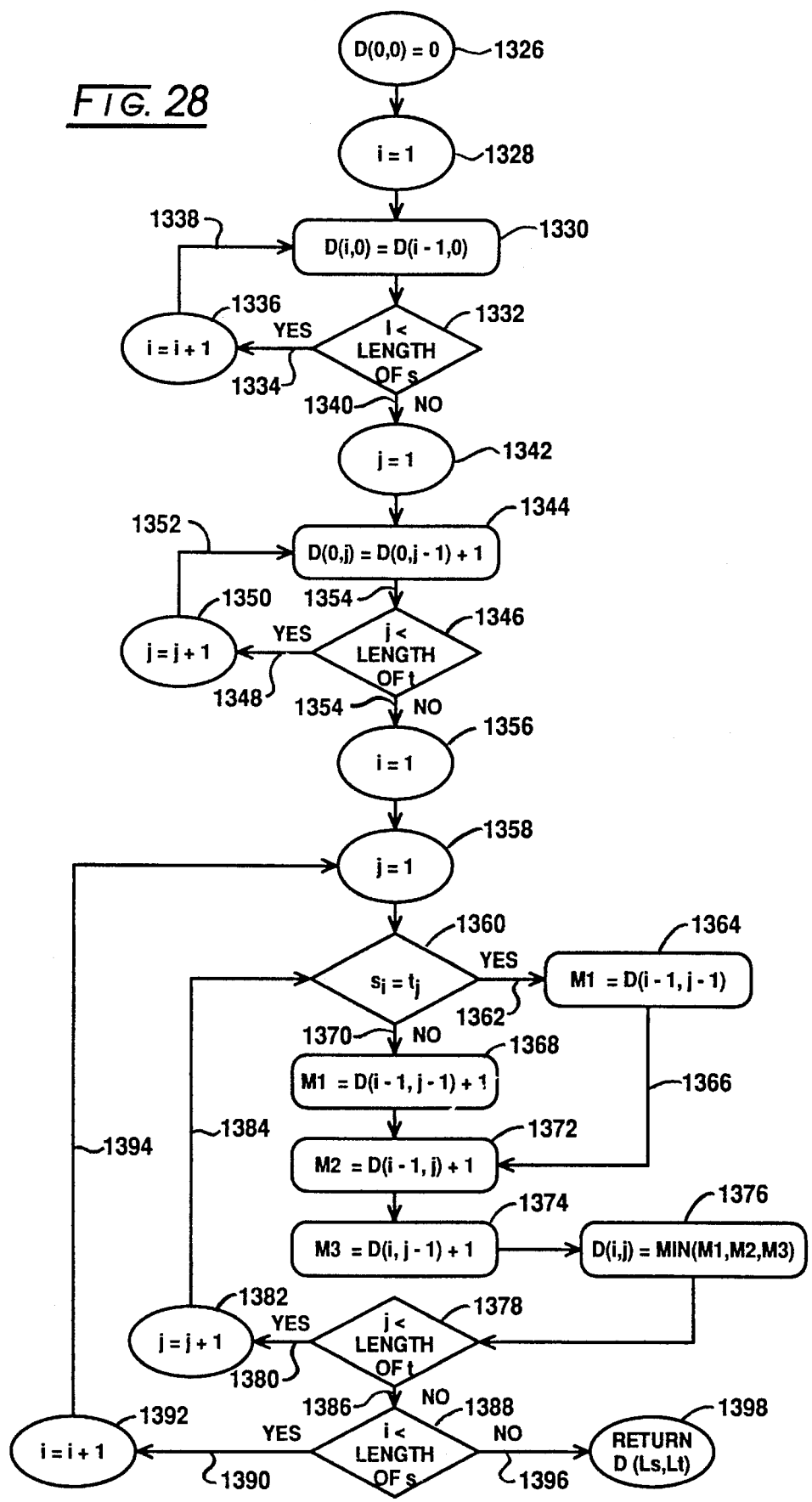
FIG. 28 is a flow chart describing the derivation of an edit distance between two strings, s and t.

Turning to FIG. 28, a routine for computing the edit distance between two strings, s and t, is revealed. This routine represents a two dimensional matrix and is seen entered at symbol 1326 where matrix values initially are set to zero. Then, as represented at block 1328, the positional index i is set equal to I and as represented at block 1330, the i edge of this two-dimensional matrix is looked through, the matrix position D(i,0) being made equal to D(i–1,0)+1. As represented at block 1332, a determination is made as to whether the value of index i is less than the length of string s. In the event of an affirmative response, then as represented at line 1334, symbol 1336, and line 1338, the value of i is incremented by 1 and the computation at block 1330 is repeated. At such time as the determination at block 1332 results in a negative determination, then as represented at line 1340 and symbol 1342, the positional index j is set equal to 1 and as represented at block 1344, the matrix position D(0,j) is set equal to D(0,j–1)+1. The routine then progresses to the inquiry at block 1346 determining whether the positional index j is less than the length of string t. Where an affirmative determination is made from that query, then as represented at line 1348, symbol 1350, and line 1352, the value of j is incremented by 1 and the routine loops to block 1344. With a negative determination as to the inquiry at block 1346, then as represented at line 1354 and symbol 1356, the index i is set equal to 1. Additionally, as represented at symbol 1358, the value of j also is set to 1. Then, as represented at block 1360, a determination is made as to whether the ith symbol of string s is equal to the jth symbol of string t. With an affirmative determination, then as represented at line 1362 and block 1364, a value m1 is set as equal to the previous value. Then, as represented at line 1366, the routine progresses to follow from block 1368. Where the inquiry at block 1360 results in a negative determination, then as represented at line 1370 and block 1368, the value of m1 is set to the previous value plus 1. Then, as represented at block 1372, the value m2 is set equal to D(i–1,j)+1, and, as represented at block 1374, a value m3 is set equal to D(i,j–1)+1. Then, as represented at block 1376, the matrix value D(id) is made equal to the minimum of the values m1–m3. The routine then progresses to inquiry at block 1378 wherein a determination is made as to whether the value of j is less than the length of t. In the event that it is, as represented at line 1380, symbol 1382, and line 1384, the value of j is incremented by 1 and the routine loops to block 1360. With a negative determination as to the test at block 1378, then, as represented at line 1386 and block 1388, a determination is made as to whether the value i is less than the length of string S. In the event of an affirmative determination, then as represented by line 1390, symbol 1392, and line 1994, the value of i is incremented by 1 and the routine returns to symbol 1358. Where a negative determination is made as to the test at block 1388, then as represented at line 1396 and symbol 1398, the last entry in the matrix which will be indexed by the length of S and the length of t is returned.

Figure 29:
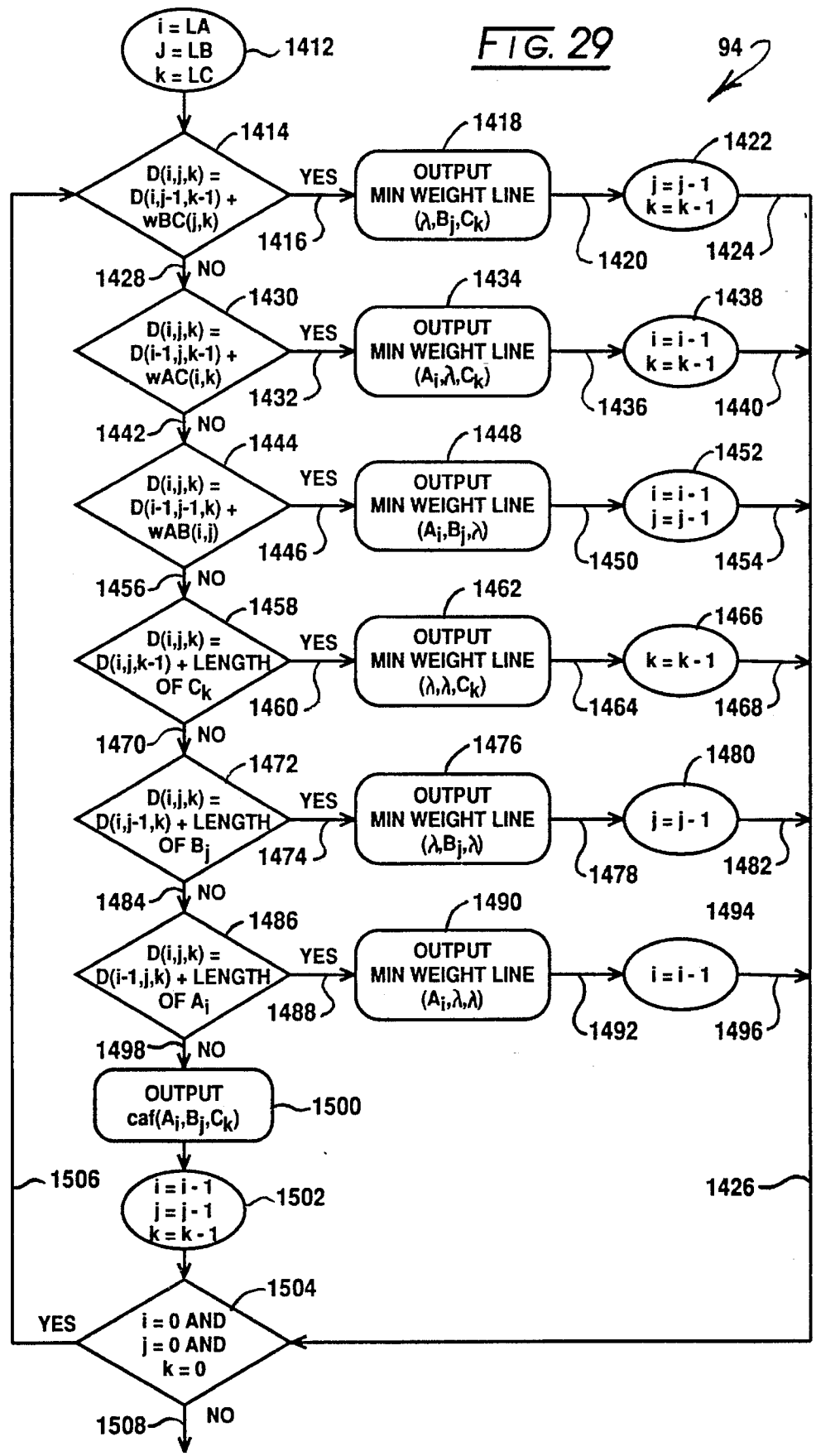
FIG. 29 is a flow diagram describing a traceback function discussed in conjunction with FIG. 3.

Referring to FIG. 29, a recursive traceback routine is illustrated. This routine has been described in general terms in connection with block 94 in FIG. 3. Thus, that numeration is represented in the figure in generalized fashion. At this juncture, the diagonal of the three-dimensional matrix will be loaded with values and the routine seeks to find the most logical line by a form of reverse calculation. Looking to the figure, the first step of the traceback commences at the bottom corner of the matrix diagonal which, as represented at symbol 1412, will be a location where the positional index i is equal to the number of lines in page A, LA; the index value j will be equal to the number of lines in page B, LB; and the index k will be equal to the number of lines in page C, LC. Also identified in the discourse to follow is the symbol $\lambda$ which denotes a null line. The routine commences with the inquiry at block 1414. That inquiry in effect, asks whether the present position was evolved from D(i,j−1,k−1)+wBC(j,k). In the event of an affirmative response, then as represented at line 1416 and block 1418, the routine outputs a minimum weight line $(\lambda, B_j, C_k)$. Then, as represented at line 1420 and symbol 1422, the value of j is set to j−1 and the value of k is set to k−1, and the routine proceeds as represented by lines 1424 and 1426.

Where the inquiry at block 1414 results in a negative determination, then as represented at line 1428 and block 1430, a determination is made as to whether the position D(i,j,k) is equal to D(i−1,j,k−1)+wAC(i,k). In the event of an affirmative determination, then as represented by line 1432 and block 1434, the routine outputs a minimum weight line represented as $(A_i, \lambda, C_k)$. Then, as represented at line 1436 and symbol 1438, the value of i is set to i−1 and the value of k is set to k−1 and the routine progresses as represented at lines 1440 and 1426. Where the determination as to the query at block 1430 is in the negative, then as represented at line 1442 and block 1444, a query is made as to whether D(i,j,k) is equal to D(i−1,j−1,k)+wAB(i,j). In the event of an affirmative determination, then as represented by line 1446 and block 1448, a minimum weight line is outputted by the routine as represented as $(A_i, B_j, \lambda)$. Then, as represented at line 1450 and symbol 1452, the index value i is decremented by 1 and the index value j is decremented by 1. Following this procedure, the routine progresses as represented by lines 1454 and 1426.

With a negative determination to the query posed at block 1444, then as represented at line 1456 and block 1458, an inquiry is made as to whether D(i,j,k) is equal to D(i,j,k−1) plus the length of the kth line of page C. Where that determination is in the affirmative, then as represented at line 1460 and block 1462, the routine outputs a minimum weight line identified as $(\lambda, \lambda, C_k)$. The routine then continues as represented by line 1464 and symbol 1466 to decrement the value k by 1 and then the routine is directed along the path represented by lines 1468 and 1426.

Where the inquiry posed at block 1458 results in a negative determination, then as represented by line 1470 and block 1472, a determination is made as to whether D(i,j,k) is equal to D(i,j−1,k) plus the length of the jth line of page B. In the event of an affirmative determination, then as represented at line 1474 and block 1476, the routine outputs a minimum weight line represented as $(\lambda, B_j, \lambda)$. Then, as represented by line 1478 and symbol 1480, the value of j is decremented by 1 and the program continues as represented by lines 1482 and 1426. Where a negative determination is made with respect to the query at block 1472, then as represented by line 1484 and block 1486, a determination is made as to whether D(i,j,k) is equal to D(i−1,j,k) plus the length of the ith line of page A.

Where a query of block 1486 results in an affirmative determination, then as represented at line 1488 and block 1490, the routine outputs a minimum weight line identified as $(A_i, \lambda, \lambda)$. Then as represented at line 1492 and symbol 1494, the value of i is decremented by 1 and the routine proceeds as represented by lines 1496 and 1426. With a negative determination as to the query posed at block 1486, then, as represented at line 1498 and block 1500, the routine determines that the common ancestor has not been located by the activities in the flow chart above and therefore must have been evoked at the diagonal itself. Thus, the routine executes a common ancestor function $Caf(A_i, B_j, C_k)$. The computation of that common ancestor is described later herein.

The routine then proceeds as represented by symbol 1502 to the decrementing of the indices i, j, and k by 1 and then looks to the query posed at block 1504 to determine whether it has progressed to the top of the diagonal where the value of the indices i, j, and k all will be zero. Note that line 1426 also is directed to block 1504. In the event that the indices are not all equal to zero, then the routine loops as represented at line 1506 to block 1414. Conversely, in the event that all indices are at a zero value, then the routine is exited as represented at line 1508.

Figure 30:
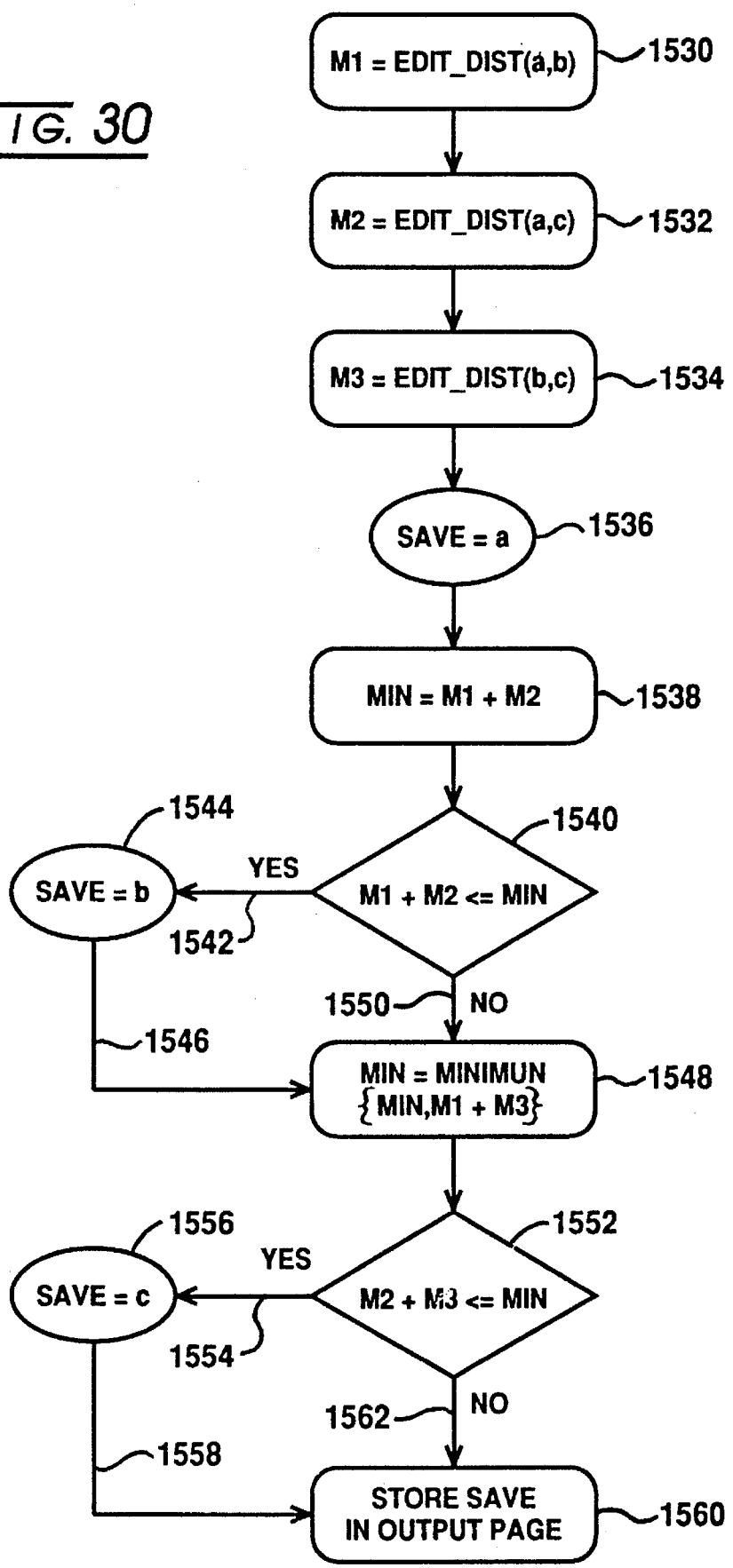
FIG. 30 is a flow diagram describing a routine identified as "Output min weight line (a,b,c)" as discussed generally in FIG. 29.

Referring to FIG. 30, a routine for outputting minimum weight line is illustrated. This is referred to, for example, at blocks 1418, 1434, 1448, 1462, 1476, and 1490 in conjunction with FIG. 29. In the illustration, three lines are given the designations a, b, and c. Edit distances between these lines are determined with the routine. In this regard, looking to block 1530, a value m1 is designated as the value of the edit distance between lines a and b, while block 1532 shows that a value m2 is established as the edit distance between lines a and c and as represented at block 1534, a value m3 is set to the edit distance between lines b and c. Then, as represented at symbol 1536, line, a, is designated to be saved. Following this procedure, as represented at block 1538, a minimum value is established as the sum of the values m1 and m2. The program then looks to the test posed at block 1540. This test determines whether the sum of m1 and m2 is less than or equal to the minimum value computed at block 1538. In the event that it is, then as represented at line 1542 and symbol 1544, the routine elects to save line b and the routine continues as represented at line 1546 to block 1548. In the event of a negative determination to the test at block 1540, then as represented at line 1550 and block 1548, the minimum value is computed as the current minimum value plus m1 and m3. Then, as represented at block 1552, a test is made as to whether the sum of m2 and m3 is less than or equal to this recomputed minimum value. In the event that it is, then as represented at line 1554 and symbol 1556, the c line is designated to be saved and the routine continues as represented by line 1558 to block 1560. Correspondingly, a negative determination to the test at block 1552 leads as represented at line 1562 to the instructions at block 1560. Those instructions provide for the storage of the saved line in an output page. The thus stored string represents an election of the minimum sum of edit distances for finding the minimum weight line.

Figure 31:
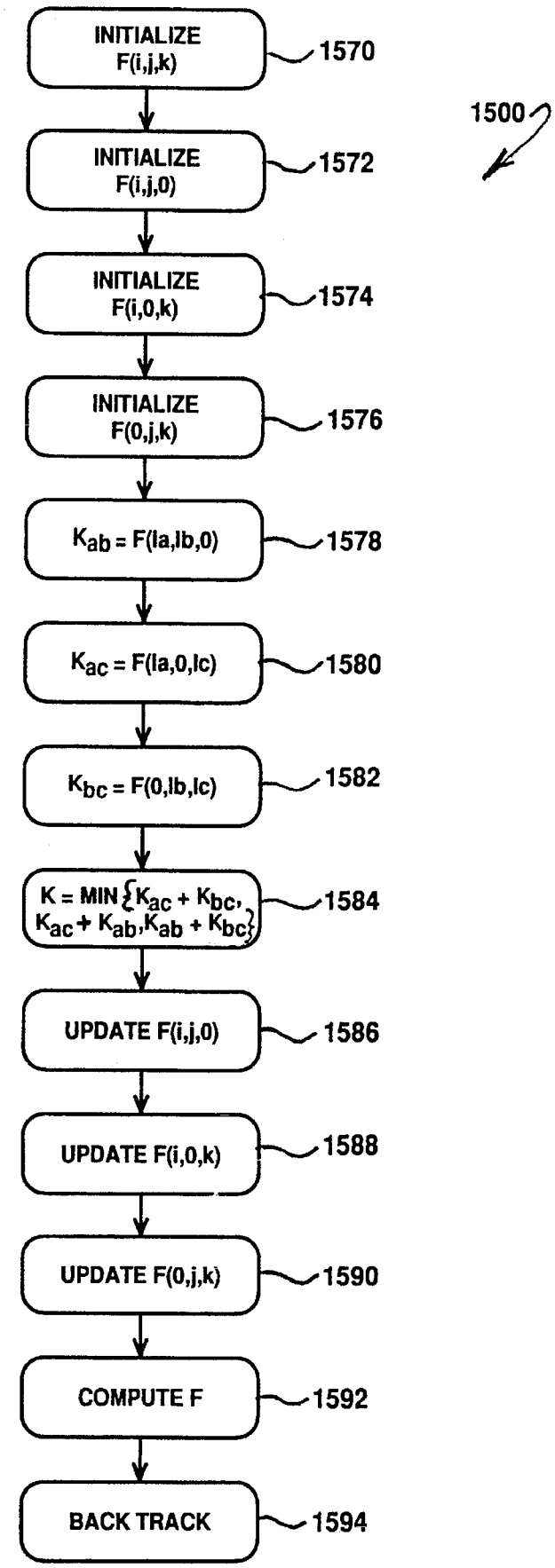
FIG. 31 is a flow chart describing a common ancestor function, caf(a,b,c)

Referring to FIG. 31, a routine for computing an output for the common ancestor function as described in conjunction with block 1500 in FIG. 29 is illustrated in expanded detail. A three-dimensional matrix designated, F, is developed with this routine, however it is simpler, being invoked upon three lines as opposed to three pages. Each string in the instant case is a line which is a string of symbols. With this procedure, three lines, a, b, and c are evolved which are somehow garbled. The procedure seeks to find the correct line from those three. Looking to the figure, at block 1570, it may be observed that the matrix, F, is initialized, for example, by being filled with values that are infinite. Then, as represented at block 1572, the i, j face of the matrix, F, is initialized by being filled with infinite values. The routine then progresses to block 1574 which provides for the initialization of the i, k face of the matrix F by filling the cells thereof with values at ∞ and, finally, the initialization is completed with the instructions at block 1576 providing for the initialization of the j, k face of the matrix F by filling the cells thereof with ∞ value.

Following such initialization, an upper bound is computed in conjunction with the development of three values $K_{ab}$, $K_{ac}$, and $K_{bc}$. Note, for example, at block 1578 that the value $K_{ab}$ is made equal to F(1a,1b,0), where 1a is the length of line a and 1b is the length of line b. The routine then progresses to the procedure at block 1580 where the value Kac is made equal to F(1a,0,1c), where 1c is the length of line c. Finally, as represented at block 1582, the value $K_{bc}$ is made equal to F(0,1b,1c).

The upper bound, K, then is established as the minimum value of $K_{ac}+K_{bc}$, $K_{ac}+K_{ab}$, or $K_{ab}+K_{bc}$.

The program then proceeds as represented at block 1586 where corrections under the developed upper bound K are made as updates at location F(i,j,0) and, similarly, the matrix locations F(i,0,k) are updated. Finally, as represented at block 1590, matrix locations F(0,j,k) are updated. With the above data, then the matrix, F is computed as represented at block 1592 and, as represented at block 1594 a back track through the matrix is carried out to determine minimum edit distance in the manner quite similar to the procedure described in conjunction with FIG. 29.

Figure 32:
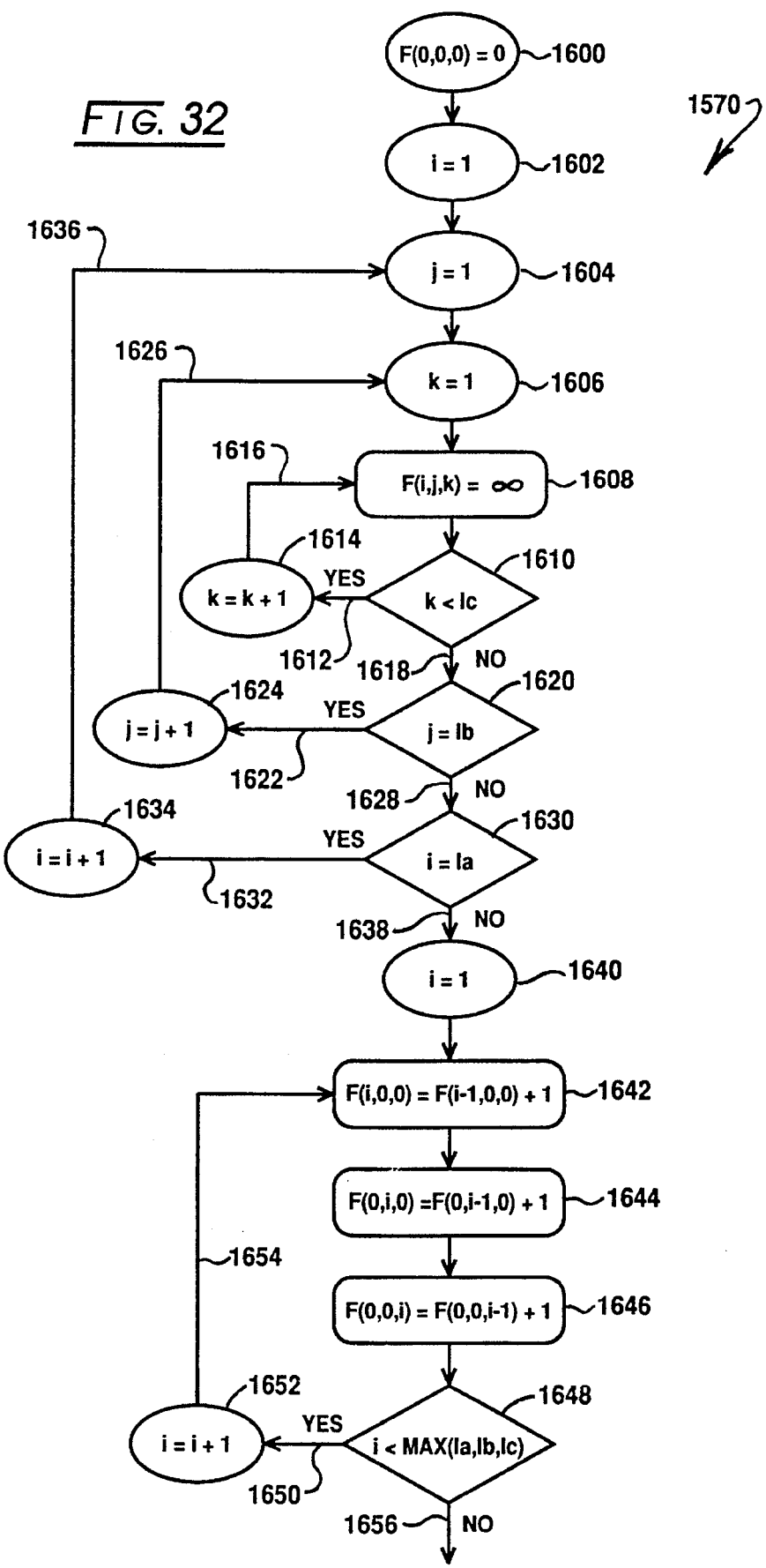
FIG. 32 is a flow chart describing a block within FIG. 31 identified as "Initialize F(i,j,k)"

Referring to FIG. 32, an expanded illustration of the procedure for initializing the F matrix as described in conjunction with block 1570 is provided. Accordingly, the latter numeration is shown in general form on the figure. The initialization provides for an initial setting of all matrix values to zero as represented at symbol 1600, whereupon, as represented at symbols 1602, 1604, and 1606, the respective values for position indices i, j, and k are set to 1. Then, as represented at block 1608, the matrix, F(i,j,k) is filled with ∞ values. The routine then progresses to the test at block 1610 where a determination is made as to whether k is less than the number of symbols in line c, 1c. In the event that it is less than that value, then as represented at line 1612, symbol 1614, and line 616, the value of k is incremented by 1 and the routine loops to block 1608.

With a negative determination with respect to the test posed at block 1610, as represented at line 1618 and block 1620, a test then is made as to whether the value j is less than the length of line b, 1b. In the event that it is less than that value, then as represented at line 1622, symbol 1624, and line 1626, the value of j is incremented by 1 and the routine loops to symbol 1606 resetting the value of k to 1. Where the test at block 1620 results in a negative determination, then as represented at line 1628 and block 1630, a test is made as to whether the value i is less than the length of line a, 1a. In the event that it is less than that value, then as represented at line 1632, symbol 1634, and line 1636, the value of i is incremented by 1 and the routine loops to symbol 1604. Where a negative determination is made with respect to the test at block 1630, then as represented at line 1638 and block 1640, the index value, i is set to 1 and the edges of the matrix F are initialized. In this regard, referring to block 1642, the i edge of matrix x is initialized with a value representing the previous value at that edge plus 1. Similarly, as represented at block 1644, the j edge of the matrix F is initialized with the previous value at that position plus 1 and, correspondingly, as represented at block 1646, the k edge of matrix F is initialized with a value representing the previous value at that location plus 1. The routine then is directed to the test represented at block 1648 where a determination is made as to whether the index, i, is less than the maximum of the symbol numbers in line a, line b, or line c. In the event of an affirmative determination with respect to this test, then as represented at line 1650, symbol 1652, and line 1654, the value of i is incremented by 1 and the routine loops to block 1642. With a negative determination with respect to the test at block 1648, then as represented at line 1656, this initialization procedure is completed and the routine continues.

Figure 33:
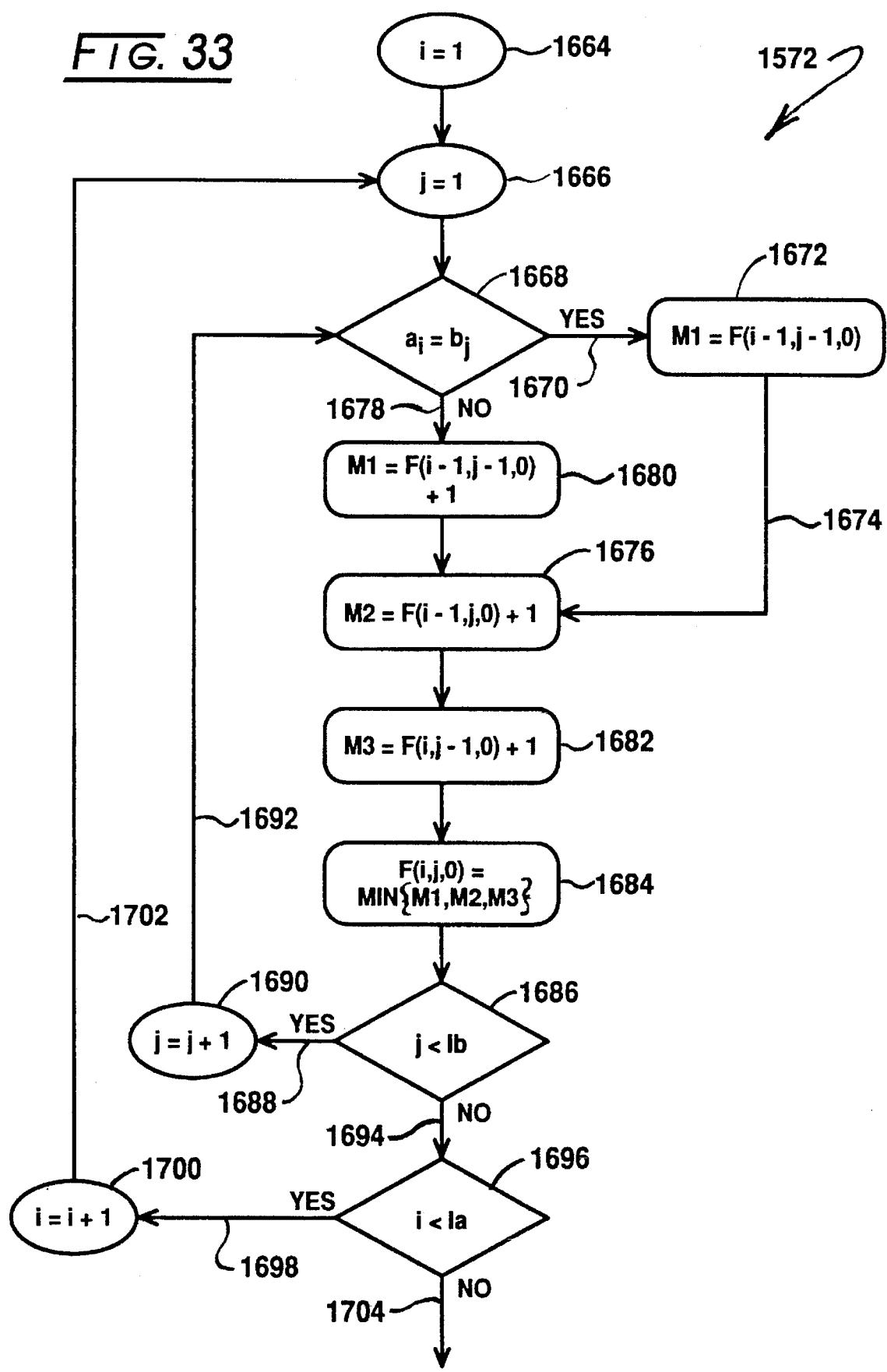
FIG. 33 is a flow chart describing a block within FIG. 31 identified as "Initialize F(i,j,0)"

Referring to FIG. 33, the routine initializing the face i, j of matrix F is revealed. This figure provides an expansion of block 1572 described in conjunction with FIG. 31. Accordingly, that numeration reappears in the instant figure in generalized form. Referring to the figure, the index i initially is set to 1 as represented at symbol 1664 and the index j is similarly set to a value of 1 as represented at symbol 1666. The routine then carries out an initialization which is a form wherein a string edit distance calculation is embedded therein. As shown at block 1668, a determination is made as to whether the ith character or symbol in line a is equal to the jth character or symbol in line b. If the result of that test is true, then as represented at line 1670 and block 1672, a value m1 is set to be equal to the previous value in that plane or F(i−1,j−1,0). The routine then proceeds as represented by line 1674 to the derivation of the value m2 as represented at block 1676. Where the test at block 1668 results in a negative determination, then as represented at line 1678 and block 1680, the value m1 is computed as the previous value at that face plus 1. The routine then proceeds to block 1676 where the value m2 is computed as the value previously at that face, or F(i−1, j,0)+1. Then, as represented at block 1682, the value m3 is computed as the previous value at that plane or F(i,j−1,0)+1. The routine then proceeds to fill the value of the i,jth entry as the minimum of m1, m2, or m3, as represented at block 1684. Then, as represented at block 1686, a test as to whether j is less than the number of symbols of line b, 1b is made. With an affirmative determination as to that test, then as represented at line 1688, symbol 1690, and line 1692, the value of j is incremented by 1 and the routine loops to the inquiry at block 1668. With a negative response to the test posed at block 1686, then as represented at line 1694 and block 1696, a determination is made as to whether the value of index i is less than the number of symbols in line a, 1a. In the event that it is, then as represented at line 1698, symbol 1700, and line 1702, the value of i is incremented by 1 and the routine loops to symbol 1666. A negative response to the test posed at block 1696 results in a continuation of the general program as represented at line 1704.

Figure 34:
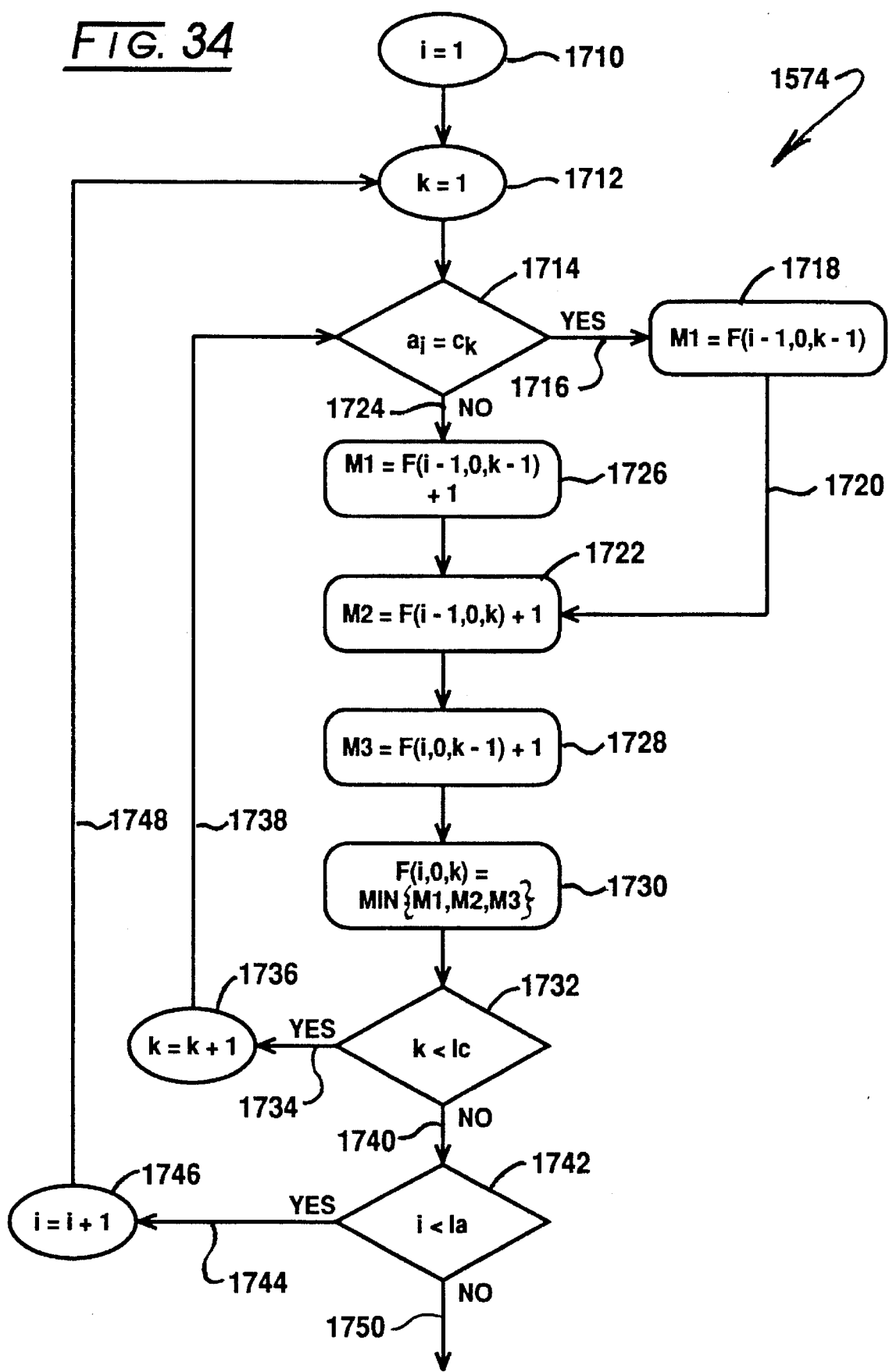
FIG. 34 is a flow chart describing a block within FIG. 31 identified as "Initialize F(i,0,k)"

Referring to FIG. 34, the routine for carrying out the initialization of the i, k face of matrix F is revealed. This routine was described in general at block 1574 in FIG. 31 and that numeration reappears in FIG. 34. Referring to the latter figure, the initialization routine commences with setting the value of index i to 1 as represented at symbol 1710. Similarly, as represented at symbol 1712, the value of the index k is set to 1 and as represented at block 1714, a test is carried out to determine whether the ith symbol in line a is equal to the kth symbol in line c. Where that test results in an affirmative determination, then as represented at line 1716 and block 1718, a value m1 is set to the previous value at that plane, or F(i−1,0,k−1). The routine then continues as represented at line 1720 to the procedure represented at block 1722.

Where the test at block 1714 results in a negative determination, then as represented at line 1724 and block 1726, the value m1 is computed as the previous value, F(i−1,0,k−1)+1. The routine then progresses to block 1722 where a value m2 is computed as the value of the previous entry in the plane at that location, which is F(i−1,0,k)+1.

The value m3 then is computed as represented at block 1728 as the previous value at the matrix face or F(i,0,k−1)+1. Then, as represented at block 1730, the i,kth entry then is determined as the minimum of the values m1, m2, or m3. The routine then progresses to the inquiry at block 1732 where a determination is made as to whether k is less than the number of symbols i line c, 1c. In the event of an affirmative determination, then as represented at line 1734, symbol 1736, and line 1738, the value of k is incremented by 1 and the routine loops to the inquiry at block 1714. With a negative response to the test posed at block 1732, then as represented at line 1740 and block 1742, a determination is made as to whether the index value i is less than the number of symbols in line a, 1a. Where the result of this test is in the affirmative, then as represented by line 1744, symbol 1746, and line 1748, the value of i is incremented by 1 and the routine loops to symbol 17 12. Correspondingly, a negative determination as to the test represented at block 1742 results in a continuation within the general program as represented by line 1750.

Figure 35:
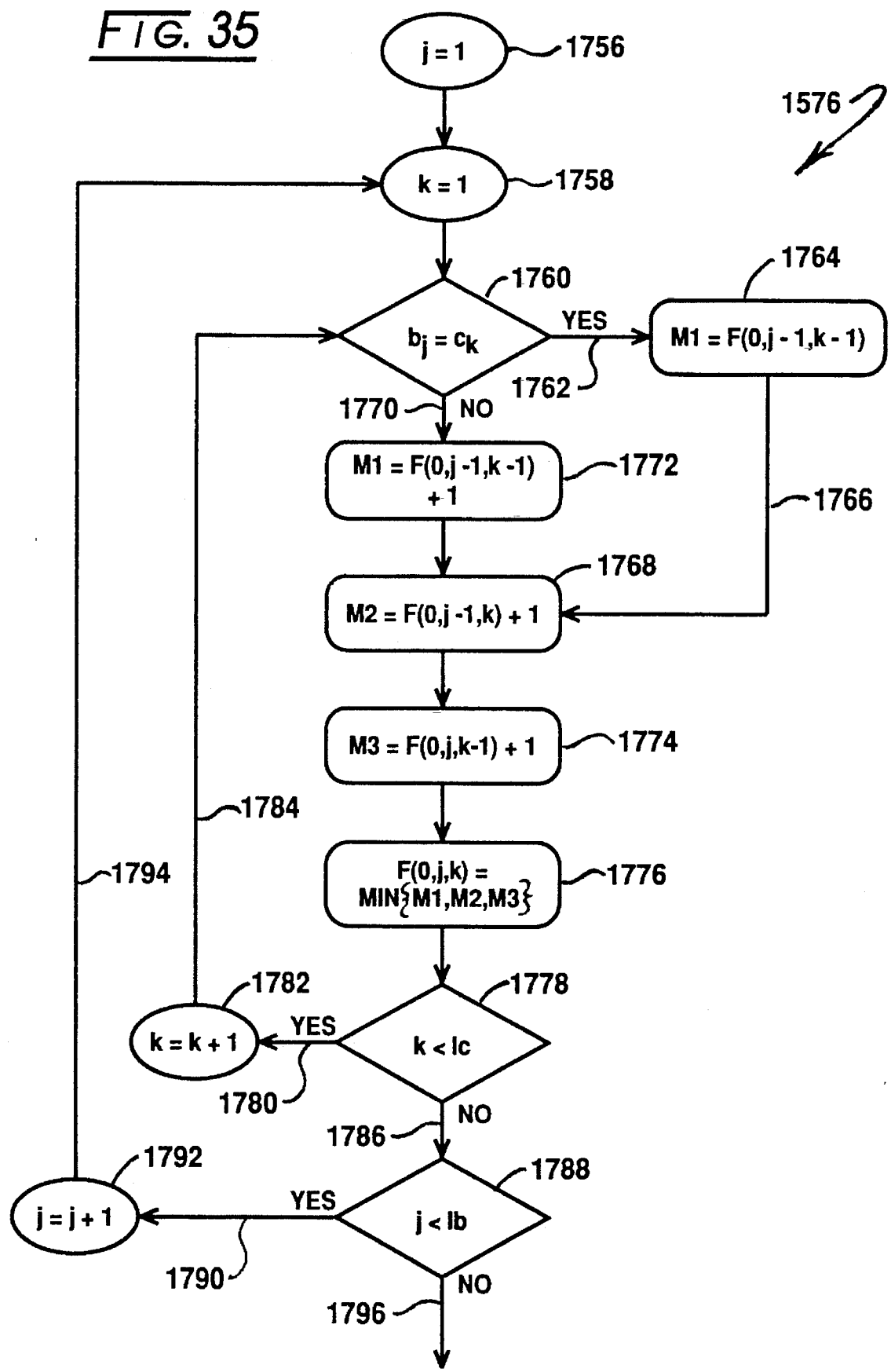
FIG. 35 is a flow chart describing a block within FIG. 31 identified as "Initialize F(0,j,k)"

Referring to FIG. 35, a diagrammatic illustration showing expansion of the initialization of the j,k face of matrix F is revealed. This initialization has been referred to in general at block 1576 in FIG. 31 and that numeration appears again in general fashion at FIG. 35. The initialization procedure is similar to that described in conjunction with FIGS. 33 and 34 and commences as represented at symbol 1756 with the setting of position index j to a value of 1. Similarly, as represented at symbol 1758, the index k is set to a value of 1. The routine then carries out the test represented at block 1760 where a determination is made as to whether the jth symbol of line b is equal to the kth symbol of line c. In the event that it is, then as represented at line 1762 and block 1764, the value m1 is established as the previous value at that face which is F(0,j−1,k−1). The routine then continues as represented at line 1766 to the procedure at block 1768. With a negative determination as to the test posed at block 1760, then as represented at line 1770 and block 1772, the value m1 is set to the previous value, f(0,j−1,k−1)+1. The routine then derives the value m2 as the previous value at the matrix face, F(0,j−1,k)+1. Following that computation, the routine computes the value m3 as the previous value F(0,j,k−1)+1. With the determination of values m1−m3, then the value of the j, kth entry is made equal to the minimum of the values m1−m3 as represented at block 1776. The routine then carries out a test as to whether the value of index k is less than the number of symbols within line c, 1c, as represented at block 1778. In the event of an affirmative determination with respect to that test, then as represented at line 1780, symbol 1782, and line 1784, the value of k is incremented by 1 and the routine loops to the test posed at block 1760. With a negative determination as to the test posed at block 1778, then as represented at line 1786 and block 1788, a test is made as to whether the value j is less than the number of symbols within line b, 1b. With an affirmative response to that test, then as represented at line 1790, symbol 1792, and line 1794, the value of j is incremented by 1 and the routine loops to symbol 1758. A negative determination with respect to the test posed at block 1788 results in a continuation of the general program as represented at line 1796.

Figure 36:
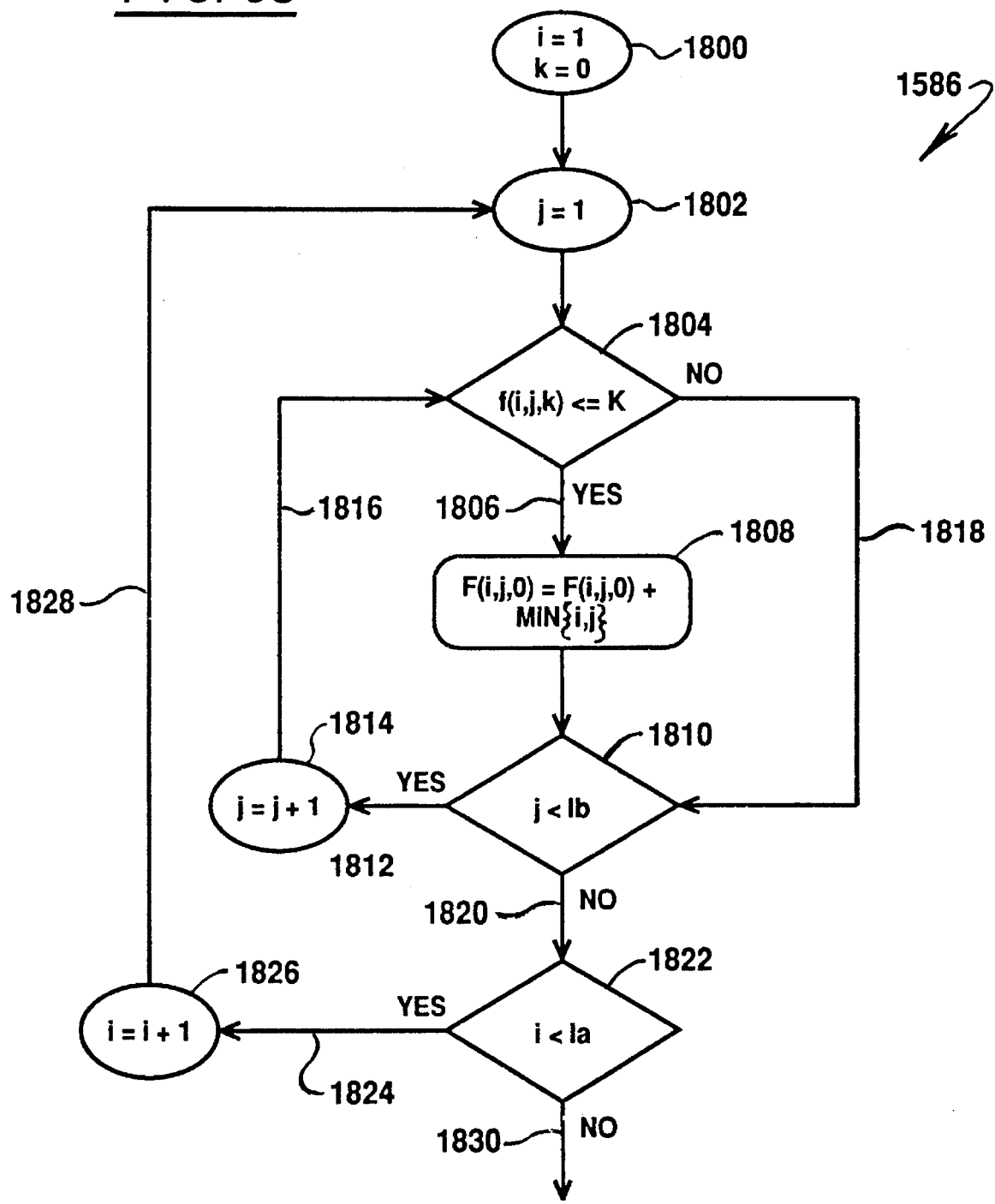
FIG. 36 is a flow chart describing a block within FIG. 31 identified as "Update F(i,j,0)"

Referring to FIG. 36, a diagrammatic illustration expanding earlier-described block 1586 from FIG. 31 is provided. This routine looks to an updating of the face i,j of matrix F as described in conjunction with block 1586 in FIG. 31. Accordingly, that numeration reappears in FIG. 36 in general fashion. The routine commences as represented at symbol 1800 where the index i is set to 1 and the index k is set to zero. Similarly, as set forth at symbol 1802, the index j is set equal to 1. Then, as represented at block 1804, a test is carded out to determine whether the function f(i,j,k) is less than or equal to the upper bound, K. This function is equal to the minimum of the absolute value of (i−j,j−k,i−k). It may be recalled from earlier-described FIGS. 33–36 that the base of the matrix F under consideration contains edit distances. However, those edit distances which actually are entered into calculations need to be updated. Accordingly, the test at block 1804 determines which of those edit distances require updating as being below upper bound. K. Accordingly, with an affirmative determination with respect to the test posted at block 1804, then as represented at line 1806 and block 1808, an updating is carried out wherein the matrix position F(i,j,0) is made equal to the previous value plus the minimum of i and j. The routine then progresses to the inquiry at block 1810 where a determination is made as to whether index j is less than the number of symbols in line b, 1b. Where that test results in an affirmative determination, then as represented at line 1812, symbol 1814, and line 1816, the routine loops to the inquiry at block 1804. Correspondingly, where the inquiry at block 1804 shows that the upper bound K is exceeded, then as represented at line 1818, the test posed at block 1810 is carried out. Where the value of j is greater than the number of symbols in line b as determined at block 1810, then as represented at line 1820 and block 1822, a determination is made as to whether the index i has a value less than the number of symbols in line a, 1a. Where that is the case, then as represented at line 1824, symbol 1826, and line 1828, the value of i is incremented by 1 and the routine loops to symbol 1802. Where the test posed at block 1822 results in a negative determination, then the routine continues to its next stage as represented at line 1830.

Figure 37:
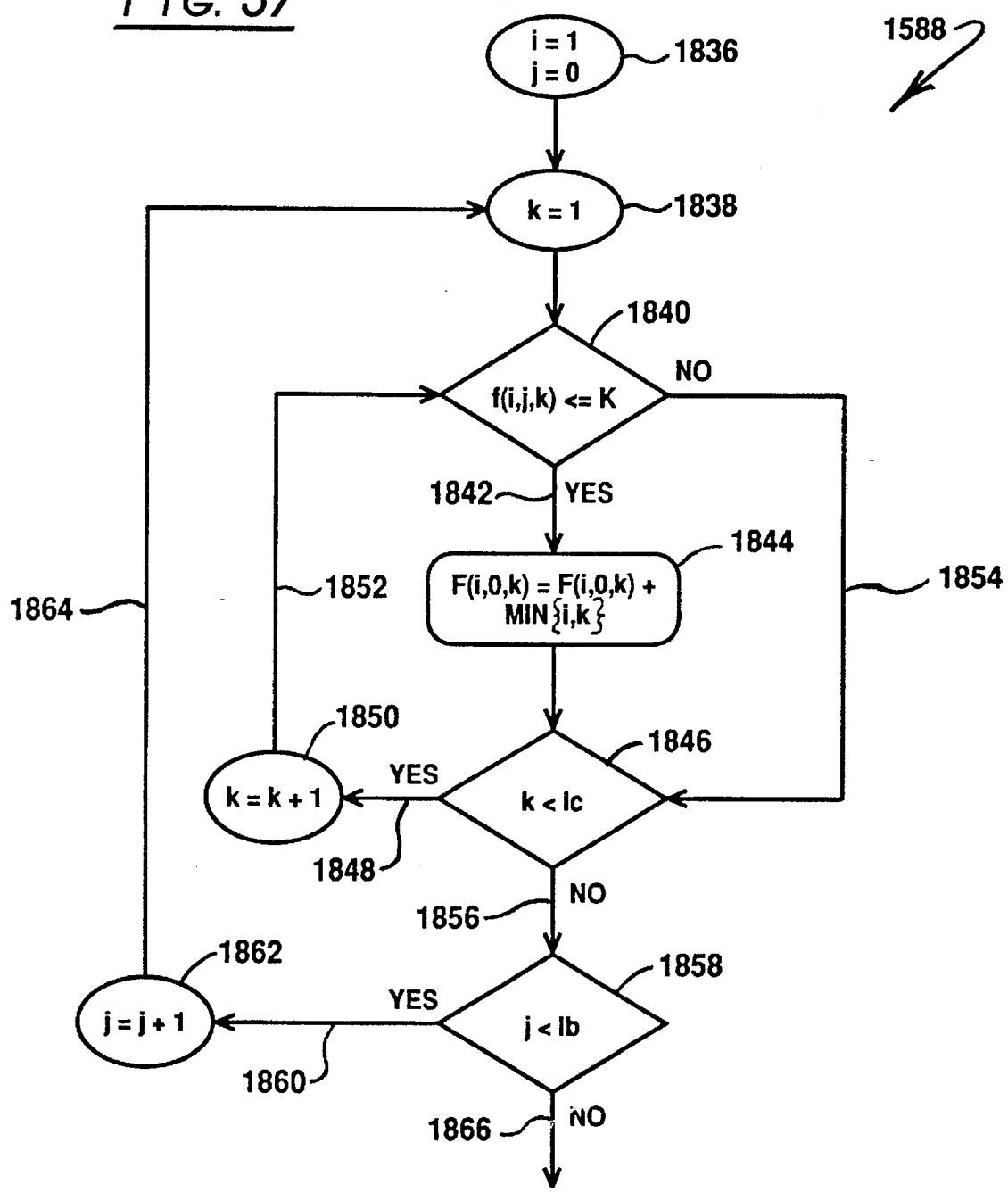
FIG. 37 is a flow chart describing a block within FIG. 31 identified as "Update F(i,0,k)"

Block 1588 in FIG. 31 calls for an updating of the i,k face of matrix F. Referring to FIG. 37, an expanded representation of this update procedure is represented with the same generalized numeration of 1588. The routine initially carries out the setting of the index value of i to 1 and the index value of j to zero as represented at symbol 1836. Additionally, as represented at symbol 1838, the index k is set to 1 and the routine progresses to the test represented at block 1840. At this block, the function f(i,j,k) is evaluated as to whether it is less than or equal to an upper bound, K. Where that condition exists, then as represented at line 1842 and block 1844, a computation is carried out wherein the value at position F(i,0,k) is set as the previous value plus the minimum value of i or k. The routine then progresses to the inquiry at block 1846 where a determination is made as to whether the index k has a value less than the number of symbols in line c, 1c. Where an affirmative determination is made with respect to that test, then as represented at line 1848, symbol 1850, and line 1852, the value of k is incremented by 1, and the routine loops to the test posed at block 1840. Where that test at block 1840 results in a negative determination, then as represented at line 1854, the routine diverts to the test at block 1846, no computation as represented at block 1844 being required. Where the inquiry at block 1846 results in a negative determination as to the test posed, then as represented at line 1856 and block 1858, a test is made as to whether the value j is less than the number of symbols in line b, 1b. Where that test results in an affirmative determination, then as represented at line 1860, symbol 1862, and line 1864, the value of j is incremented by 1 and the routine loops to symbol 1838. Correspondingly, where the inquiry at block 1858 results in a negative determination, then the routine continues within the main program as represented at line 1866.

Figure 38:
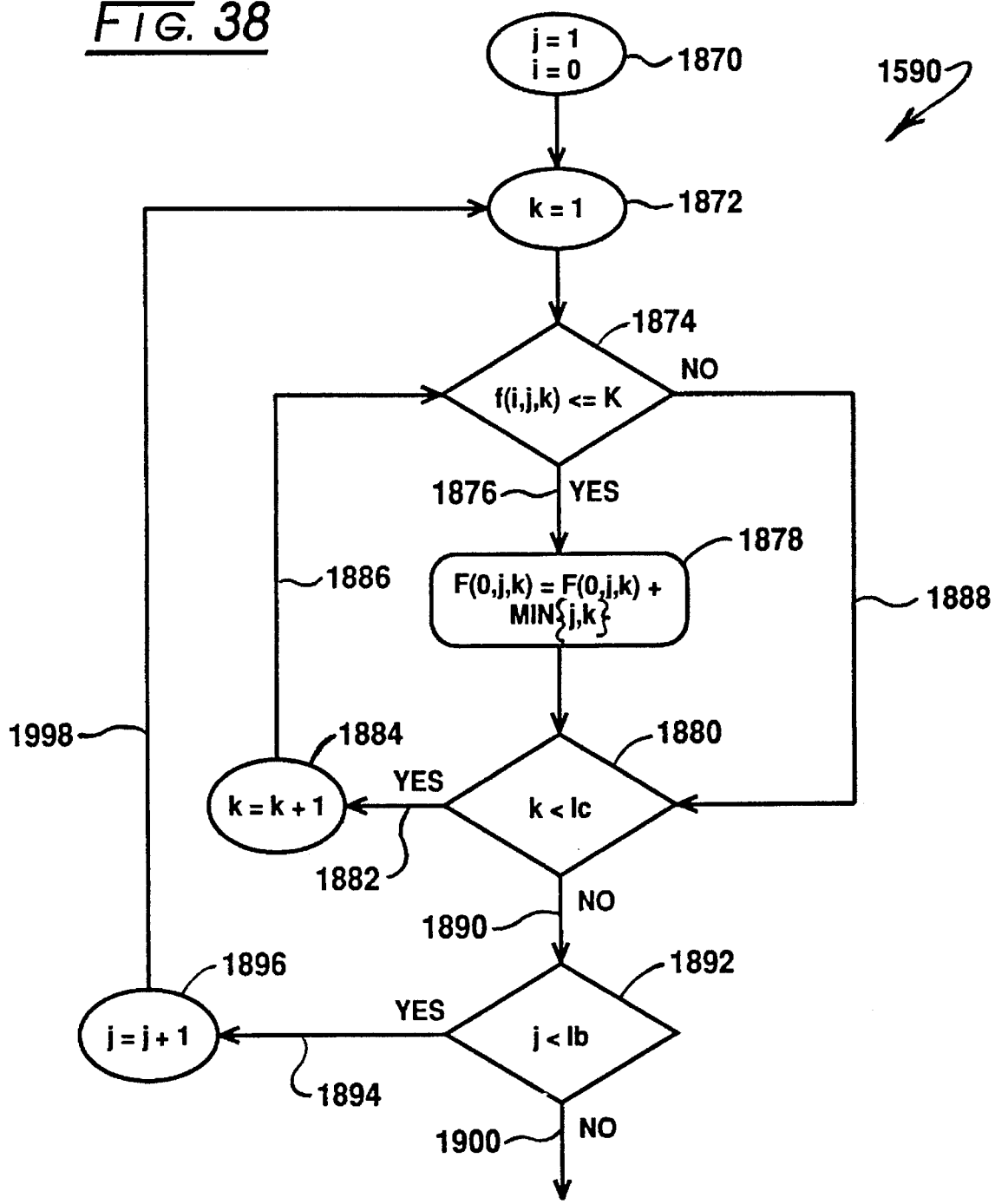
FIG. 38 is a flow chart describing a block within FIG. 31 identified as "Update F(0,j,k)"

Referring to FIG. 38, the same procedure is illustrated for employment in conjunction with face j,k of matrix F. The routine is entered at symbol 1870 wherein the positional index j is set to 1 and index is set to zero. Then, as represented at symbol 1872, the index k is set to 1 and the routine progresses to the test posed at block 1874. At that block, a determination is made as to whether the function f(i,j,k) is less than or equal to upper bound, K. Where that is the case, then as represented at line 1876 and block 1878, a computation is made wherein the face entry F(0,j,k) is made equal to the previous entry plus the minimum value of either j or k. The routine then progresses to the inquiry posed at block 1880 where a determination is made as to whether the index k has a value less than the number of symbols in line c, 1c. Where that is the case, then as represented at line 1882, symbol 1884, and line 1886, the value of k is incremented by 1 and the routine loops to block 1874. Were the inquiry at that same block results in a negative determination such that the upper bound K is exceeded, then as represented at line 1888, the routine immediately reverts to the test at block 1880. Where that test at block 1880 results in a negative determination, then as represented at line 1890 and block 1892, a test is made as to whether the value of j is less than the number of symbols in line b, 1b. In the event of an affirmative determination, then as represented at line 1894, symbol 1896, and line 1898, the value of j is incremented by 1 and the routine loops to symbol 1872. Conversely, where the test posed at block 1892 results in a negative determination, then the principal program is continued as represented at line 1900.

With the routines associated with FIGS. 32–38, the three faces of the matrix, F, as well as the edges thereof have been initialized. Upon the completion of such initialization, it is then necessary to compute the entry in the three-dimensional matrix. However, as before, only those entries which are within a diagonal are computed. This procedure has been generally referred to in connection with block 1592 of FIG. 31 and, that numeration reappears in FIG. 39 where a routine is provided for carrying out the computation of the necessary components for the F matrix. As in the earlier matrix computation, a determination is made as to whether the function to be inserted is less than or equal to an upper bound. If it is, then a computation of the values m1-m7 is carried out in similar fashion as the principal procedure discussed in conjunction with FIG. 26. For the present case, however, there is a different weighting function which may be considered simpler. In the discourse to follow, the symbol, $\lambda$, represents a null character, i.e. a character within a string which has been deleted or wherein a character has been inserted.

Figure 39:
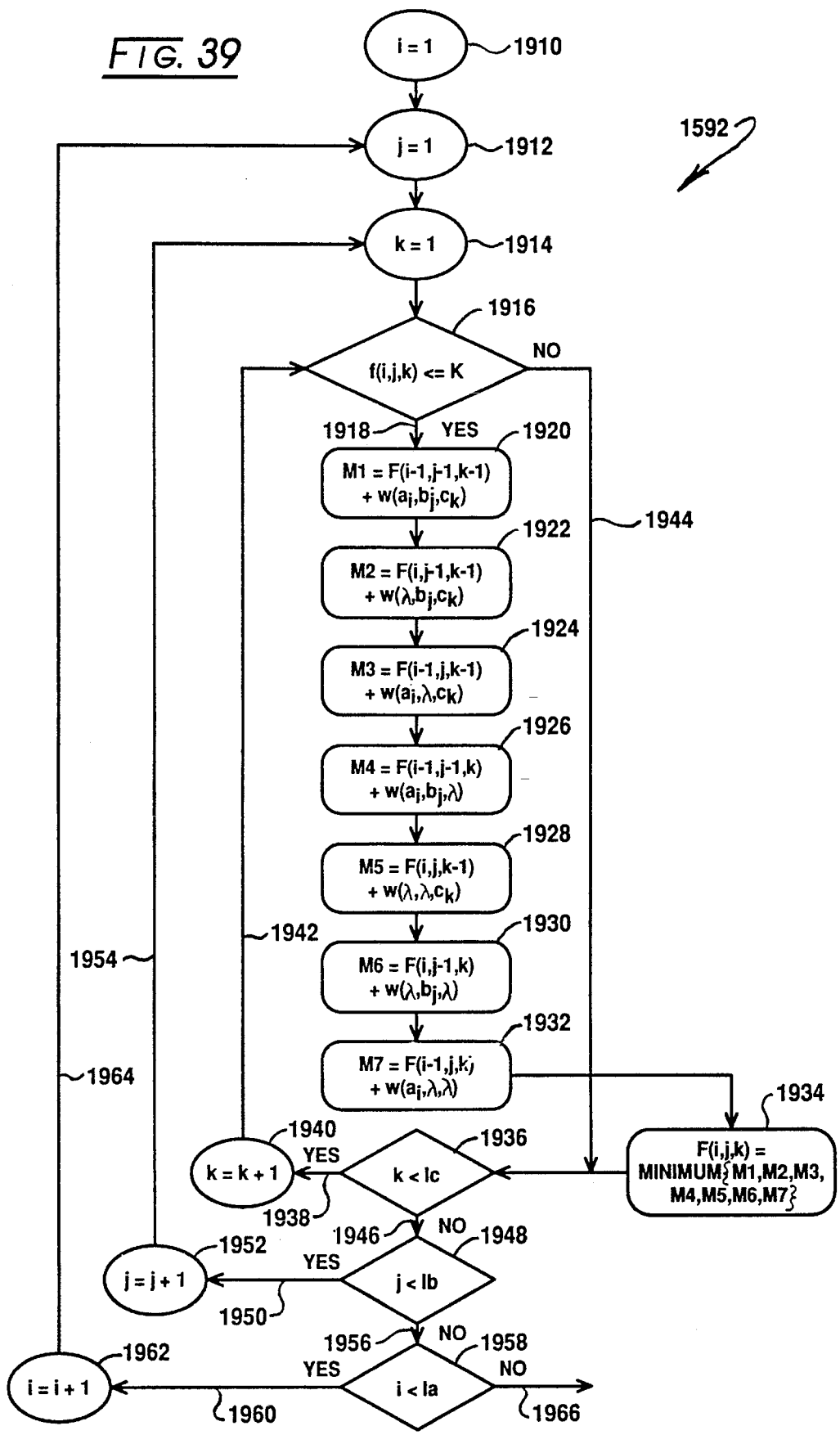
FIG. 39 is a flow chart describing a block within FIG. 31 identified as "Compute F"

Referring to FIG. 39, the routine commences with symbol 1910 and the setting of positional index i equal to 1. Similarly, as represented at symbols 1912 and 1914, the positional indices j and k are respectively set to 1. The routine then progresses to the test posed at block 1916 as to whether the function f(i,j,k) is equal to or less than an upper bound, K. In the event that it is, then as represented at line 1918 and block 1920, a value m1 is computed as the previous function F(i–1,j–1,k–1) plus the weighting factor $w(a_i, b_j, c_k)$. Then, as represented at block 1922, the value m2 is computed as the previous value, F(i,j–1,k–1) plus the weighting factor $w(\lambda, b_j, c_j)$. At block 1924, the value m3 is computed as the previous value F(i–1,j,k–1) plus the weighting factor $w(a_i, \lambda, c_k)$. At block 1926, the value m4 is computed as the previous value F(i–1,j–1,k) plus the weighting factor $w(a_i, b_j, \lambda)$. At block 1928, the value m5 is computed as a previous value F(i,j,k–1) plus the weighting factor $w(\lambda, \lambda, c_k)$. At block 1930, the value m6 is computed as a previous value F(i,j–1,k) plus a weighting factor $w(\lambda, b_j, \lambda)$. At block 1932, the value of m7 is computed as a previous value F(i–1,j,k) plus the weighting factor $w(a_i, \lambda, \lambda)$.

With the computation of m1 through m7, then the matrix entry, F(i,j,k) is computed as the minimum of the above-computed values m1–m7.

The routine then continues to the query posed at block 1936 where a determination is made as to whether the index value k is less than the number of symbols in line c, 1c. In the event of an affirmative determination, then as represented at line 1938, symbol 1940, and line 1942, the value of k is incremented by 1 and the routine loops to the inquiry at block 1916. At block 1916, where the bounding test shows that the function involved exceeds the upper bound, then as represented at line 1944, the routine carries out no computations and immediately reverts to the query posed at block 1936.

Where the query at block 1936 results in a negative determination, then as represented at line 1946 and block 1948, a determination is made as to whether the value j is less than the number of symbols in line b, 1b. Where that is the case, then as represented at line 1950, symbol 1952, and line 1954, the value of j is incremented by 1 and the routine loops to symbol 1914. Where the inquiry at block 1948 shows that the value of j is not less than the number of symbols in line b, then as represented at line 1956 and block 1958, a test is made as to whether the value i is less than the number of characters or symbols in line a, 1a. Where i is less than 1a, then as represented at line 1960, symbol 1972, and line 1964, the value of i is incremented by and the routine loops to symbol 1912. A negative response to the test at block 1958 provides for re-entry into the principal program as represented at line 1966.

Figure 40:
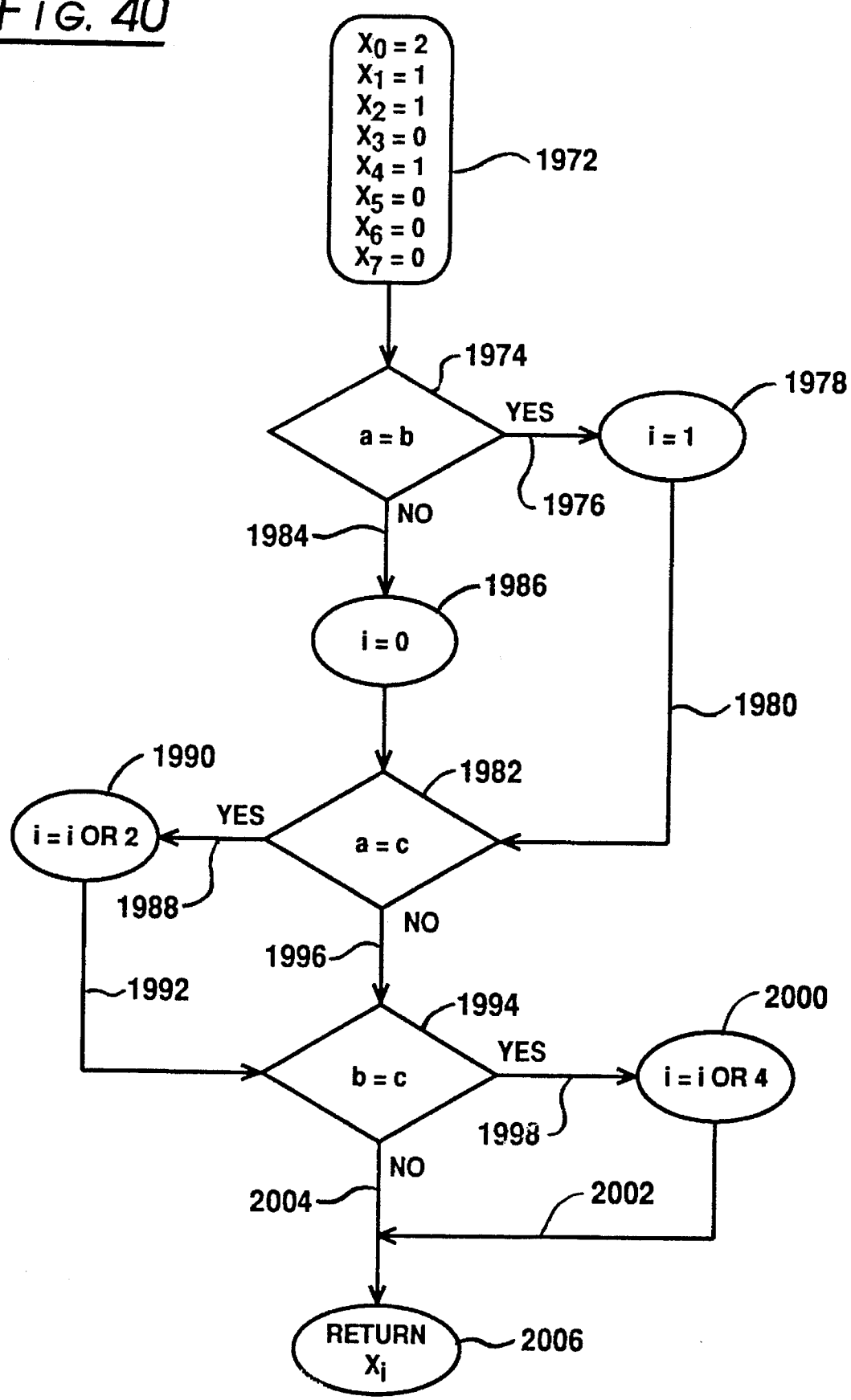
FIG. 40 is a flow chart describing a weighting technique identified as "w(a,b,c)"

Referring to FIG. 40, a technique for computing the minimum weight of a, b, and c as employed in conjunction with FIG. 39 is illustrated. The routine commences with the filling up of an eight entry array $x_0$–$x_7$ as represented at block 1972. The routine then progresses to the test at block 1974 querying whether a is equal to b. In the event that it is, then as represented at line 1976, symbol 1978, and line 1980, the index i is set equal to 1 and the routine loops to block 1982. With a negative response at block 1974, then as represented at line 1984 and symbol 1986, the value i is set to zero and the routine progresses to the test at block 1982. At block 1982, a determination is made as to whether a is equal to c. Where that is true, then as represented at line 1988 and symbol 1990, the index i is set to the bitwise OR of i and 2 and the routine continues to the inquiry at block 1994. In similar fashion, where the test at block 1982 is false, then the routine continues to block 1994 as represented by line 1996. The test posed at block 1994 determines whether b is equal to c. In the event that condition is true, then as represented by line 1998 and symbol 2000, the index i is set to the bitwise OR of i and 4. The routine then continues as represented at line 2002 to line 2004. Line 2004 emanates from a false determination with respect to the test at block 1994 and leads to symbol 2006 which serves to return to a next $x_i$ value.

Figure 41:
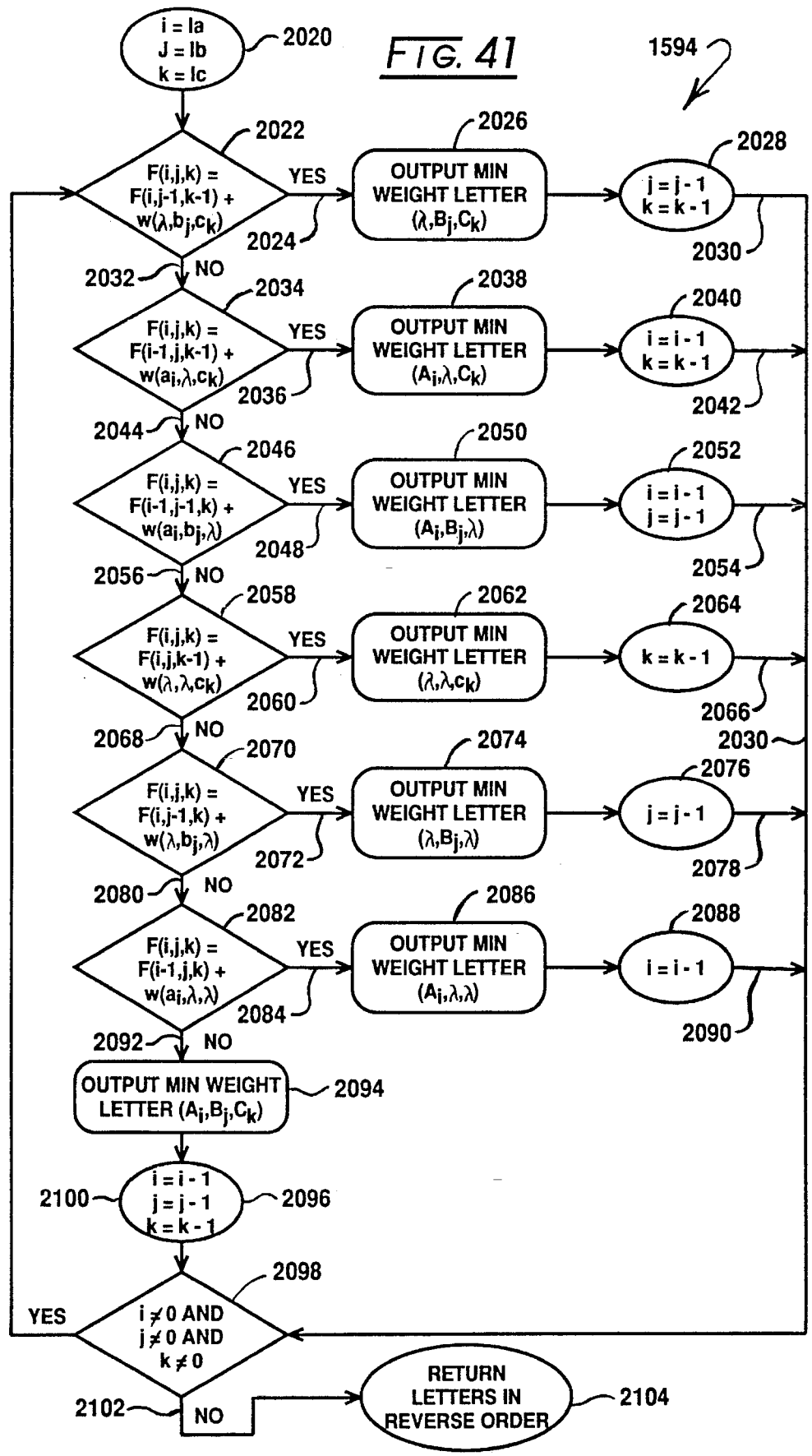
FIG. 41 is a flow chart describing a block within FIG. 31 identified as "Backtrack"

The final block in FIG. 31, block 1594, provided for a backtracking procedure through the computed matrix, F. Referring to FIG. 41, that backtracking function is illustrated in expanded detail. Accordingly, the numeration 1594 reappears in the figure in generalized form.

Referring to FIG. 41, the routine commences with symbol 2020 providing for setting index i to the number of symbols in line a, 1a; j to the number of symbols in line b, 1b; and k to the number of symbols in line c, 1c. As before, this positions the indices at the bottom of the diagonal of the three-dimensional matrix, F. The routine seeks to find the symbols that would fall from a minimum of calculation. In effect, one starts at the bottom of the diagonal and perceives how one could have gotten to that entry from any of the previous entries. With appropriate testing, then if it is determined that it is known how the current position was reached, then an output of the minimum weight letter or symbol is made. The indices then are decremented and the routine continues. In effect, seven positions, left, right, top bottom, and three diagonal locations are evaluated. Accordingly, as represented at block 2022, the function F(i,j,k) is tested for equality with F(i,j−1,k−1) plus the weighting factor w($\lambda$,$b_j$,$c_k$). Where that equality is present, then as represented at line 2024 and block 2026, the minimum weight letter ($\lambda$,$b_j$,$c_k$) is the output and as represented at symbol 2028, the index j is set to j−1 and the index k is set to k−1. The routine then continues as represented at line 2030.

Where the test at block 2022 is in the negative, then as represented at line 2032 and block 2034, the function F(i,j,k) is tested for equality with F(i−1,j,k−1) plus the weighting factor w($a_i$,$\lambda$,$c_k$). Where that equality is present, then as represented at line 2036 and block 2038, the minimum weight letter ($a_i$,$\lambda$,$c_k$) is outputted and, as represented at symbol 2040, the index i is set to i−1 and the index k is set to k−1. The routine then progresses as represented by line 2042 to line 2030.

Where the test at block 2034 results in a negative determination, then as represented by line 2044 and block 2046, a test is carried out to determine whether the function F(i,j,k) is equal to F(i−1,j−1,k) plus the weighting factor w($a_i$,$b_j$,$\lambda$). In the presence of equality, then as represented at line 2048 and block 2050, the minimum weight letter ($a_i$,$b_j$,$\lambda$) is outputted and, as represented at symbol 2052, the index i is set to i−1 and the index j is set to j−1. The routine then continues as represented at line 2054 to line 2030.

Where the test at block 2046 results in a negative determination, then, as represented at line 2056 and block 2058, a test is made for equality between the function F(i,j,k) and F(i,j,k−1) plus the weighting factor w($\lambda$,$\lambda$,$c_k$). In the presence of an equality, then as represented at line 2060 and block 2062, the minimum weight letter ($\lambda$,$\lambda$,$c_k$) is outputted and, as represented at symbol 2064, the index k is set to k−1 and the routine continues as represented at line 2066 to line 2030.

Where the test at block 2058 results in a negative determination, then as represented at line 2068 and block 2070, the function F(i,j,k) is tested for equality with F(i,j−1,k) plus the weighting factor w($\lambda$,$b_j$,$\lambda$). In the presence of an equality, then as represented at line 272 and block 2074, the minimum letter ($\lambda$,$b_j$,$\lambda$) is outputted and, as represented at symbol 2076, the index j is decremented by 1. The routine then continues as represented at line 2078 to line 2030.

Where the test posed at block 2070 results in a negative determination, then as represented at line 2080 and block 2082, a test is carried out as to whether the function F(i,j,k) is equal to the function F(i−1,j,k) plus the weighting factor w($a_i$,$\lambda$,$\lambda$). In the event of an equality, then as represented at line 2084 and block 2086, the minimum weight letter ($a_i$,$\lambda$,$\lambda$) is outputted and, as represented at symbol 2088, the index, i, is decremented by 1. The routine then continues as represented by line 2090 to line 2030.

In the event of a negative determination with respect to the test posed at block 2082, then as represented at line 2092 and block 2094, the minimum weight letter ($a_i$,$b_j$,$c_k$) is outputted and, as represented at symbol 2096, the indices i, j, k are each decremented by 1. The routine then progresses to the test at block 2098 to determine whether each of the indices has a value less than zero. At a zero value, the indices will be located at the top of the noted matrix diagonal. Note that line 2030 also is directed to block 2098 and, where the test threat is true, then as represented at line 2100, the routine loops to block 2022. Where each of the indices has reached a zero value, then as represented at line 2102 and symbol 2104, the letters are returned in reverse order for storage facilitation.

Figure 42:
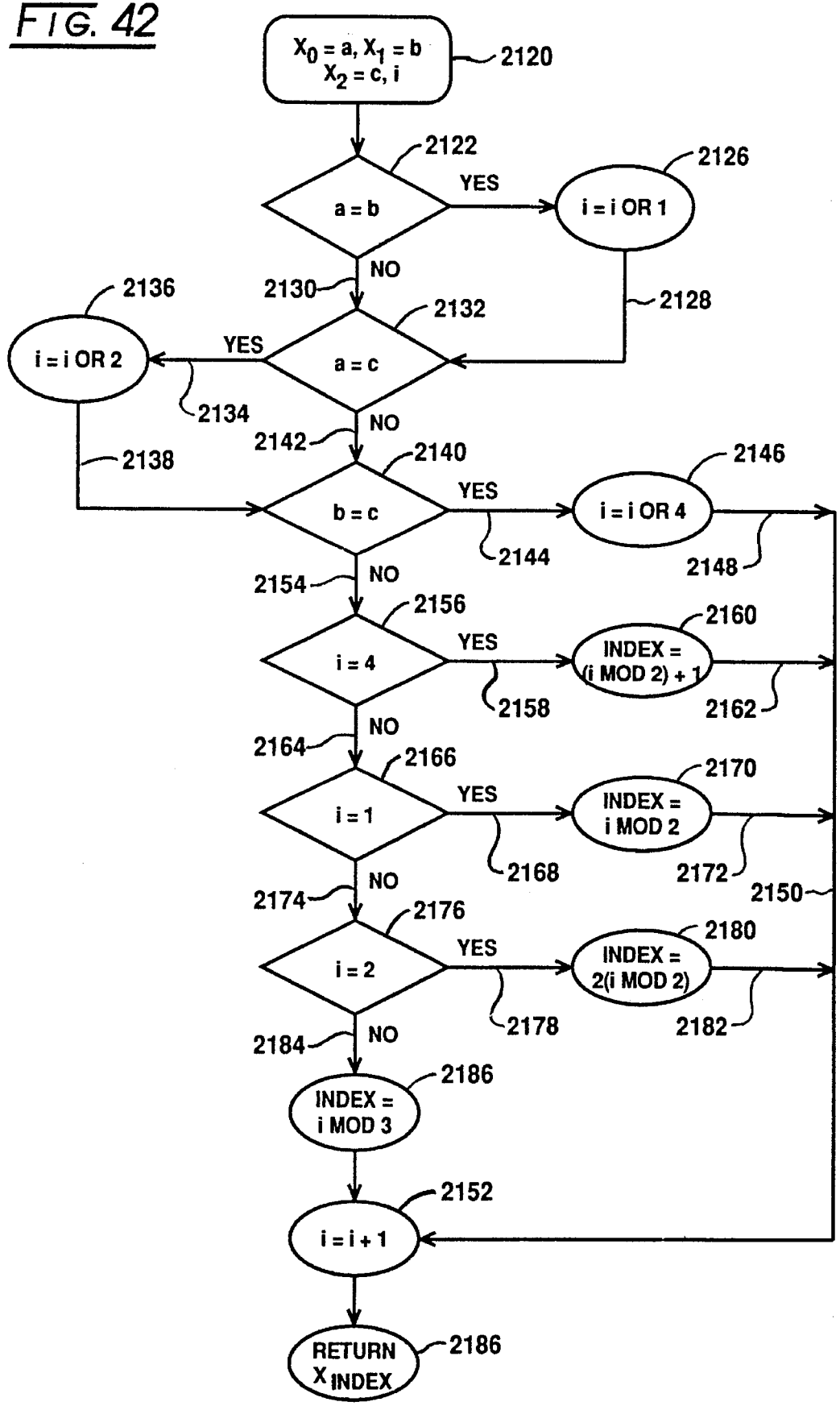
FIG. 42 is a flow chart describing a minimum weight letter (a,b,c) function employed with the routine of FIG. 41.

Referring to FIG. 42, a routine is provided for identifying a minimum weight letter. By selecting a minimum weight letter, the system is picking the most likely proper letter from the letter strings or character strings investigated. This is a procedure as called for in conjunction with FIG. 31. Looking to the figure, as represented at block 2120, the indices are assigned. In this regard, $x_0$ is made equal to a; $x_1$ is made equal to b; $x_2$ is made equal to c; and an index i is maintained. The routine then progresses to the test at block 2122 wherein a determination is made as to whether there is an equality between a and b. If there is, then as represented by line 2124 and symbol 2126, the index i is set to i or 1. The routine then continues as represented by line 2128. Where the test is false at block 2122, then as represented by line 2130 and block 2132, a next test determining whether a is equal to c is made. Note that line 2128 also is addressed to block 2132. Where the test is true, then as represented at line 2134 and symbol 2136, the index i is set equal to the bitwise OR of i and 2 and the routine continues as represented by line 2138 to block 2140. Where the test at block 2032 results in a false determination, then as represented by line 2142, the routine progresses to the test at block 2140 which determines whether an equality exists between b and c. In the event such an equality exists, then as represented by line 2144 and symbol 2146, the index i is set to the bitwise OR of i and 4. The routine then continues as represented at lines 2148 and 2150 to symbol 2152 providing for the incrementing of the index i by 1.

Where the test at block 2140 results in a negative determination, then as represented by line 2154 and block 2156, a determination is made as to whether the index is is equal to 4. If that test is true, then as represented at line 2158 and symbol 2160, the index is equal to (i mod 2)+1 and the routine continues as represented by lines 2162 and 2150 to symbol 2152. Where the test at block 2156 results in a negative determination, then as represented by line 2164 and block 2162, a test is made as to whether the index i is equal to 1. In the event that the test results in a true determination, then as represented at line 2168 and symbol 2170, the index is set equal to i mod 2, and as represented at lines 2172 and 2150, the routine increments increments the index i by 1 as represented at symbol 2152.

Where the test posed at block 2166 results in a negative determination, then as represented at line 2174 and block 2176, a test is made as to whether the index i is equal to 2. Where that equality is present, then as represented at line 2178 and symbol 2180, the index is set to a value of 2(i mod 2) and the routine continues as represented at lines 2182 and. 2150 to symbol 2152 and the incrementing of the index i by 1. Where the test posed at block 2176 results in a negative determination, then as represented at line 2184 and symbol 2186, the index is made equal to i mod 3, and the routine progresses to symbol 2152 providing for the incrementing of the index i by 1. Then, as represented by symbol 2186, the routine returns the value of x at the index.

Since certain changes may be made in the above system and method without departing from the scope of the invention herein involved, it is intended that all matter contained in the above description or shown in the accompanying drawings shall be interpreted as illustrative and not in a limiting sense.

I claim:

1. A method for determining the content of an ancestral printed text from outputs of text to data conversion devices, each of said pages of printed text being made up of lines of symbols, and each of said outputs representing text symbols within strings-of-lines, said method comprising the steps of:

generating three separate ones of said outputs, A, B, and C, each of said three outputs being derived from a common one of said pages of said printed text, and each of said outputs being generated by an optical character recognition device;

merging said outputs A, B, and C by, determining edit distances of the strings of lines, each line considered as a single unit, between the outputs A and B, A and C, and B and C, recovering an optimal alignment between outputs A, B, and C by searching for the minimum edit distance D(A,B,C) by backtracking through the determined edit distances, and providing a derived output representing said content of said common one of said pages of printed text, the string-of-lines said derived output representing said optimal alignment; and recording said derived output on a memory medium.

2. The method of claim 1 including the step of computing an upper bound, K, on said edit distances; and said merging step is carried out by determining only those edit distances of value below said upper bound, K.

3. The method of claim 2 in which one of a said determined minimum edit distances between corresponding said strings of lines is the value of the minimum number of insertions, deletions, and substitutions transforming one said string to the other.

4. The method of claim 1 in which said merging step includes the step of deriving an edit distance array as a three-dimensional matrix having faces corresponding with paired outputs A and B, A and C, and B and C.

5. The method of claim 4 in which said merging step includes the step of initializing the entries of said edit distance array with a substantially large numerical value.

6. The method of claim 1, where said derived output is stored in a database.

7. The method of claim 1 in which said three outputs A, B, and C are derived from three different optical character recognition devices.

8. A method for determining the content of an ancestral printed text having pages composed of lines of symbols, from the outputs representing text symbols with strings-of-lines of a text to data conversion device comprising the steps of:

generating three of said outputs, A, B, and C, each of said outputs being derived from a common one of said pages of said ancestral printed text and each of said outputs being generated by an optical character recognition device;

computing an upper bound, K, on the edit distances between strings of lines represented within said outputs by deriving bounds, $K_{AB}$, $K_{AC}$, and $K_{BC}$, on each respective pair of said outputs A and B, A and C, and B and C and combining said bounds, $K_{AB}$, $K_{AC}$, and $K_{BC}$ to derive said upper bound, K, on the total of the edit distances in correspondence with the expression:

$K = \min(K_{AB}+K_{BC}, K_{AC}+K_{BC}, K_{AB}+K_{AC})$; then merging said outputs, A, B, and C by determining only those edit distances of value below said upper bound, K, between the strings of lines represented within outputs A and B, A and C, and B and C, then backtracking through the determined edit distances to recover an optimal alignment exhibiting a minimum edit distance D(A,B,C) to provide a merged output representing said content of said common one of said pages of said ancestral printed text; and then recording said merged output within the memory medium of a database.

9. A method for determining the content of an ancestral printed text having pages composed of lines of symbols, from the outputs representing text symbols within strings-of-lines of a text to data conversion device comprising the steps of:

generating three of said outputs, A, B, and C, each of said outputs being derived from a common one of said pages of said ancestral printed text and each of said outputs being generated by an optical character recognition device;

normalizing each of said outputs A, B, and C subsequent to said generation thereof by eliminating regions of said outputs not corresponding with said lines of symbols, then, merging said outputs A, B, and C by determining the edit distances between the strings of lines represented within outputs A and B, A and C, and B and C, then backtracking through the determined edit distances to recover an optimal alignment exhibiting a minimum edit distance D(A,B,C) to provide a merged output representing said content of said common one of said pages of said ancestral printed text; and then recording said merged output within the memory medium of a database.

10. A method for determining the content of an ancestral printed text having pages composed of lines of symbols, from the outputs representing text symbols within strings-of-lines of a text to data conversion device comprising the steps of:

generating three of said outputs, A, B, and C, each of said outputs being derived from a common one of said pages of said ancestral printed text and each of said outputs being generated by an optical character recognition device;

computing an upper bound, K, on the edit distances between the strings of lines represented within said outputs by:

finding the closest matching of groups of said lines of said common one of said pages by determining traces between said outputs A, B, and C, enlarging said groups to lengthen runs of said groups of lines, removing crossings representing traces extending from two lines of one output to one line of another output, then retracing to determine the number of trace based matches between said groups, and estimating the minimum edit distance between said strings-of-lines and setting the value of said upper bound, K, in correspondence therewith, then, merging said outputs A, B, and C by determining only those edit distances of value below said upper bound, K, between strings of lines represented within outputs A and B, A and C, and B and C, then backtracking through the determined edit distances to recover an optimal alignment exhibiting a minimum edit distance D(A,B,C) to provide a merged output representing said content of said common one of said pages of said ancestral printed text; and then recording said merged output within the memory medium of a database.

11. A method for determining the content of an ancestral printed text having pages composed of lines of symbols, from the outputs representing text symbols within strings-of-lines of a text to data conversion device comprising the steps of: generating three of said outputs, A, B, and C, each of said outputs being derived from a common one of said pages of said ancestral printed text, and each of said outputs being generated by an optical character recognition device;

computing an upper bound, K, on the edit distances between the strings of lines represented within said outputs by deriving bounds $K_{AB}$, $K_{AC}$, and $K_{BC}$ on the strings-of-lines alignment distance for each respective output pair A and B, A and C, and B and C, said upper bound, K, being for the total strings-of-lines edit distance and being derived in correspondence with the expression:

K=min ($K_{AB}+K_{BC}$, $K_{AC}+K_{BC}$, $K_{AB}+K_{AC}$);

merging said outputs, A, B, and C by determining only those edit distances of value below said upper bound, K, between the strings of lines represented within outputs A and B, A and C, and B and C, deriving an edit distance array as a three-dimensional matrix having faces corresponding with paired outputs A and B, A and C, and B and C, providing edit distance entries for said array which are derived by determining a lower bound for the cumulative lengths for respective lines, i, j, k of said outputs A, B, and C, and deriving an edit distance entry D(i,j,k) for said array when said lower bound is less than said upper bound, K, then backtracking through the determined edit distances to recover an optimal alignment exhibiting a minimum edit distance D(A,B,C) to provide a merged output representing said content of said common one of said pages of said ancestral printed text; and then recording said merged output within a memory medium of a database.

12. The method of claim 11 in which said edit distance entry D(i,j,k) is derived as the minimum of the values, m1, m2, m3, m4, m5, m6, m7, where:

m1=D(i−1,j−1,k−1) plus a weighting factor, m2=D(i,j−1,k−1) plus a weighting factor, m3=D(i−1,j,k−1) plus a weighting factor, m4=D(i−1,j−1,k) plus a weighting factor, m5=D(i,j,k−1) plus the length of the kth line of output C, m6=D(i,j−1,k) plus the length of the jth line of output B, and m7=D(i−1,j,k) plus the length of the ith line of A.

13. The method of claim 11 in which said backtracking includes the comparative steps of:

outputting a minimum weight line ($\lambda$,$B_j$,$C_k$) when a given entry D(i,j,k) equals the entry D(i,j−1,k−1) plus a weighting factor;

outputting a minimum weight line ($A_i$,$\lambda$,$C_k$) when a given entry D(i,j,k) equals the entry D(i−1,j,k−1) plus a weighting factor;

outputting a minimum weight line $A_i$,$B_j$,$\lambda$) when a given entry D(i,j,k) equals the entry D(i−1,j−1,k) plus a weighting factor;

outputting a minimum weight line ($\lambda$,$\lambda$,$C_k$) when a given entry D(i,j,k) equals the entry D(i,j,k−1) plus the length of the kth line of output C;

outputting a minimum weight line $\lambda$($\lambda$,$B_j$,$\lambda$) when a given entry D(i,j,k) equals the entry D(i,j−1,k) plus the length of the jth line of output B; and outputting a minimum weight line ($A_i$,$\lambda$,$\lambda$) when a given entry D(i,j,k) equals the entry D(i−1,j,k) plus the length of the ith line of output A;

where $\lambda$, denotes a null line.

14. The method of claim 13 in which said backtracking outputs a common ancestor function Caf ($A_i$,$B_j$,$C_k$) in the absence of an equality at said comparative steps.

15. The method of claim 13 in which said comparative steps are carried out in a descending sequence wherein the initial value of i is equal to the number of lines represented at output A, the initial value of j is equal to the number of lines represented at output B, and the initial value of k is equal to the number of lines represented at output c.

16. A system for generating the content of an ancestral printed text, having pages composed of lines of symbols, from outputs within strings of lines representing text symbols of an optical character recognition device, comprising:

a first optical character recognition device having an output, A, derived from a given page of said ancestral printed text;

a second optical character recognition device having an output, B, derived from said given page of said ancestral printed text;

a third optical character recognition device having an output, C, derived from said given page of said ancestral printed text;

merge processing means responsive to each of said outputs A, B, and C, as said strings-of-lines, for computing an upper bound, K, on the total alignment distance exhibited by said outputs from bounds, $K_{AB}$, $K_{AC}$, and $K_{BC}$ on each respective pair of said outputs A and B, A and C, and B and C, said upper bound, K, being derived in correspondence with the expression:

K=min ($K_{AB}+K_{BC}$, $K_{AC}+K_{BC}$, $K_{AB}+K_{AC}$), for deriving an edit distance array as a three-dimensional matrix having faces corresponding with paired outputs A and B, A and C, and B and C, for generating edit distance entries for said array by deriving a lower bound value with respect to said outputs and providing an edit distance entry D(i,j,k) for said array corresponding with the ith line of output A, the jth line of output B, and the kth line of output C when said lower bound value is less than said upper bound, K;

for backtracking through said array to recover an optimal alignment of said strings-of-lines exhibiting a minimum edit distance to provide a merged output representing said given page of ancestral printed text; and memory means for receiving and retaining said merged output as an archival database.

17. The system of claim 16 in which said merge processing means is responsive to each of said outputs A, B, and C to effect the normalization thereof by eliminating outputs representing blank lines and blanks within said lines.

18. The system of claim 16 in which said merge processing means derivation of said edit distance array includes an initialization of the entries thereof with a large numerical value.

19. The system of claim 16 in which said merge processing means edit distance entry $D(i,j,k)$ is generated as the minimum of the values, m1, m2, m3, m4, m5, m6, m7, where:

$m1=D(i-1,j-1,k-1)$ plus a weighting factor, $m2=D(i,j-1,k-1)$ plus a weighting factor, $m3=D(i-1,j,k-1)$ plus a weighting factor, $m4=D(i-1,j-1,k)$ plus a weighting factor, $m5=D(i,j,k-1)$ plus the length of the kth line of output C, $m6=D(i,j-1,k)$ plus the length of the jth line of output B, and $m7=D(i-1,j,k)$ plus the length of the ith line of A.

20. The system of claim 16 in which said merge processing means lower bound value is a function of line indices i, j, and k.

21. The system of claim 20 in which said merge processing means lower bound value corresponds with the cumulative lengths for respective lines i, j, k of said outputs A, B, and C.

* * * * *